United States Patent
Seo et al.

(10) Patent No.: US 9,934,347 B2
(45) Date of Patent: Apr. 3, 2018

(54) INTEGRATED CIRCUIT AND METHOD OF DESIGNING LAYOUT OF INTEGRATED CIRCUIT

(71) Applicants: Jae-Woo Seo, Seoul (KR); Ha-Young Kim, Seoul (KR); Hyun-Jeong Roh, Yongin-Si (KR)

(72) Inventors: Jae-Woo Seo, Seoul (KR); Ha-Young Kim, Seoul (KR); Hyun-Jeong Roh, Yongin-Si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 54 days.

(21) Appl. No.: 14/868,745

(22) Filed: Sep. 29, 2015

(65) Prior Publication Data
US 2016/0098509 A1 Apr. 7, 2016

Related U.S. Application Data

(60) Provisional application No. 62/058,432, filed on Oct. 1, 2014.

(30) Foreign Application Priority Data

Jun. 16, 2015 (KR) ........................ 10-2015-0085145

(51) Int. Cl.
*G06F 17/50* (2006.01)
*G03F 1/70* (2012.01)
(Continued)

(52) U.S. Cl.
CPC ............ *G06F 17/5072* (2013.01); *G03F 1/70* (2013.01); *G03F 7/70466* (2013.01);
(Continued)

(58) Field of Classification Search
CPC .. G06F 17/05; G06F 17/5072; G06F 17/5068; G06F 2217/12; G06F 1/70
See application file for complete search history.

(56) References Cited

U.S. PATENT DOCUMENTS 6,567,957 B1 5/2003 Chang et al.
6,574,778 B2 6/2003 Chang et al.
(Continued)

FOREIGN PATENT DOCUMENTS

JP 2006-011447 1/2006
JP 2009-139938 6/2009
(Continued)

*Primary Examiner* — Helen Rossoshek
(74) *Attorney, Agent, or Firm* — F. Chau & Associates, LLC

(57) ABSTRACT

A method of designing a layout of an integrated circuit (IC) includes placing a first cell in the layout, placing a second cell in the layout adjacent to the first cell at a first boundary between the first and second cells, and generating a plurality of commands executable by a processor to form a semiconductor device based on the layout. The first cell includes a first pattern and a second pattern. The first and second patterns are adjacent to the first boundary, the first and second patterns have different colors, and a first boundary space between the first pattern and the first boundary is different from a second boundary space between the second pattern and the first boundary.

16 Claims, 47 Drawing Sheets

(51) Int. Cl.
  *H01L 21/311* (2006.01)
  *G03F 7/20* (2006.01)

(52) U.S. Cl.
  CPC .......... *G06F 17/50* (2013.01); *G06F 17/5068* (2013.01); *G06F 2217/12* (2013.01); *H01L 21/31144* (2013.01)

(56) References Cited

U.S. PATENT DOCUMENTS

| | | | |
|---|---|---|---|
| 6,594,800 B2 | 7/2003 | Chang et al. | |
| 6,629,293 B2 | 9/2003 | Chang et al. | |
| 6,631,470 B2 | 10/2003 | Chang et al. | |
| 6,694,501 B2 | 2/2004 | Chang et al. | |
| 6,698,002 B2 | 2/2004 | Chang et al. | |
| 6,701,504 B2 | 3/2004 | Chang et al. | |
| 6,725,432 B2 | 4/2004 | Chang et al. | |
| 6,968,514 B2 | 11/2005 | Cooke et al. | |
| 7,378,195 B2 | 5/2008 | Graur et al. | |
| 7,687,207 B2 | 3/2010 | Graur et al. | |
| 8,245,174 B2 | 8/2012 | Cheng et al. | |
| 8,255,837 B2* | 8/2012 | Lu | G03F 1/00 716/50 |
| 8,327,301 B2* | 12/2012 | Cheng | G03F 7/70433 716/110 |
| 8,468,470 B2* | 6/2013 | Hsu | G03F 1/70 716/54 |
| 8,484,607 B1 | 7/2013 | Tang et al. | |
| 8,572,521 B2 | 10/2013 | Chen et al. | |
| 8,677,291 B1 | 3/2014 | Yuan et al. | |
| 8,782,586 B2 | 7/2014 | Sezginer et al. | |
| 8,843,867 B2 | 9/2014 | Chase et al. | |
| 2011/0096259 A1* | 4/2011 | Lee | G02B 5/201 349/41 |
| 2012/0286331 A1 | 11/2012 | Aton et al. | |
| 2013/0174106 A1* | 7/2013 | Hsu | G06F 17/50 716/55 |
| 2013/0179848 A1* | 7/2013 | Liu | G06F 17/5072 716/55 |
| 2014/0145342 A1* | 5/2014 | Schultz | H01L 21/31144 257/773 |
| 2014/0162460 A1* | 6/2014 | Lee | H01L 21/3086 438/703 |
| 2014/0282344 A1* | 9/2014 | Hsu | G06F 17/5072 716/123 |
| 2015/0302129 A1* | 10/2015 | Chen | G06F 17/5072 716/55 |

FOREIGN PATENT DOCUMENTS

| | | |
|---|---|---|
| JP | 2013-041562 | 2/2013 |
| KR | 1020010085867 | 9/2001 |

\* cited by examiner

INTEGRATED CIRCUIT AND METHOD OF DESIGNING LAYOUT OF INTEGRATED CIRCUIT

CROSS-REFERENCE TO RELATED APPLICATIONS

This application claims priority to and the benefit of Provisional Application Ser. No. 62/058,432, filed on Oct. 1, 2014, and Korean Patent Application No. 10-2015-0085145, filed on Jun. 16, 2015, the disclosures of which are incorporated by reference herein in their entireties.

TECHNICAL FIELD

Exemplary embodiments of the inventive concept relate to an integrated circuit (IC), and more particularly, to an IC including at least one standard cell and a method of designing a layout of the IC.

DISCUSSION OF THE RELATED ART

The design of a semiconductor IC includes an operation of converting a behavior model for a chip, and describing an operation to be derived from a semiconductor system into a specific structure model for describing connections between required components. Referring to the process of designing the semiconductor IC, when a library of cells included in the semiconductor IC may be generated and the semiconductor IC is implemented using the generated library, the time and cost involved in designing and implementing the semiconductor IC may be reduced.

SUMMARY

According to an exemplary embodiment of the inventive concept, a method of designing a layout of an integrated circuit (IC) includes placing a first cell in the layout, placing a second cell in the layout adjacent to the first cell at a first boundary between the first and second cells, and generating a plurality of commands executable by a processor to form a semiconductor device based on the layout. The first cell includes a first pattern and a second pattern. The first and second patterns are adjacent to the first boundary, the first and second patterns have different colors, and a first boundary space between the first pattern and the first boundary is different from a second boundary space between the second pattern and the first boundary.

According to an exemplary embodiment of the inventive concept, a method of designing a layout of an IC includes placing a first cell in the layout. The first cell includes a plurality of first colorless patterns, each satisfying a first space condition. The first space condition corresponds to a value of a smallest space between patterns to which a same color is assigned in a first zone adjacent to a first boundary. The method further includes placing a second cell in the layout adjacent to the first cell at the first boundary between the first and second cells. The first zone extends substantially parallel to the first boundary. The method further includes generating a plurality of commands executable by a processor to form a semiconductor device based on the layout.

According to an exemplary embodiment of the inventive concept, an integrated circuit (IC) includes a plurality of cells and a plurality of patterns disposed in each of the plurality of cells and adjacent to a boundary at each of the plurality of cells. The plurality of patterns have different colors corresponding respectively to different masks, and respective boundary spaces between the patterns and the boundary are different from one another.

According to an exemplary embodiment of the inventive concept, a standard cell stored in a standard cell library includes a plurality of first colorless patterns disposed in a first zone of the standard cell adjacent to a first boundary. Each first colorless pattern satisfies a first space condition. The standard cell further includes a plurality of second colorless patterns disposed in a second zone of the standard cell adjacent to a second boundary opposite to the first boundary. Each second colorless pattern satisfies the first space condition, and the first space condition corresponds to a value of a smallest space between patterns to which a same color is assigned in the first zone.

According to an exemplary embodiment of the inventive concept, a method of manufacturing a semiconductor device includes placing a first cell in a layout. The first cell includes at least two patterns disposed adjacent to a first boundary between the first cell and a second cell. The method further includes placing the second cell in the layout adjacent to the first cell at the first boundary. The first and second cells are among a plurality of cells that defines an integrated circuit (IC). The at least two patterns have different colors and respective boundary spaces between the at least two patterns and the first boundary are different from each other. The method further includes forming the semiconductor device based on the layout. The semiconductor device is formed using a multi-patterning operation performed on the at least two patterns using different masks corresponding respectively to the different colors.

According to an exemplary embodiment of the inventive concept, a method of manufacturing a semiconductor device includes placing a first cell in a layout adjacent to a first boundary. The first cell includes a first zone, and a plurality of first colorless patterns are disposed in the first zone. The method further includes placing a second cell in the layout adjacent to the first boundary. The second cell includes a first pattern having a first color, and the first and second cells are among a plurality of cells that defines an integrated circuit (IC). The first colorless patterns satisfy a first space condition that corresponds to a value of a smallest space between patterns that are adjacent to the first boundary and to which a same color is assigned. The method further includes assigning a second color to the first colorless patterns, and forming the semiconductor device based on the layout. The semiconductor device is formed using a multi-patterning operation performed on the first pattern having the first color and the first colorless patterns to which the second color is assigned using first and second masks corresponding respectively to the first and second colors.

According to an exemplary embodiment of the inventive concept, a method of manufacturing a semiconductor device includes placing a first cell in a layout of an integrated circuit (IC). The first cell includes a first pattern and a second pattern. The method further includes placing a second cell in the layout adjacent to the first cell at a boundary between the first and second cells. The first and second patterns are adjacent to the boundary, the first and second patterns have different colors, and a first boundary space between the first pattern and the boundary is different from a second boundary space between the second pattern and the boundary. The method further includes forming the semiconductor device based on the layout. The semiconductor device is formed using a multi-patterning operation performed on the first and second patterns using different masks corresponding respectively to the different colors.

BRIEF DESCRIPTION OF THE DRAWINGS

The above and other features of the present inventive concept will become more apparent by describing in detail exemplary embodiments thereof with reference to the accompanying drawings, in which.

DETAILED DESCRIPTION

Figure 1:
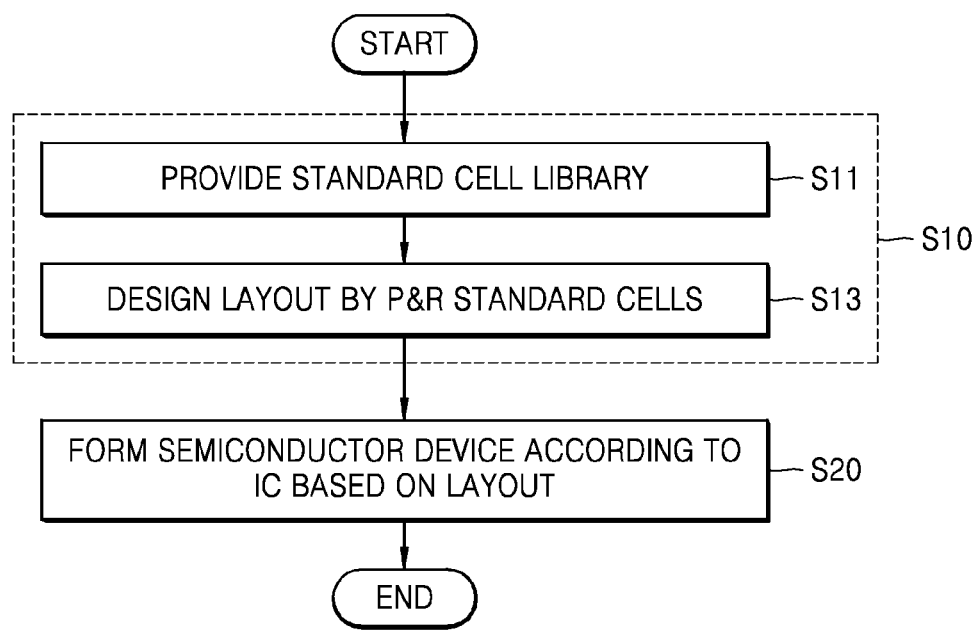
FIG. 1 is a flowchart of a method of manufacturing a semiconductor device according to an exemplary embodiment of the inventive concept.

Exemplary embodiments of the present inventive concept will now be described more fully hereinafter with reference to the accompanying drawings. Like reference numerals may refer to like elements throughout the drawings. In the drawings, the thicknesses of layers and regions may be exaggerated for clarity.

The terminology used herein is for the purpose of describing particular exemplary embodiments only and is not intended to be limiting of the inventive concept. As used herein, the singular forms "a", "an" and "the" are intended to include the plural forms as well, unless the context clearly indicates otherwise.

It will be understood that, although the terms first, second, etc. may be used herein to describe various elements, components, regions, layers and/or sections, these elements, components, regions, layers and/or sections should not be limited by these terms. Thus, a first element, component, region, layer or section discussed below could be termed a second element, component, region, layer or section without departing from the teachings of the inventive concept.

It will be understood that when a component, such as a film, a region, a layer, or an element, is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present.

Spatially relative terms, such as "beneath", "below", "lower", "under", "above", "upper", "to the left of", "to the right of", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below.

As used herein, the term "and/or" includes any and all combinations of one or more of the associated listed items. Further, when two or more elements or values are described as being substantially the same as or about equal to each other, it is to be understood that the elements or values are identical to each other, indistinguishable from each other, or distinguishable from each other but functionally the same as each other as would be understood by a person having ordinary skill in the art. Further, when processes are described as being performed at substantially the same time, it is to be understood that the processes may be performed at exactly the same time or at about the same time as would be understood by a person having ordinary skill in the art.

An integrated circuit (IC) may be defined by a plurality of cells. For example, the IC may be designed using a cell library including characteristic information regarding the plurality of cells. Here, names, dimensions, gate widths, pins, delay characteristics, leakage currents, critical voltages, and functions of cells may be defined in the cell library. A general cell library set may include basic cells (e.g., AND, OR, NOR, or inverters), complex cells (e.g., OR/AND/INVERTER (OAI) and AND/OR/INVERTER (AOI)), and storage elements (e.g., master-slaver flip-flops and latches).

In the following exemplary embodiments, the cell library may be a standard cell library. A standard cell method may be a method of previously preparing logic circuit blocks (or cells) having several functions and designing an exclusive large-scale integrated circuit (LSI) according to customer's specifications or user's specifications by arbitrarily combining the cells. The cells may be previously designed and verified and registered in computers, and logic design, placement, and routing processes may be performed by combining cells by using a computer-aided design (CAD).

For example, when LSIs are designed and manufactured, if standardized logic circuit blocks are already retained on a certain scale, a logic circuit block fit for a current design purpose may be selected out of the standardized logic circuit blocks and placed as a plurality of columns of cells on a chip. Further, the entire circuit may be manufactured by optimally routing lines having the shortest routing length in a routing space between cells. As types of cells retained in the library become more diverse, flexibility in design may increase, and the possibility of optical design of chips may become stronger.

ICs using standard cells, which are semi-custom ICs, may be previously designed and embodied by placing cells to use standard cells stored in a standard cell library and minimizing routing between the standard cells. Accordingly, the ICs may be developed at low cost within small durations of time as compared with full-custom ICs.

FIG. 1 is a flowchart of a method of manufacturing a semiconductor device according to an exemplary embodiment of the inventive concept.

Referring to FIG. 1, a method of manufacturing a semiconductor device according to an exemplary embodiment may be divided into an operation of designing an IC (S10) and an operation of manufacturing an IC (S20). The operation of designing the IC (S10), which includes operations S11 and S13, corresponds to designing a layout of the IC, and may be performed using a tool for designing ICs. The tool for designing the ICs may be, for example, a program including a plurality of commands that are performed by a processor. The operation of manufacturing the IC (S20) corresponds to manufacturing a semiconductor device according to the IC based on the designed layout, and may be performed by a semiconductor process module. For example, according to exemplary embodiments, once the operation of designing the IC (S10) has been completed, a plurality of commands executable by a processor to manufacture the IC may be generated based on the layout designed in operation S10.

In operation S11, a standard cell library may be provided. The standard cell library may include information regarding a plurality of standard cells and may be stored in a computer-readable storage medium. The standard cell library may include, for example, layout information and timing information regarding standard cells.

In an exemplary embodiment, providing the standard cell library may include generating the standard cell library, and more specifically, designing the standard cells. The designing of the standard cells may include, for example, designing a plurality of patterns by using a plurality of colors corresponding to a plurality of masks due to color decomposition.

In operation S13, a layout of the IC may be designed by placing and routing the standard cells using the standard cell library. For example, input data for defining the IC may be received. The input data may be data generated by synthesizing an abstract type of behavior of the IC such as, for example, data defined by a register transfer level (RTL), using the standard cell library. For example, the input data may be a bitstream or a netlist generated by synthesizing an IC defined by a hardware description language (HDL), such as a VHSIC HDL (VHDL) and VERILOG.

A storage medium configured to store the standard cell library may be accessed, and standard cells from among the plurality of standard cells stored in the standard cell library, which are selected based on the input data, may be placed and routed. Here, a placing and routing (P&R) operation refers to an operation of placing the selected standard cells and connecting the placed standard cells. The layout of the IC may be generated by completing the P&R operation.

The operation S10 of designing the IC may include the above-described operations S11 and S13. However, exemplary embodiments of the inventive concept are not limited thereto. For example, operation S10 of designing the IC may further include various operations performed when designing an IC such as, for example, an operation of revising a standard cell library, an operation of verifying a layout, and a post simulation operation.

In operation S20, a semiconductor device in accordance with the IC may be formed based on the layout of the IC. For example, initially, the layout of the IC may be changed by performing an optical proximity correction (OPC) operation based on the layout of the IC. Here, the OPC operation refers to a process of changing a layout of an IC based on errors caused by an optical proximity effect (OPE). If a mask is manufactured using the layout of the IC as it is (e.g., without being changed based on errors) and a photolithography process is performed using the manufactured mask, a pattern having a different shape from the designed layout may be formed due to an OPE. Accordingly, when the layout of the IC is changed based on errors caused by the OPE, a mask is manufactured based on the changed layout, and a photolithography process is performed using the mask, a pattern having the same shape as the layout may be formed.

Subsequently, a mask may be manufactured according to the layout that is changed based on the OPC result, and an IC may be formed using the manufactured mask. In this case, the mask may be manufactured using the layout that is based on the OPC operation, for example, a graphic design system (GDS) that is based on the OPC operation, and an IC may be manufactured on a wafer by performing a photolithography process using the manufactured mask. The number of manufactured masks may correspond to the number of colors assigned to patterns included in the layout.

Figure 2:
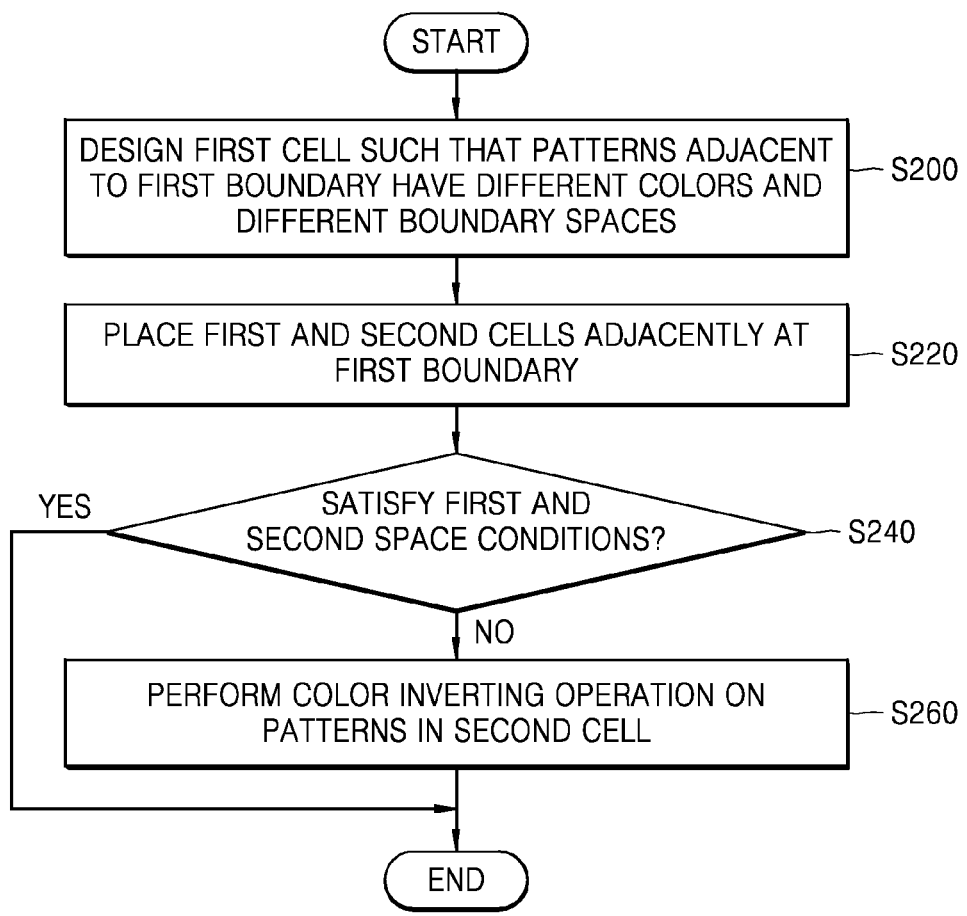
FIG. 2 is a flowchart of a method of designing a layout of an integrated circuit (IC) according to an exemplary embodiment of the inventive concept.

FIG. 2 is a flowchart of a method of designing a layout of an IC according to an exemplary embodiment of the inventive concept.

Referring to FIG. 2, the method of designing a layout of an IC according to an exemplary embodiment may correspond to an example of operation S10 of FIG. 1. Accordingly, for convenience of explanation, a further description of processes and elements previously described with reference to FIG. 1 may be omitted herein.

In operation S200, a first cell may be designed such that patterns adjacent to a first boundary have different colors and different boundary spaces. Operation S200 may be an example of operation S11 of FIG. 1. According to an exemplary embodiment, the first cell may be designed such that at least two of the patterns adjacent to the first boundary have different colors and different boundary spaces. Accordingly, some of the patterns adjacent to the first boundary may have the same colors or the same boundary spaces.

One cell may be defined by a cell boundary including four boundary lines. Herein, the four boundary lines may also be referred to as boundaries. Thus, the cell boundary may be an outline defining a cell, and a P&R tool may recognize the cell by using the cell boundary. The first boundary may be one of the four boundaries. In an exemplary embodiment, the first boundary may be one of two boundaries in which power lines are not arranged (e.g., which are not parallel to the power lines), from among the four boundaries.

The patterns adjacent to the first boundary may refer to patterns or features arranged more adjacent to the first boundary than a second boundary arranged opposite the first boundary, from among a plurality of patterns constituting one layer of a first cell. In an exemplary embodiment, the patterns adjacent to the first boundary may be disposed directly adjacent to the first boundary. For example, other patterns may not be disposed between the first boundary and the patterns adjacent to the first boundary.

The plurality of patterns constituting one layer of the first cell may be formed using a plurality of masks in consideration of a patterning resolution. For example, in an operation of designing a cell, a plurality of patterns may be designed using a plurality of colors respectively corresponding to a plurality of masks due to color decomposition. For example, different colors may be assigned to the patterns formed using different masks. In an exemplary embodiment, at least two of the patterns adjacent to the first boundary may be respectively assigned to different colors.

A boundary space may refer to a space between the first boundary and the patterns adjacent to the first boundary. In an exemplary embodiment, an extension direction of the patterns may be substantially parallel to the first boundary. In this case, the boundary space may refer to a side-to-side space. In an exemplary embodiment, the extension direction of the patterns may be substantially perpendicular to the first boundary. In this case, the boundary space may refer to a side-to-tip space. In an exemplary embodiment, the side-to-tip space may be set to be greater than the side-to-side space. Various exemplary embodiments related to the boundary space will be described in detail with reference to FIGS. 7A to 7F.

In operation S220, first and second cells may be placed adjacent to each other at the first boundary. For example, the first cell may be initially placed, and the second cell may be placed adjacent to the first boundary of the first cell according to a direction in which the first cell is placed. In an exemplary embodiment, the first and second cells may be placed directly adjacent to each other. Operation S220 may be an example of operation S13 of FIG. 1. The second cell may be an arbitrary cell stored in a standard cell library.

In an exemplary embodiment, the second cell may be a cell designed according to operation S200. For example, patterns adjacent to one boundary of the second cell may have different colors and different boundary spaces, and patterns adjacent to another boundary arranged opposite the one boundary of the second cell may have the same color and the same boundary space. Alternatively, patterns adjacent to another boundary of the second cell may have different colors and different boundary spaces.

In an exemplary embodiment, the second cell may be a cell that is not designed according to operation S200. For example, patterns adjacent to one boundary of the second cell may have the same color and the same boundary space, and patterns adjacent to another boundary arranged opposite the one boundary of the second cell may also have the same color and the same boundary space.

In an exemplary embodiment, the first and second cells may be placed directly adjacent to the first boundary. In this case, the first boundary may substantially overlap one boundary of the second cell. In an exemplary embodiment, the second cell may be adjacent to the first boundary and placed a predetermined space apart from the first boundary.

In operation S240, it may be determined whether a space between patterns included in the first cell and patterns included in the second cell satisfies first and second space conditions. For example, it may be determined whether a space between patterns adjacent to the first boundary in the first cell and patterns adjacent to the first boundary in the second cell satisfies the first and second space conditions. If the result is that the space does not satisfy the first and second space conditions, operation S260 may be performed. Otherwise, if the space satisfies the first and second space conditions, the method of designing the layout of the IC may be completed. Herein, when a space between patterns is described as satisfying a space condition, it is to be understood that a value of the space that satisfies the space condition is equal to or greater than a value corresponding to the space condition.

A first space, which refers to the smallest space between patterns in the layout assigned to the same color, may be preset in an operation of designing a layout of an IC. An operation of determining whether the space satisfies the first space condition may include determining whether a space between the patterns adjacent to the first boundary in the first cell and patterns assigned to the same color, from among the patterns adjacent to the first boundary in the second cell, is the first space or a larger space.

A second space refers to the smallest space between patterns in the layout assigned to different colors. An operation of determining whether the space satisfies the second space condition may include determining whether a space between the patterns adjacent to the first boundary in the first cell and patterns assigned to different colors, from among the patterns adjacent to the first boundary in the second cell, is the second space or a larger space. In this case, the second space is smaller than the first space.

In operation S260, a color inverting operation may be performed on the patterns included in the second cell. The color inverting operation may be an operation of swapping different colors (e.g., first and second colors), which are previously assigned to the patterns, for one another. The color inverting operation may be referred to as a color swapping operation. To satisfy the first and second space conditions, a color of patterns to which the first color is assigned may be inverted from the first color into the second color, and a color of patterns to which the second color is assigned may be inverted from the second color into the first color. The color inverting operation will be described in detail with reference to an IC 43 shown in FIG. 4.

Figure 3:
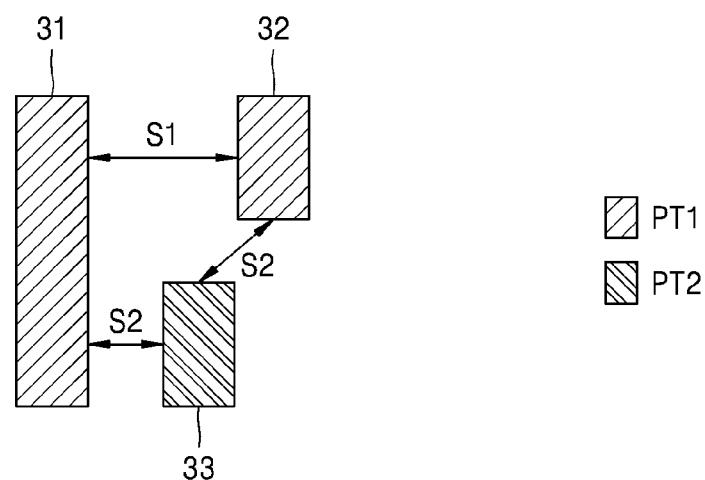
FIG. 3 illustrates a portion of an IC including patterns that satisfy first and second space conditions, according to an exemplary embodiment of the inventive concept.

FIG. 3 illustrates a portion of an IC 30 including patterns that satisfy first and second space conditions, according to an exemplary embodiment of the inventive concept.

Referring to FIG. 3, the IC 30 may include first patterns 31 and 32 to which a first color is assigned (as indicated by PT1 in FIG. 3) and a second pattern 33 to which a second color is assigned (as indicated by PT2 in FIG. 3). In this case, the first color and the second color may be different colors. Thus, the first patterns 31 and 32 and the second pattern 33 may be formed using different masks. Herein, in the figures, PT1 indicates that the first color has been assigned to the corresponding pattern and PT2 indicates that the second color has been assigned to the corresponding pattern.

For example, the first patterns 31 and 32 having the first color may be transferred to a first mask, and the second pattern 33 having the second color may be transferred to a second mask. The first and second masks may be, for example, lithography masks having transparent patterns configured to allow transmission of light and opaque patterns configured to block light. The first and second masks may be combined with each other and form a double patterning mask set. The first and second masks may be used to expose photoresist for patterns of the same type arranged at the same level.

A space between the two first patterns 31 and 32 to which the first color is assigned may be a first space S1. The first patterns 31 and 32 may satisfy the first space conditions. As described above with reference to FIG. 2, the first space (e.g., S1) may be the smallest space between patterns assigned to the same color. For example, the first space S1 may be 100. Herein, the first space S1 may be expressed in arbitrary unit (a.u.), for example, nm, mm, μm or the like. Hereinafter, a case in which the first space S1 is 100 will be described in detail.

A space between the first pattern 31 to which the first color is assigned and the second pattern 33 to which the second color is assigned may be a second space S2 or a larger space. The first pattern 31 and the second pattern 33 may satisfy the second space condition. Further, a space between the first pattern 32 to which the first color is assigned and the second pattern 33 to which the second color is assigned may be the second space S2 or a larger space. The first pattern 32 and the second pattern 33 may satisfy the second space condition. As described above with reference to FIG. 2, the second space (e.g., S2) may be the smallest space between the patterns to which different colors are assigned. For example, the second space S2 may be 50. Herein, the second space S2 may be expressed in arbitrary unit (a.u.), for example, nm, mm, μm or the like. Hereinafter, a case in which the second space S2 is 50 will be described in detail.

In an exemplary embodiment, the first patterns 31 and 32 and the second pattern 33 may be included in one cell. In an exemplary embodiment, the first pattern 31 may be included in the first cell, and the first pattern 32 and the second pattern 33 may be included in the second cell. Thus, in the IC 30, the first and second patterns 31, 32, and 33 may be arranged in the same cell and in adjacent cells to satisfy the first and second space conditions.

Figure 4:
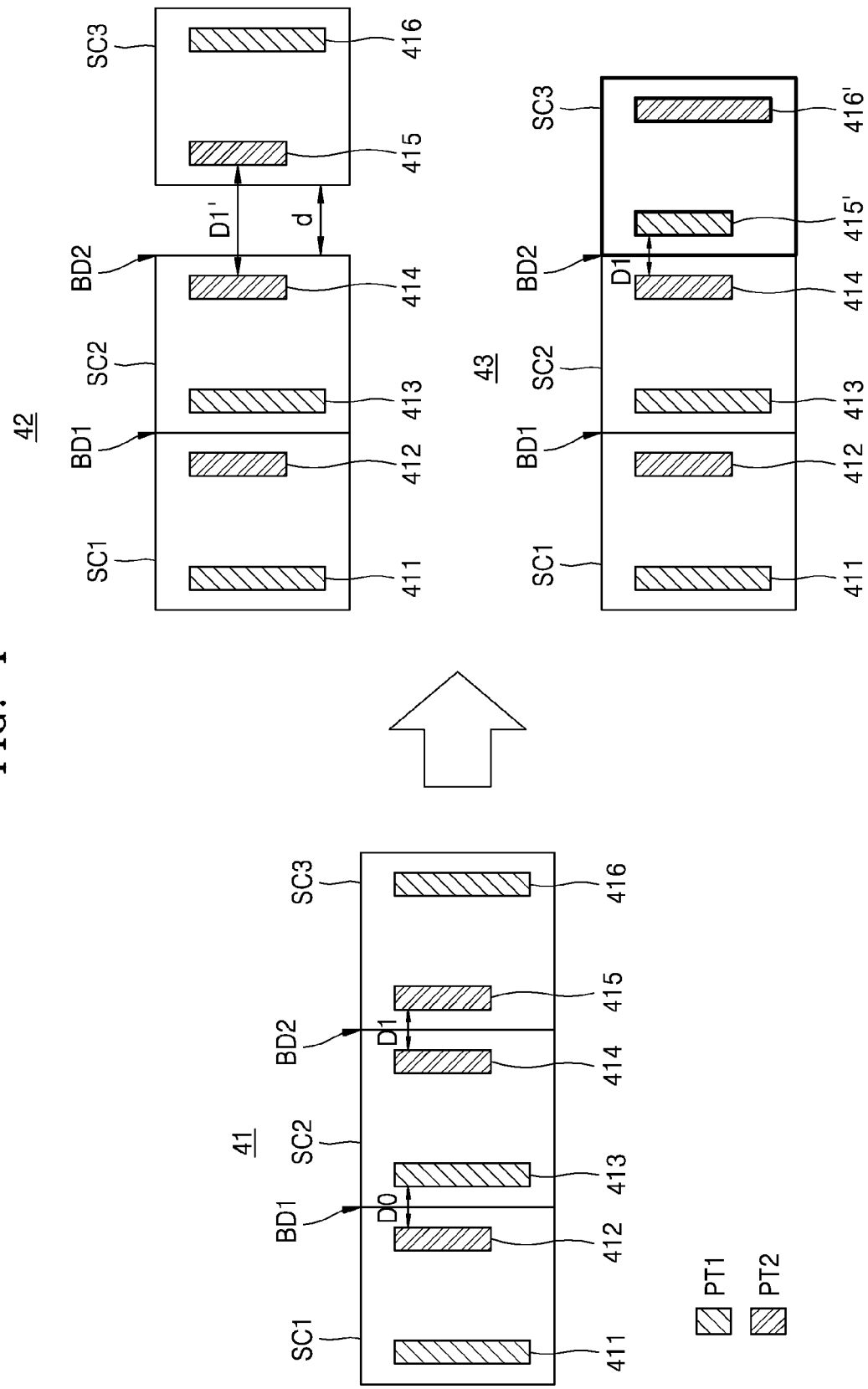
FIG. 4 illustrates examples of a method of solving a color conflict according to an exemplary embodiment of the inventive concept.

FIG. 4 illustrates examples of a method of solving a color conflict according to an exemplary embodiment of the inventive concept.

Referring to FIG. 4, an IC 41 may include first to third standard cells SC1, SC2, and SC3 placed adjacent to one another. The first standard cell SC1 may include a first pattern 411 having a first color and a second pattern 412 having a second color. The second standard cell SC2 may include a first pattern 413 having the first color and a second pattern 414 having the second color. The third standard cell SC3 may include a second pattern 415 having the second color and a first pattern 416 having the first color.

The first and second standard cells SC1 and SC2 may be adjacent to a first boundary BD1. The second pattern 412 included in the first standard cell SC1 adjacent to the first boundary BD1 and the first pattern 413 included in the second standard cell SC2 adjacent to the first boundary BD1 may have different colors. Accordingly, it may be determined whether the second pattern 412 and the first pattern 413 satisfy the second space condition. For example, it may be determined whether a distance D0 between the second pattern 412 and the first pattern 413 is 50 or more. Herein, the distance D0 may be expressed in arbitrary unit (a.u.), for example, nm, mm, μm or the like.

The second and third standard cells SC2 and SC3 may be adjacent to the second boundary BD2. The second pattern 414 included in the second standard cell SC2 adjacent to the second boundary BD2 may have the same color as the second pattern 415 included in the third standard cell SC3 adjacent to the second boundary BD2. Accordingly, it may be determined whether the second pattern 414 and the second pattern 415 satisfy the first space condition. For example, it may be determined whether a distance D1 between the second pattern 414 and the second pattern 415 is 100 or more. Herein, the distance D1 may be expressed in arbitrary unit (a.u.), for example, nm, mm, μm or the like.

In the present example, the distance between the second pattern 414 and the second pattern 415 is less than the first space S1. Thus, the second pattern 414 and the second pattern 415 do not satisfy the first space condition. As described above, when a distance between two patterns to which the same color is assigned does not satisfy the first space condition, a color violation occurs between the two patterns. In an operation of placing and routing standard cells defining an IC, a color conflict may occur due to the color violation.

In an IC 42, a third standard cell SC3 may be placed a predetermined distance d apart from the second standard cell SC2 to solve a color conflict. Thus, a distance D1' between the second pattern 414 and the second pattern 415 may be the first space S1 or a larger space. Thus, the second pattern 414 and the second pattern 415 may satisfy the first space condition. According to the above-described cell spacing method, an area of the IC 42 may be increased.

In an IC 43, a color inverting operation may be performed on first and second patterns 415 and 416 included in a third standard cell SC3 to solve a color conflict. As a result of the color inverting operation, a second pattern 415' may have a first color, and a first pattern 416' may have a second color. Thus, since the second pattern 414 and the second pattern 415' have different colors, the second pattern 414 and the second pattern 415' may satisfy the second space condition. In the present example, a distance D1 between the second pattern 414 and the second pattern 415' may be the second space S2 or a larger space. Thus, the second pattern 414 and the second pattern 415' may satisfy the second space condition.

Figure 5:
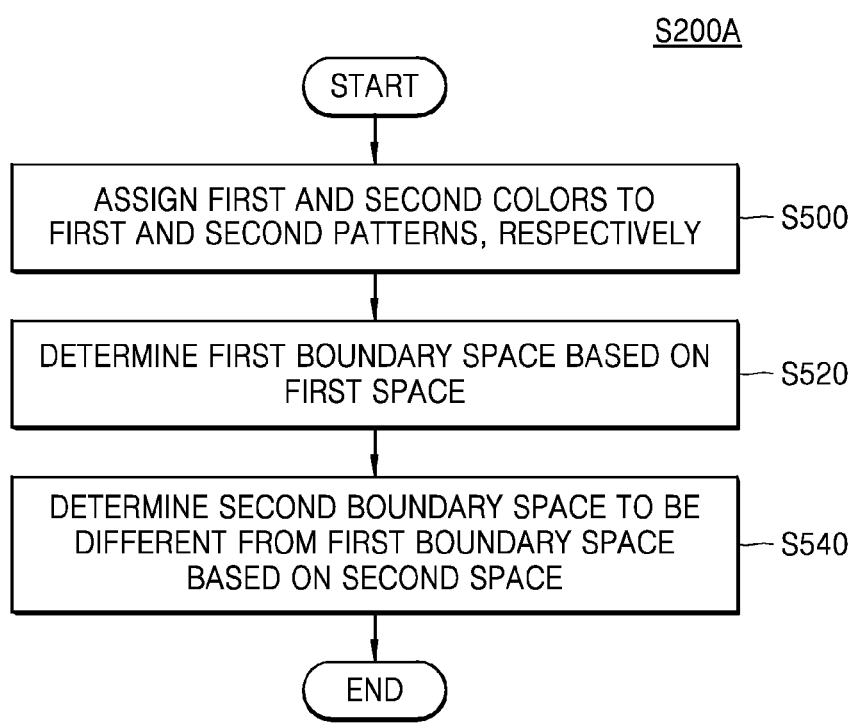
FIG. 5 is a flowchart of a method of designing a cell according to an exemplary embodiment of the inventive concept.

FIG. 5 is a flowchart of a method S200A of designing a cell according to an exemplary embodiment of the inventive concept.

Referring to FIG. 5, the method S200A of designing the cell according to an exemplary embodiment may correspond to an example of operation S200 of FIG. 2. Accordingly, for convenience of explanation, a further description of processes and elements previously described with reference to FIG. 2 may be omitted herein.

In operation S500, first and second colors may be respectively assigned to first and second patterns. The first and second colors may be different colors and may respectively correspond to first and second masks. The first and second patterns may be different patterns included in the same layer. Hereinafter, a pattern to which the first color is assigned will be referred to as the first pattern, and a pattern to which the second color is assigned will be referred to as the second pattern.

In an exemplary embodiment, since color decomposition is performed using two colors (e.g., the first and second colors), the first and second patterns may be formed using two masks. Accordingly, the first and second patterns according to an exemplary embodiment may be formed using double patterning technology (DPT).

In operation S520, a first boundary space may be determined based on a first space. The first space may be the smallest distance between patterns assigned to the same color. The first boundary space may be a space between a first pattern adjacent to a first boundary and the first boundary. Herein, when a boundary space is described as being determined based on certain factors, it is understood that a value of the boundary space is being set based on the certain factors.

In operation S540, a second boundary space may be determined based on a second space to be different from the first boundary space. The second space may be the smallest space between patterns assigned to different colors. The second boundary space may be a space between a second pattern adjacent to the first boundary and the first boundary. In an exemplary embodiment, the second boundary space may be determined to be less than the first boundary space.

Referring to a general operation of designing a cell, cells to be placed adjacent to each other cannot typically be predicted. According to exemplary embodiment of the inventive concept, the first and second boundary spaces may be determined in two cells placed adjacent to each other at the first boundary such that patterns arranged on two sides of the first boundary satisfy first and second space conditions. The first and second boundary spaces satisfying first and second space conditions may be referred to herein as a boundary rule.

Figure 6A:
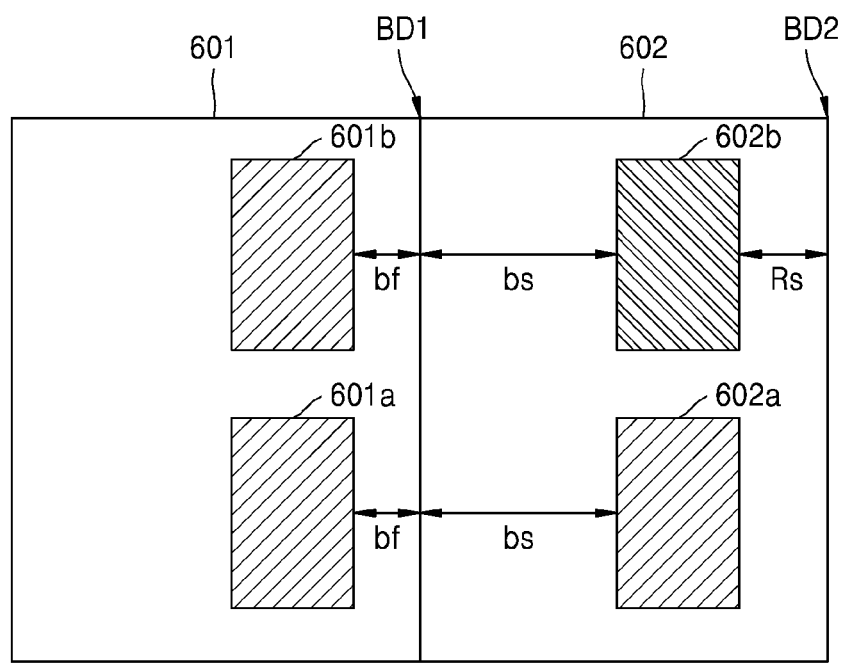
FIG. 6A is a diagram of an example of an IC including a cell that is designed according to a comparative example.

FIG. 6A illustrates an example of an IC including a cell designed according to a comparative example.

Referring to FIG. 6A, an IC 61 may include first and second standard cells 601 and 602 placed adjacent to a first boundary BD1. The first standard cell 601 may include first patterns 601a and 601b to which a first color is assigned. A distance bf between the first pattern 601a and the first boundary BD1 may be equal to a distance bf between the first pattern 601b and the first boundary BD1. For example, the distance bf may be 25. Herein, the distance bf may be expressed in arbitrary unit (a.u.), for example, nm, mm, μm or the like. The second standard cell 602 may include a first pattern 602a to which the first color is assigned and a second pattern 602b to which a second color is assigned. A distance bs between the first pattern 602a and the first boundary BD1 may be equal to a distance bs between the second pattern 602b and the first boundary BD1. For example, the distance bs may be 75. Herein, the distance bs may be expressed in arbitrary unit (a.u.), for example, nm, mm, μm or the like.

Since the first pattern 601a and the first pattern 602a arranged on two sides of the first boundary BD1 have the same color, the first patterns 601a and 602a should satisfy the first space condition. In the present example, since a distance between the first pattern 601a and the first pattern 602a is 100, the first patterns 601a and 602a satisfy the first space condition. Since the first pattern 601b and the second pattern 602b arranged on two sides of the first boundary BD1 have different colors, the first pattern 601b and the second pattern 602b should satisfy the second space condition. In the present example, since a distance between the first pattern 601b and the second pattern 602b is 100, the first pattern 601b and the second pattern 602b satisfies the second space condition. However, since a distance (e.g., 100) between the first pattern 601b and the second pattern 602b is much larger than the second space S2 (e.g., 50), spatial efficiency may be degraded.

Figure 6B:
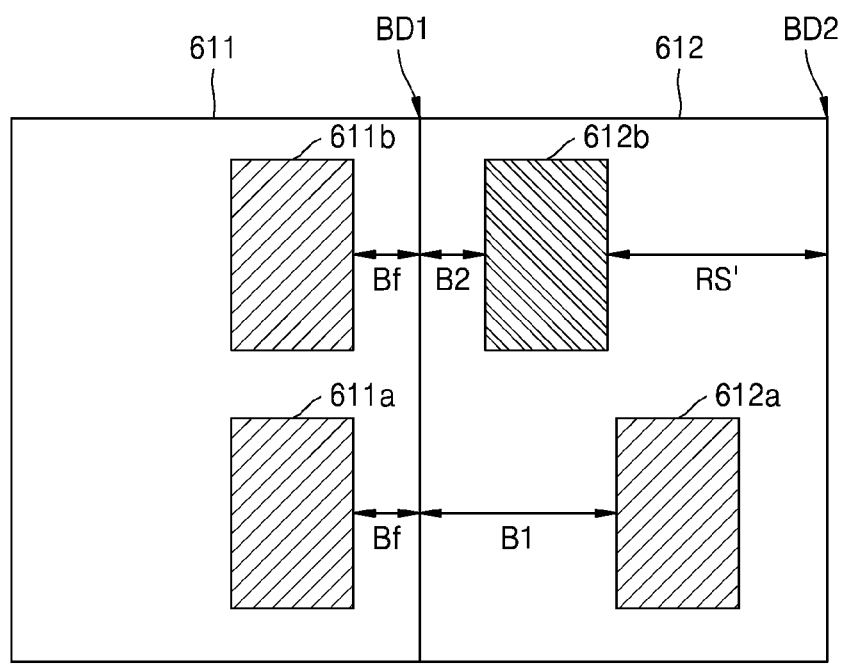
FIG. 6B is a diagram of an example of an IC including a cell that is designed according to an exemplary embodiment of the inventive concept.

FIG. 6B illustrates an example of an IC including a cell designed according to an exemplary embodiment of the inventive concept.

Referring to FIG. 6B, an IC 62 may include first and second standard cells 611 and 612 placed adjacent to each other at a first boundary BD1. The first standard cell 611 may include first patterns 611a and 611b to which a first color is assigned. A distance Bf between the first pattern 611a and the first boundary BD1 may be equal to a distance Bf between the first pattern 611b and the first boundary BD1. For example, the distance Bf may be 25. The second standard cell 612 may include a first pattern 612a to which the first color is assigned and a second pattern 612b to which a second color is assigned. A first boundary space B1 between the first pattern 612a and the first boundary BD1 may differ from a second boundary space B2 between the second pattern 612b and the first boundary BD1.

The second boundary space B2 may be determined to be smaller than the first boundary space B1. For example, the first boundary space B1 may be 75, and the first boundary space B2 may be 25. Accordingly, since a space between the first pattern 611b and the second pattern 612b that are arranged on two sides of the first boundary BD1 and have different colors is 50, the first pattern 611b and the second pattern 612b satisfies the second space condition and spatial efficiency may be improved.

A space RS' between a second boundary BD2 arranged opposite the first boundary BD1 and the second pattern 612b in the second standard cell 612 included in the IC 62 may be greater than a space RS between the second boundary BD2 arranged opposite the first boundary BD1 and the second pattern 602b in the second standard cell 602 included in the IC 61. Accordingly, in an exemplary embodiment, other patterns may be arranged in the space RS' in the second standard cell 612. That is, in exemplary embodiments, the additional space RS' in the second standard cell 612 may be utilized for other patterns. In an exemplary embodiment, a lengthwise size of the second standard cell 612 may be reduced. Thus, according to an exemplary embodiment, the area utilized in standard cells may be optimized with an increase in the space RS'.

FIGS. 7A to 7F illustrate examples of an IC including a cell designed according to an exemplary embodiment of the inventive concept.

Figure 7A:
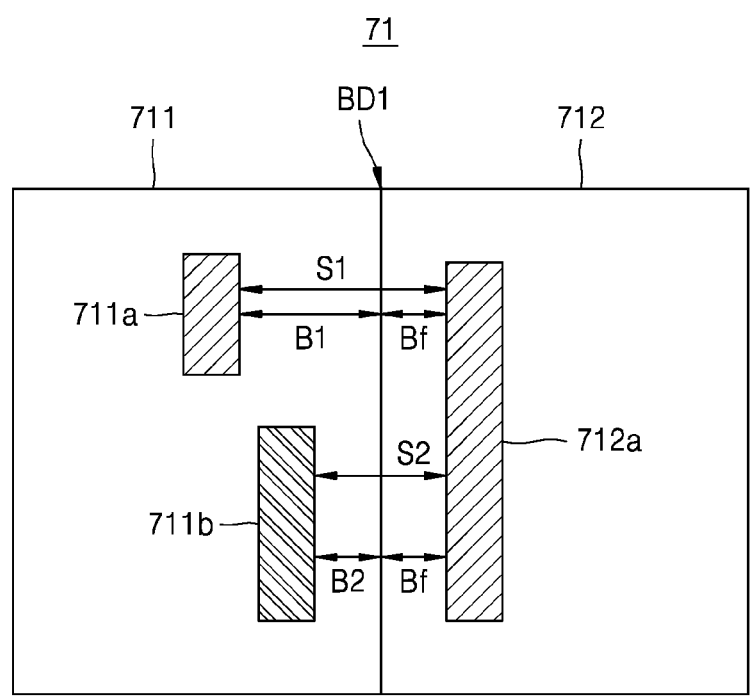
FIGS. 7A to 7F are diagrams of examples of an IC including a cell that is designed according to an exemplary embodiment of the inventive concept.

Referring to FIG. 7A, an IC 71 may include first and second standard cells 711 and 712 placed adjacent to each other at a first boundary BD1. The first standard cell 711 may include a first pattern 711a to which a first color is assigned and a second pattern 711b to which a second color is assigned. The second standard cell 712 may include a first pattern 712a to which the first color is assigned.

A direction in which the first and second patterns 711a and 711b extend in the first standard cell 711 may be substantially parallel to the first boundary BD1. In this case, the first and second patterns 711a and 711b may be referred to as vertical patterns. A first boundary space B1, which is a space between the first pattern 711a and the first boundary BD1, may differ from a second boundary space B2, which is a space between the first boundary BD1 and the second pattern 711b. The first boundary space B1 may be greater than the second boundary space B2.

Since the first color is assigned to the first pattern 711a and 712a arranged on two sides of the first boundary BD1, the first patterns 711a and 712a should satisfy a first space condition. In this case, a space between the first patterns 711a and 712a (e.g., the sum of a space Bf between the first pattern 712a and the first boundary BD1 and the first boundary space B1) may be a side-to-side space and may be equal to or greater than a first space S1.

Since the first and second colors are respectively assigned to the first pattern 712a and the second pattern 711b arranged on two sides of the first boundary BD1, the first pattern 712a and the second pattern 711b should satisfy a second space condition. In this case, a space between the first and second patterns 712a and 711b (e.g., the sum of a space Bf between the first pattern 712a and the first boundary BD1 and the second boundary space B2) may be a side-to-side space and may be equal to or greater than a second space S2.

Figure 7B:
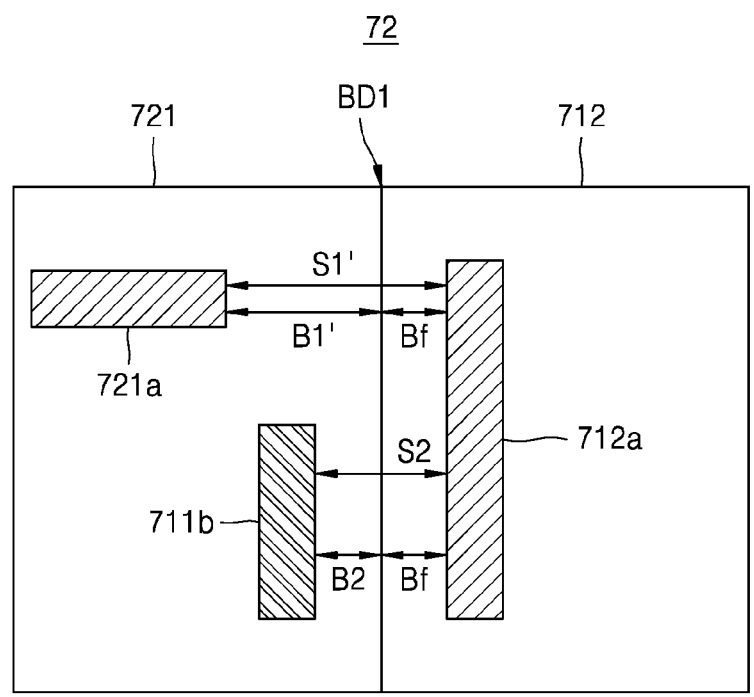

Referring to FIG. 7B, an IC 72 may include first and second standard cells 721 and 712 placed adjacent to each other at a first boundary BD1. The first standard cell 721 may include a first pattern 721a to which the first color is assigned and a second pattern 711b to which the second color is assigned. The second standard cell 712 may include a first pattern 712a to which the first color is assigned. The IC 72 may have substantially the same configuration as the IC 71 of FIG. 7A except for the first pattern 721a included in the first standard cell 721.

An extension direction of the first pattern 721a included in the first standard cell 721 may be substantially perpendicular to the first boundary BD1, and an extension direction of the second pattern 711b may be substantially parallel to the first boundary BD1. In this case, the first pattern 721a may be referred to as a horizontal pattern, and the second pattern 711b may be referred to as a vertical pattern. A first boundary space B1' may be greater than the first boundary space B1 shown in FIG. 7A.

Since the first color is assigned to the first patterns 721a and 712a arranged on two sides of the first boundary BD1, the first pattern 721a and 712a should satisfy the first space condition. In this case, a space between the first patterns 721a and 712a (e.g., the sum of a space Bf between the first pattern 712a and the first boundary BD1 and the first boundary space B1') may be a side-to-tip space and may be greater than a first space S1'. In this case, the first space S1' may be greater than the first space S1 of FIG. 7A.

Figure 7C:
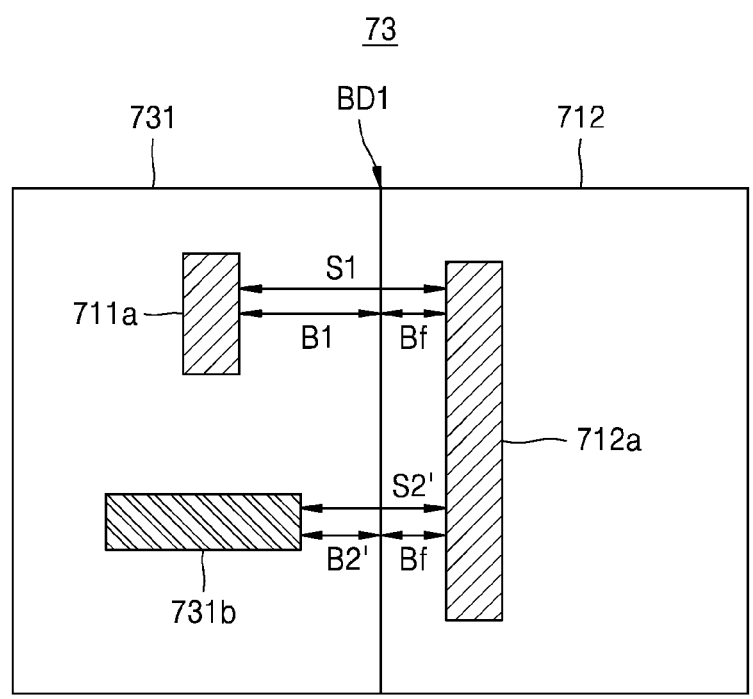

Referring to FIG. 7C, an IC 73 may include first and second standard cells 731 and 712 placed adjacent to each other at a first boundary BD1. The first standard cell 731 may include a first pattern 711a to which the first color is assigned and a second pattern 731b to which the second color is assigned. The second standard cell 712 may include a first pattern 712a to which the first color is assigned. The IC 73 according may have substantially the same configuration as the IC 71 of FIG. 7A except for a second pattern 731b included in the first standard cell 731.

An extension direction of the first pattern 711a included in the first standard cell 731 may be substantially parallel to the first boundary BD1, and an extension direction of the second pattern 731b may be substantially perpendicular to the first boundary BD1. A second boundary space B2' may be greater than the second boundary space B2 of FIG. 7A.

Since the first and second colors are respectively assigned to the first and second patterns 712a and 731b arranged on two sides of the first boundary BD1, the first and second patterns 712a and 731b should satisfy a second space condition. In this case, a space between the first and second patterns 712a and 731b (e.g., the sum of a space Bf between the first pattern 712a and the first boundary BD1 and a second boundary space B2') may be a side-to-tip space and may be greater than a second space ST. In this case, the second space ST may be equal to or greater than the second space S2 of FIG. 7A.

Figure 7D:
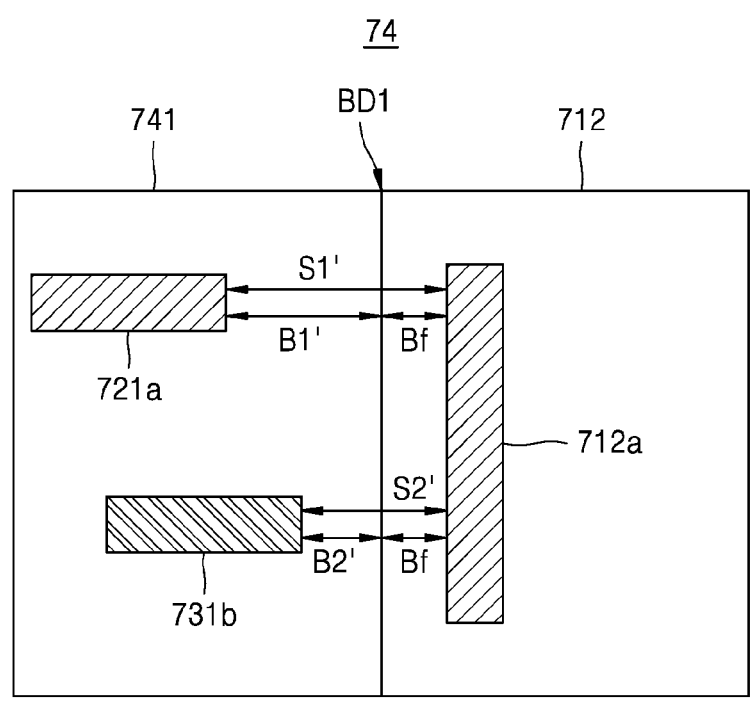

Referring to FIG. 7D, an IC 74 may include first and second standard cells 741 and 712 placed adjacent to each other at a first boundary BD1. The first standard cell 741 may include a first pattern 721a to which the first color is assigned and a second pattern 731b to which the second color is assigned. The second standard cell 712 may include a first pattern 712a to which the first color is assigned. The IC 74 may have substantially the same configuration as the IC 71 of FIG. 7A except for the first and second patterns 721a and 731b included in the first standard cell 721.

An extension direction of the first and second patterns 721a and 731b included in the first standard cell 741 may be substantially perpendicular to the first boundary BD1. A first boundary space B1' may be greater than the first boundary space B1 of FIG. 7A, and a second boundary space B2' may be greater than the second boundary space B2 of FIG. 7A.

Since the first color is assigned to the first patterns 721a and 712a arranged on two sides of the first boundary BD1, the first patterns 721a and 712a should satisfy a first space condition. In this case, a space between the first patterns 721a and 712a (e.g., the sum of a space Bf between the first pattern 712a and the first boundary BD1 and a first boundary space B1') may be a side-to-tip space and may be equal to or greater than a first space S1'. Since the first and second colors are respectively assigned to the first and second patterns 712a and 731b arranged on two sides of the first boundary BD1, the first and second patterns 712a and 731b should satisfy a second space condition. In this case, a space between the first and second patterns 712a and 731b (e.g., the sum of a space Bf between the first pattern 712a and the first boundary BD1 and a second boundary space B2') may be a side-to-tip space and may be equal to or greater than a second space S2'.

Figure 7E:
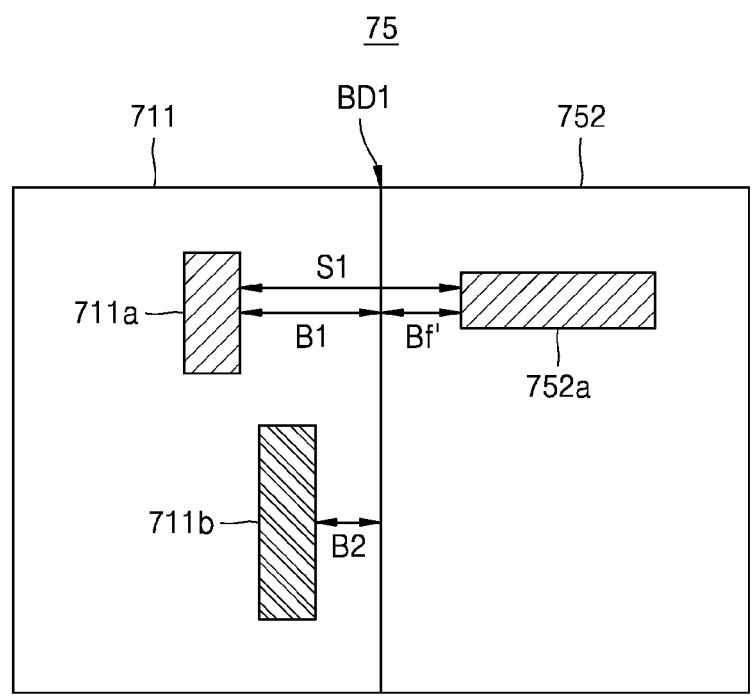

Referring to FIG. 7E, an IC 75 may include first and second standard cells 711 and 752 placed adjacent to each other at a first boundary BD1. The first standard cell 711 may include a first pattern 711a to which the first color is assigned and a second pattern 711b to which the second color is assigned. The second standard cell 752 may include a first pattern 752a to which the first color is assigned. The IC 75 may have substantially the same configuration as the IC 71 of FIG. 7A except for the first pattern 752a included in the second standard cell 752.

An extension of the first pattern 752a included in the second standard cell 752 may be substantially perpendicular to the first boundary BD1, and the first pattern 752a may be arranged adjacent to the first pattern 711a included in the first standard cell 711. A space Bf' between the first pattern 752a and the first boundary BD1 may be greater than the space Bf shown in FIG. 7A.

Since the first color is assigned to the first patterns 711a and 752a arranged on two sides of the first boundary BD1, the first patterns 711a and 752a should satisfy a first space condition. In this case, a space between the first patterns 711a and 752a (e.g., the sum of a space Bf' between the first pattern 752a and the first boundary BD1 and a first boundary space B1) may be a tip-to-side space and may be equal to or greater than a first space S1'.

Figure 7F:
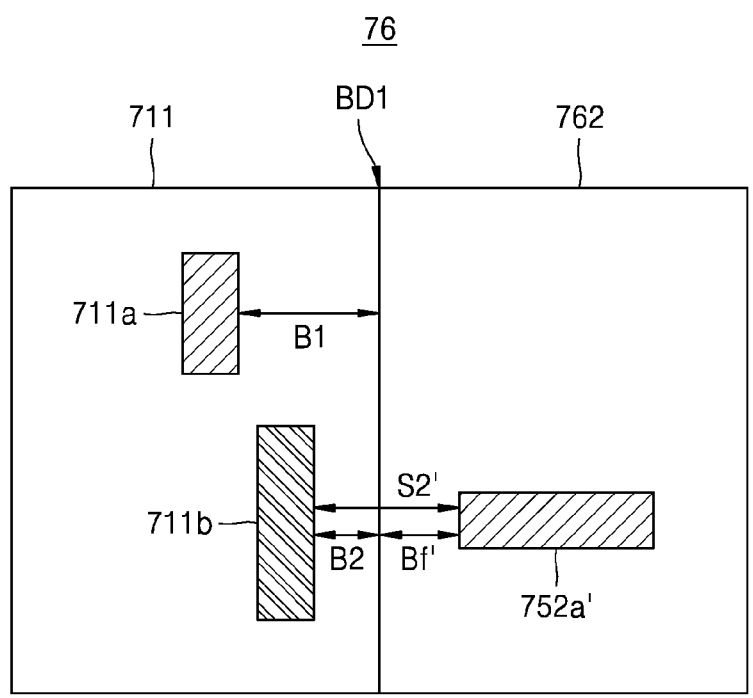

Referring to FIG. 7F, an IC 76 may include first and second standard cells 711 and 762 placed adjacent to each other at a first boundary BD1. The first standard cell 711 may include a first pattern 711a to which the first color is assigned and a second pattern 711b to which the second color is assigned. The second standard cell 762 may include a first pattern 752a' to which the first color is assigned. The IC 76 may have substantially the same configuration as the IC 71 of FIG. 7A except for the first pattern 752a' included in the second standard cell 762.

An extension direction of the first pattern 752a' included in the second standard cell 762 may be substantially per-pendicular to the first boundary BD1, and the first pattern 752a' may be arranged adjacent to the second pattern 711b included in the first standard cell 711. A space Bf' between the first pattern 752a' and the first boundary BD1 may be greater than the space Bf shown in FIG. 7A.

Since the first and second colors are respectively assigned to the first and second patterns 752a' and 711b arranged on two sides of the first boundary BD1, the first and second patterns 752a' and 711b should satisfy a second space condition. In this case, a space between the first and second patterns 752a' and 711b (e.g., the sum of a space Bf between the first pattern 752a' and the first boundary BD1 and a second boundary space B2) may be a tip-to-side space and may be equal to or greater than a second space S2'.

Figure 8:
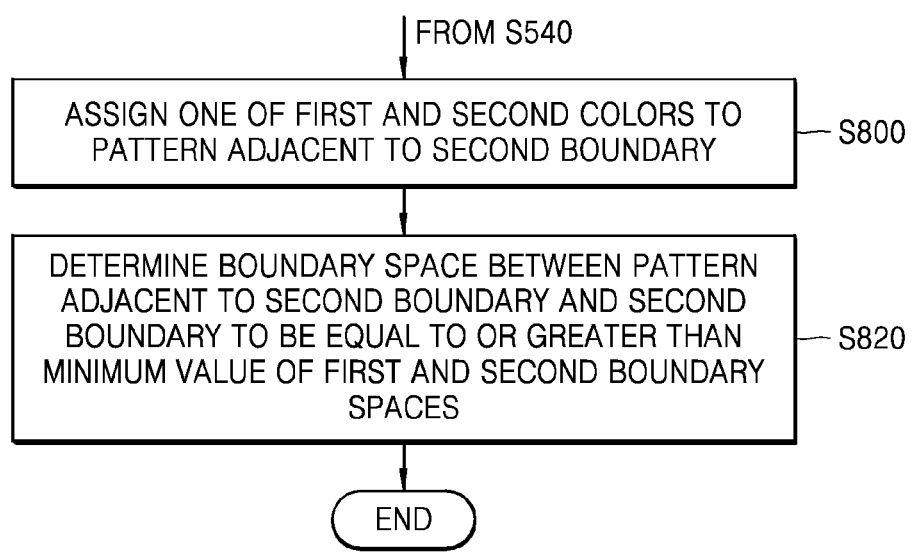
FIG. 8 is a flowchart of a modified example of a method of designing a cell according to an exemplary embodiment of the inventive concept.

FIG. 8 is a flowchart of a modified example of a method of designing a cell according to an exemplary embodiment of the inventive concept.

The method of designing a cell according to the exemplary embodiment of FIG. 8 may be performed after operation S540 of FIG. 5. Accordingly, for convenience of explanation, a further description of processes and elements previously described with reference to FIG. 5 may be omitted herein.

In operation S800, one of first and second colors may be assigned to a pattern arranged adjacent to a second boundary. The second boundary may be a boundary arranged opposite a first boundary in the same cell. In an exemplary embodiment, operation S800 may be substantially the same as operation S500 of FIG. 5. For example, the first boundary of FIG. 5 may be referred to as a right boundary, and first and second patterns adjacent to the first boundary may be referred to as right patterns. In this case, the second boundary may be referred to as a left boundary, and patterns adjacent to the second boundary may be referred to as left patterns. However, exemplary embodiments of the inventive concept are not limited thereto. For example, in an exemplary embodiment, the first boundary may be the left boundary and the second boundary may be the right boundary.

In operation S820, a boundary space between a pattern adjacent to the second boundary and the second boundary may be determined as equal to or greater than the smallest value of first and second boundary spaces. In this case, the first boundary space may be a space between a first right pattern adjacent to the first boundary and the first boundary, and the second boundary space may be a space between a second right pattern adjacent to the first boundary and the first boundary.

Figure 9:
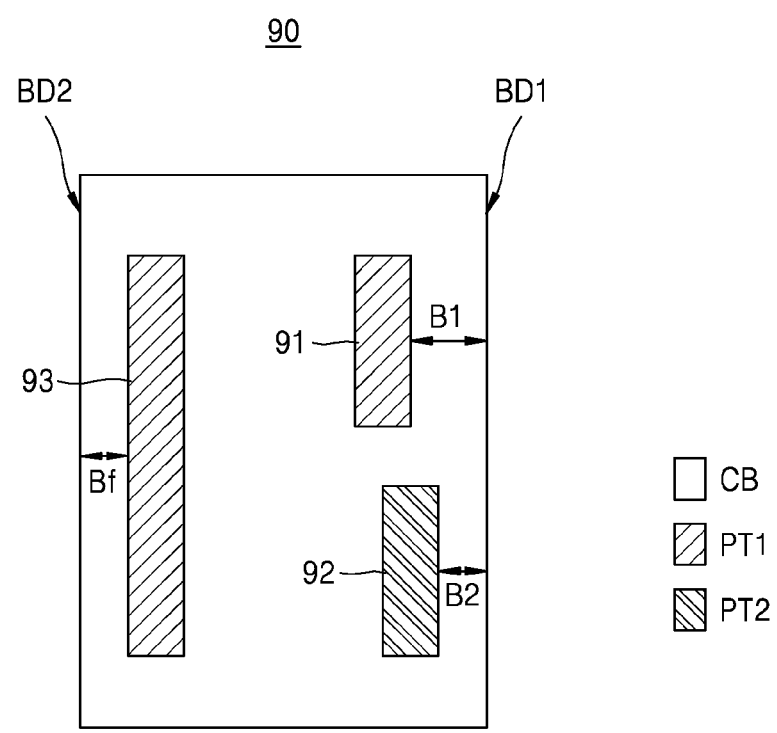
FIG. 9 illustrates an example of a cell designed using the method of FIG. 8 according to an exemplary embodiment of the inventive concept.

FIG. 9 illustrates an example of a cell designed using the method of FIG. 8 according to an exemplary embodiment of the inventive concept.

Referring to FIG. 9, the cell 90 may be defined by a cell boundary CB including a first boundary BD1 and a second boundary BD2. The first boundary BD1 may be referred to as a right boundary, and the second boundary BD2 may be referred to as a left boundary. The cell 90 may include a first right pattern 91 having a first color, a second right pattern 92 having a second color, and a left pattern 93 having the first color.

A first boundary space B1 between the first right pattern 91 and the first boundary BD1 may be greater than a second boundary space B2 between the second right pattern 92 and the first boundary BD1. However, exemplary embodiments of the inventive concept are not limited thereto. For example, in an exemplary embodiment, the first boundary space B1 between the first right pattern 91 and the first boundary BD1 may be less than the second boundary space B2 between the second right pattern 92 and the first boundary BD1.

A left boundary space Bf between the left pattern 93 and the second boundary BD2 may be determined to be equal to or greater than the smallest value of the first and second boundary spaces B1 and B2. Thus, in an operation of placing cells, first and second space conditions may be satisfied between patterns included in a cell to be placed adjacent to the cell 90 on the left side of the cell 90 and the left pattern 93 included in the cell 90.

Figure 10:
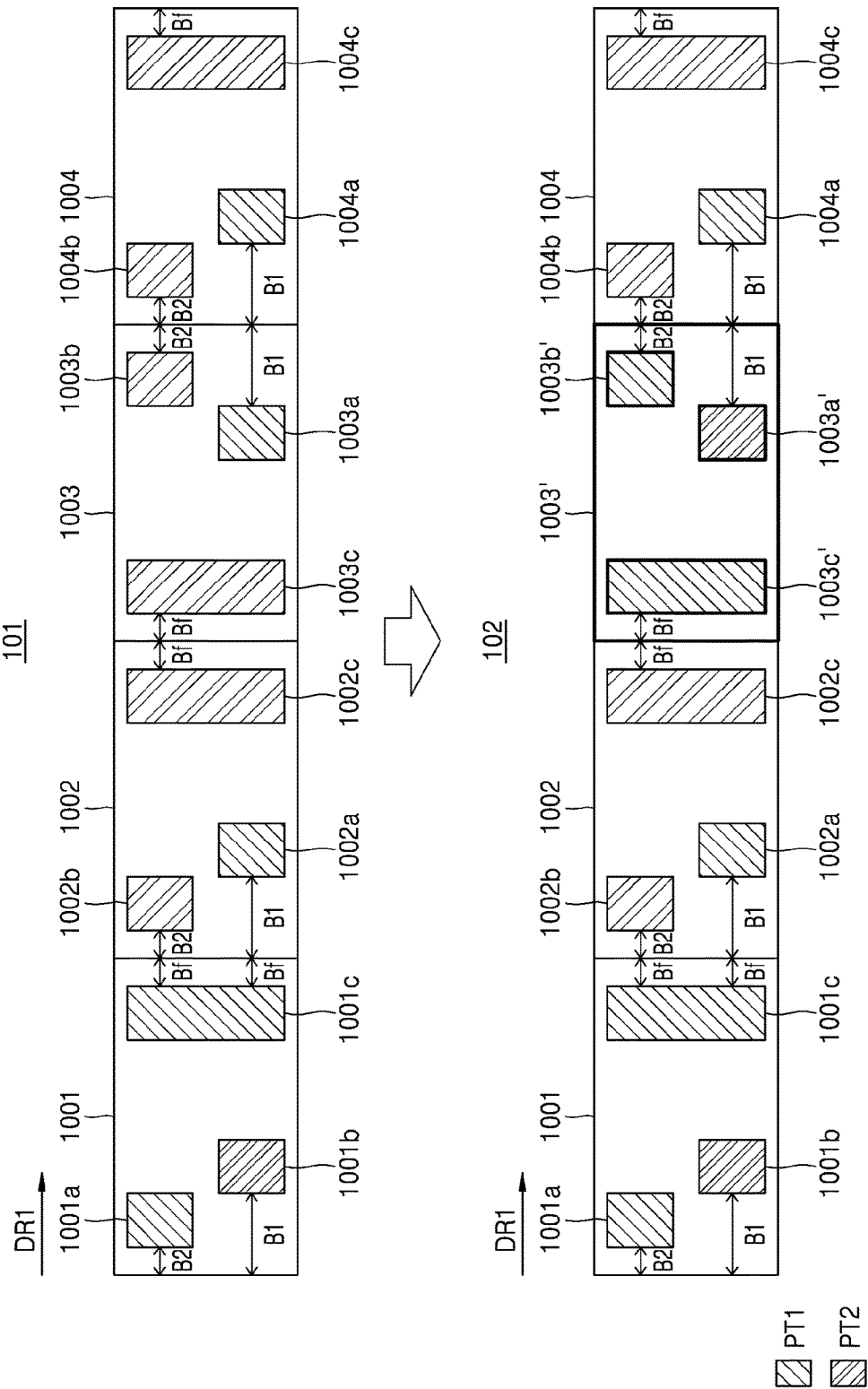
FIG. 10 is a diagram of an example of applying a color inverting operation to an IC according to an exemplary embodiment of the inventive concept.

FIG. 10 illustrates an example of applying a color inverting operation to an IC according to an exemplary embodiment of the inventive concept.

Referring to FIG. 10, the IC 101 may include first to fourth standard cells 1001 to 1004 placed along a first direction DR1. The first standard cell 1001 may include first and second left patterns 1001a and 1001b and a right pattern 1001c. A boundary space B2 (e.g., 25) of the first left pattern 1001a may be less than a boundary space B1 (e.g., 75) of the second left pattern 1001b. A boundary space Bf of the right pattern 1001c may be equal to or greater than the smallest value of left boundary spaces B1 and B2. For example, the boundary space Bf may be 25.

The second standard cell 1002 may include first and second left patterns 1002a and 1002b and a right pattern 1002c. The boundary space B1 (e.g., 75) of the first left pattern 1002a may be greater than the boundary space B2 (e.g., 25) of the second left pattern 1002b. The boundary space Bf of the right pattern 1002c may be equal to or greater than the smallest value of left boundary spaces B1 and B2. For example, the boundary space Bf may be 25.

In this case, since the right pattern 1001c and the first left pattern 1002a have the same color, a space between the right pattern 1001c and the first left pattern 1002a should satisfy a first space condition. In the present example, since a space between the right pattern 1001c and the first left pattern 1002a is 100, the space between the right pattern 1001c and the first left pattern 1002a satisfies a first space condition. Further, since the right pattern 1001c and the second left pattern 1002b have different colors, a space between the right pattern 1001c and the second left pattern 1002b should satisfy a second space condition. In the present example, since a space between the right pattern 1001c and the second left pattern 1002b is 50, the space between the right pattern 1001c and the second left pattern 1002b satisfies the second space condition.

The third standard cell 1003 may include first and second right patterns 1003a and 1003b and a left pattern 1003c, and the boundary space B1 (e.g., 75) of the first right pattern 1003a may be greater than the boundary space B2 (e.g., 25) of the second right pattern 1003b. The boundary space Bf of the left pattern 1003c may be equal to or greater than the smallest value of the right boundary spaces B1 and B2. For example, the boundary space Bf may be 25.

In this case, since the right pattern 1002c and the left pattern 1003c have the same color, a space between the right pattern 1002c and the left pattern 1003c should satisfy a first space condition. In the present example, since a space between the right pattern 1002c and the left pattern 1003c is 50, the space between the right pattern 1002c and the left pattern 1003c does not satisfy the first space condition. Accordingly, a color conflict occurs between the right pattern 1002c and the left pattern 1003c.

The fourth standard cell 1004 may include first and second left patterns 1004a and 1004b and a right pattern 1004c, and the boundary space B1 (e.g., 75) of the first left pattern 1004a may be greater than the boundary space B2 (e.g., 25) of the second left pattern 1004b. The boundary space Bf of the right pattern 1004c may be equal to or greater than the smallest value of the left boundary spaces B1 and B2. For example, the boundary space Bf may be 25.

In this case, since the second right pattern 1003b and the second left pattern 1004b have the same color, a space between the second right pattern 1003b and the second left pattern 1004b should satisfy a first space condition. In the present example, since a space between the second right pattern 1003b and the second left pattern 1004b is 50, the space therebetween does not satisfy the first space condition. Accordingly, a color conflict occurs between the second right pattern 1003b and the second left pattern 1004b.

An IC 102 may perform a color inverting operation on the third standard cell 1003 to solve the color conflict between the second standard cell 1002 and the third standard cell 1003, and the color conflict between the third standard cell 1003 and the fourth standard cell 1004. Thus, a left pattern 1003c' and a second right pattern 1003b' may be changed from a second color into a first color, and a first right pattern 1003a' may be changed from the first color into the second color.

Thus, the right pattern 1002c and the left pattern 1003c' may have different colors, and a space between the right pattern 1002c and the left pattern 1003c' may satisfy the second space condition, thus solving the color conflict. Further, the second right pattern 1003b' and the second left pattern 1004b may have different colors, and a space between the second right pattern 1003b' and the second left pattern 1004b may satisfy the second space condition, thus solving the color conflict.

Figure 11:
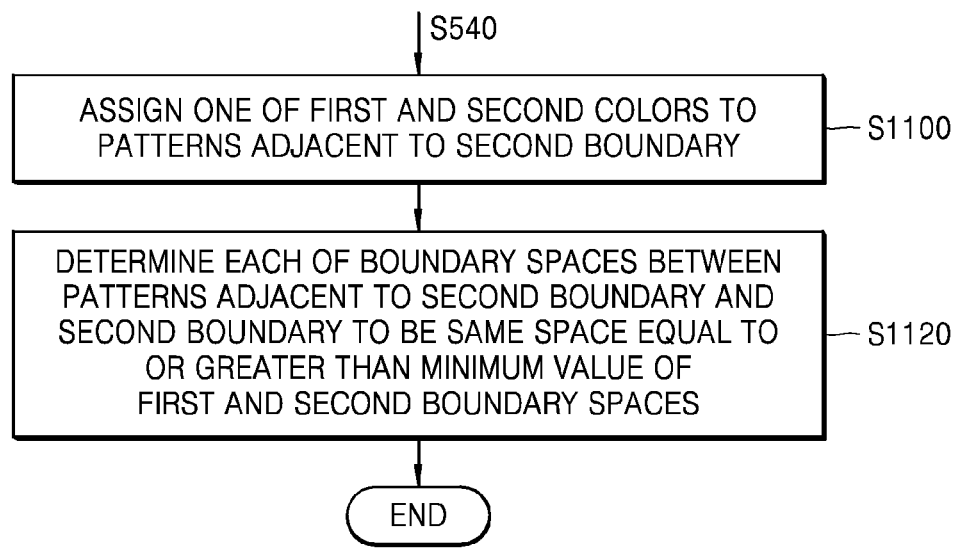
FIG. 11 is a flowchart of a modified example of a method of designing a cell according to an exemplary embodiment of the inventive concept.

FIG. 11 is a flowchart of a modified example of a method of designing a cell according to an exemplary embodiment of the inventive concept.

Referring to FIG. 11, the method of designing the cell according to the present exemplary embodiment may be performed after operation S540 of FIG. 5. Accordingly, for convenience of explanation, a further description of processes previously described may be omitted herein.

In operation S1100, one of first and second colors may be assigned to a pattern adjacent to a second boundary. In an exemplary embodiment, the second boundary may be a boundary arranged opposite a first boundary in the same cell. In an exemplary embodiment, operation S1100 may be substantially the same as operation S800 of FIG. 8. For example, the first boundary of FIG. 5 may be a right boundary, and first and second patterns adjacent to the first boundary may be referred to as right patterns. In this case, the second boundary may be a left boundary, and patterns adjacent to the second boundary may be referred to as left patterns. However, exemplary embodiments of the inventive concept are not limited thereto. For example, in an exemplary embodiment, the first boundary may be the left boundary, and the second boundary may be the right boundary.

In operation S1120, boundary spaces between the patterns adjacent to the second boundary and the second boundary may be determined as the same value, which is equal to or greater than the smallest value of first and second boundary spaces. In this case, the first boundary space may be a space between a first right pattern adjacent to the first boundary and the first boundary, and the second boundary space may be space between a second right pattern adjacent to the first boundary and the first boundary.

Figure 12:
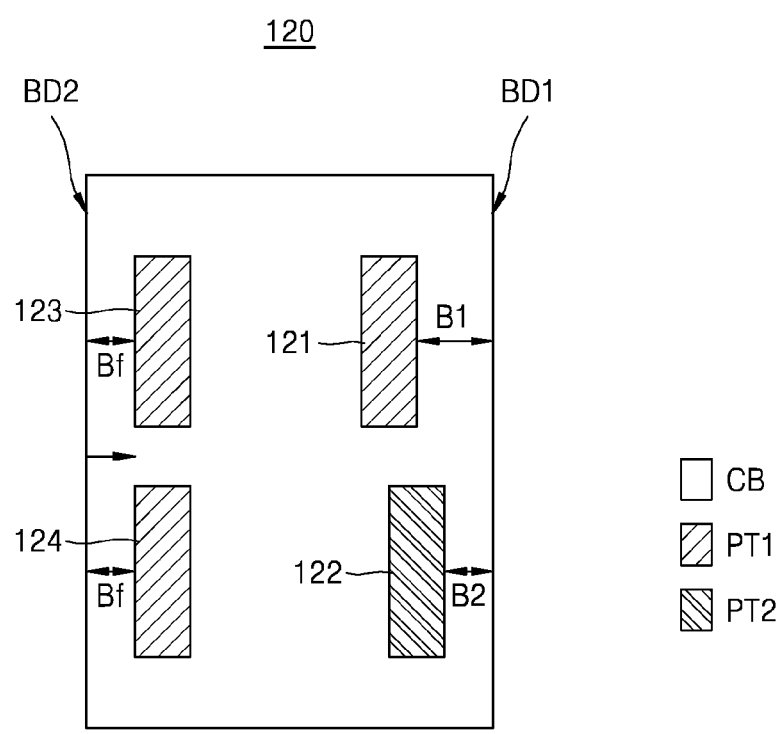
FIG. 12 illustrates an example of a cell designed using the method shown in FIG. 11 according to an exemplary embodiment of the inventive concept.

FIG. 12 illustrates an example of a cell designed using the method of FIG. 11 according to an exemplary embodiment of the inventive concept.

Referring to FIG. 12, the cell 120 may be defined by a cell boundary CB including a first boundary BD1 and a second boundary BD2. The first boundary BD1 may be referred to as the right boundary, and the second boundary BD2 may be referred to as the left boundary. The cell 120 may include a first right pattern 121 having a first color, a second right pattern 122 having a second color, and left patterns 123 and 124 having the first color. However, exemplary embodiments of the inventive concept are not limited thereto. For example, in an exemplary embodiment, the left patterns 123 and 124 may have the second color.

In an exemplary embodiment, a first boundary space B1 between the first right pattern 121 and the first boundary BD1 may be greater than a second boundary space B2 between the second right pattern 122 and the first boundary BD1. However, exemplary embodiments of the inventive concept are not limited thereto. For example, in an exemplary embodiment, the first boundary space B1 between the first right pattern 121 and the first boundary BD1 may be less than the second boundary space B2 between the second right pattern 122 and the first boundary B1.

In an exemplary embodiment, a first left boundary space Bf between the left pattern 123 and the second boundary BD2 may be equal to a second left boundary space Bf between the left pattern 124 and the second boundary BD2. In this case, the first and second left boundary spaces Bf may be determined to be equal to or greater than the smallest value of the first and second boundary spaces B1 and B2. Thus, in an operation of placing cells, first and second space conditions may be satisfied between patterns included in a cell to be placed adjacent to a left side of the cell 120 and the left patterns 123 and 124 included in the cell 120.

Figure 13:
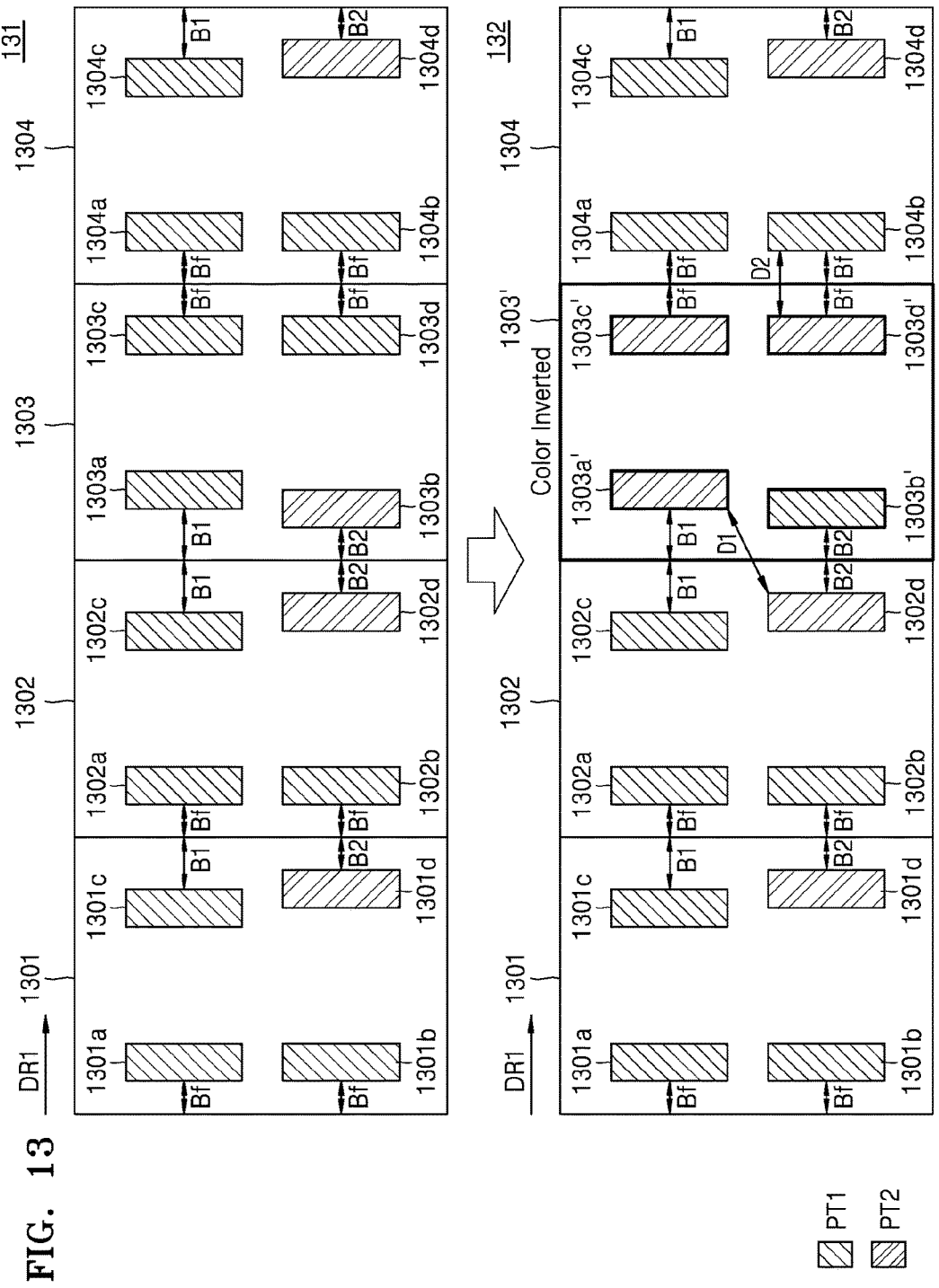
FIG. 13 illustrates an example of applying a color inverting operation to an IC according to an exemplary embodiment of the inventive concept.

FIG. 13 illustrates an example of applying a color inverting operation to ICs 32 according to an exemplary embodiment of the inventive concept.

Referring to FIG. 13, an IC 131 may include first to fourth standard cells 1301 to 1304 arranged along a first direction DR1. The first standard cell 1301 may include first and second left patterns 1301a and 1301b and first and second right patterns 1301c and 1301d. A boundary space B1 (e.g., 75) of the first right pattern 1301c may be greater than a boundary space B2 (e.g., 25) of the second right pattern 1301d. A boundary space Bf of the first and second left patterns 1301a and 1301b may be equal to or greater than the smallest value of the right boundary spaces B1 and B2. For example, the boundary space Bf may be 25.

The second standard cell 1302 may include first and second left patterns 1302a and 1302b and first and second right patterns 1302c and 1302d. The boundary space B1 (e.g., 75) of the first right pattern 1302c may be greater than the boundary space B2 (e.g., 25) of the second right pattern 1302d. The boundary space Bf of the first and second left patterns 1302a and 1302b may be equal to or greater than the smallest value of the right boundary spaces B1 and B2. For example, the boundary space Bf may be 25.

In this case, since the first right pattern 1301c and the first left pattern 1302a have the same color, a space between the first right pattern 1301c and the first left pattern 1302a should satisfy a first space condition. In the present example, since the space between the first right pattern 1301c and the first left pattern 1302a is 100, the space therebetween satisfies the first space condition. Further, since the second right pattern 1301d and the second left pattern 1302b have different colors, a space between the second right pattern 1301d and the second left pattern 1302b should satisfy a second space condition. In the present example, since a space between the second right pattern 1301d and the second left pattern 1302b is 50, the space therebetween satisfies the second space condition.

The third standard cell 1303 may include first and second left patterns 1303a and 1303b and first and second right patterns 1303c and 1303d. A boundary space B1 (e.g., 75) of the first left pattern 1303a may be greater than a boundary space B2 (e.g., 25) of the second left pattern 1303b. A boundary space Bf of the first and second right patterns 1303c and 1303d may be equal to or greater than the smallest value of the left boundary spaces B1 and B2. For example, the boundary space Bf may be 25.

In this case, since the first right pattern 1302c and the first left pattern 1303a have the same color, a space between the first right pattern 1302c and the first left pattern 1303a should satisfy a first space condition. In the present example, since a space between the first right pattern 1302c and the first left pattern 1303a is 150, the space therebetween satisfies the first space condition.

Since the second right pattern 1302d and the second left pattern 1303b have the same color, a space between the second right pattern 1302d and the second left pattern 1303b should satisfy a first space condition. In the present example, since the space between the second right pattern 1302d and the second left pattern 1302b is 50, the space therebetween does not satisfy the first space condition. Accordingly, a color conflict occurs between the second right pattern 1302d and the second left pattern 1303b.

The fourth standard cell 1304 may include first and second left patterns 1304a and 1304b and first and second right patterns 1304c and 1304d. A boundary space B1 (e.g., 75) of the first right pattern 1304c may be greater than a boundary space B2 (e.g., 25) of the second right pattern 1304d. A boundary space Bf of the first and second left patterns 1304a and 1304b may be equal to or greater than the smallest value of the right boundary spaces B1 and B2. For example, the boundary space Bf may be 25.

The IC 132 may perform a color inverting operation on the third standard cell 1303 to solve the color conflict between the second standard cell 1302 and the third standard cell 1303, and the color conflict between the third standard cell 1303 and the fourth standard cell 1304. Thus, a first left pattern 1303a' and first and second right patterns 1303c' and 1303d' may be changed from a first color into a second color, and a second left pattern 1303b' may be changed from a second color into a first color.

Thus, the second right pattern 1302d and the second left pattern 1303b' may have different colors, and a space between the second right pattern 1302d and the second left pattern 1303b' may satisfy a second space condition, thus solving the color conflict. Further, the first right pattern 1303c' and the first left pattern 1304a may have different colors, and a space between the first right pattern 1303c' and the first left pattern 1304a may satisfy the second space condition, thus solving the color conflict. Further, the second right pattern 1303d' and the second left pattern 1304b may have different colors, and a space between the second right pattern 1303d' and the second left pattern 1304b may satisfy the second space condition, thus solving the color conflict.

Figure 14:
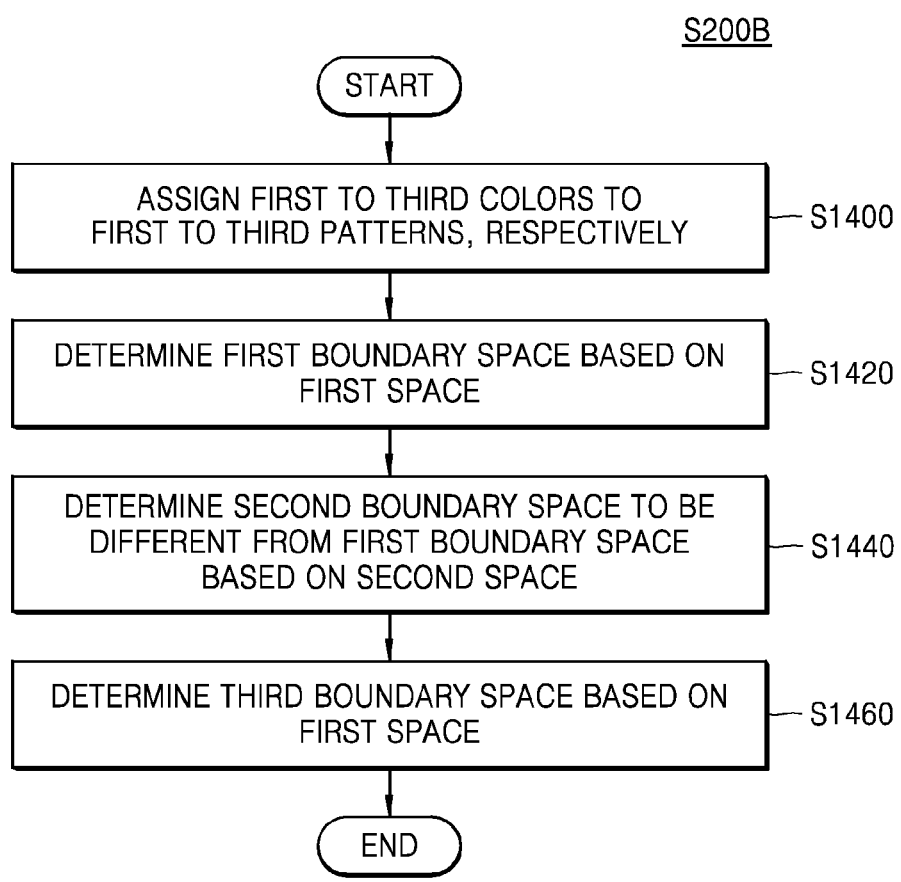
FIG. 14 is a flowchart of a method of designing a cell according to an exemplary embodiment of the inventive concept.

FIG. 14 is a flowchart of a method S200B of designing a cell according to an exemplary embodiment of the inventive concept.

Referring to FIG. 14, the method S200B of designing the cell according to the present exemplary embodiment may correspond to one example of operation S200 of FIG. 2. Accordingly, for convenience of explanation, a further description of processes and elements previously described with reference to FIG. 2 may be omitted herein.

In operation S1400, first to third colors may be respectively assigned to first to third patterns. The first to third colors may be different from one another and respectively correspond to first to third masks. The first to third patterns may be different patterns included in the same layer. Hereinafter, a pattern to which a first color is assigned will be referred to as a first pattern (e.g., PT1), a pattern to which a second color is assigned will be referred to as a second pattern (e.g., PT2), and a pattern to which a third color is assigned will be referred to as a third pattern (e.g., PT3).

In an exemplary embodiment, since a color decomposition process is performed using three colors (e.g., first to third colors), the first to third patterns may be formed using three masks. Accordingly, the first to third patterns according to an exemplary embodiment may be formed using triple patterning technology (TPT).

In operation S1420, a first boundary space may be determined based on a first space. The first space may be a smallest space between patterns to which the same color is assigned. The first boundary space may be a space between the first pattern adjacent to a first boundary and the first boundary.

In operation S1440, a second boundary space may be determined to be different from the first boundary space based on a second space. The second space may be the smallest space between patterns to which different colors are assigned. The second boundary space may be a space between the second pattern adjacent to the first boundary and the first boundary. In an exemplary embodiment, the second boundary space may be determined to be less than the first boundary space.

Referring to a general operation of designing a cell, cells to be placed adjacent to each other cannot typically be predicted. According to exemplary embodiments of the inventive concept, when two cells are placed adjacent to each other at the first boundary, the first and second boundary spaces may be determined such that patterns arranged on two sides of the first boundary satisfy the first and second space conditions.

In operation S1460, a third boundary space may be determined based on the first space. In an exemplary embodiment, the third boundary space may be equal to or greater than the second boundary space and equal to or less than the first boundary space.

Figure 15:
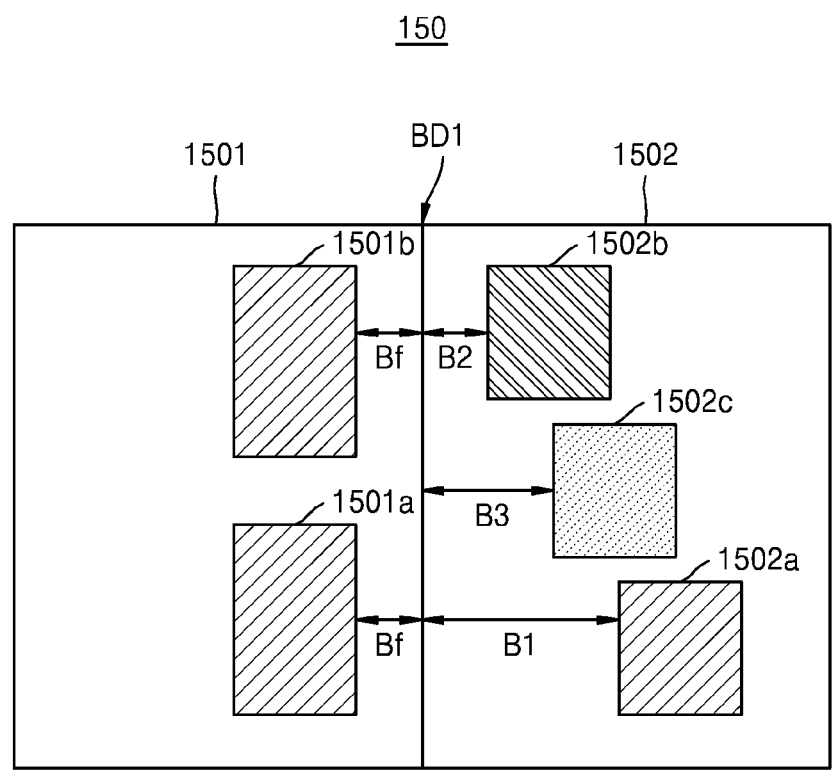
FIG. 15 illustrates an example of an IC including the cell designed using the method shown in FIG. 14 according to an exemplary embodiment of the inventive concept.

FIG. 15 illustrates an example of an IC including a cell designed using the method of FIG. 14.

Referring to FIG. 15, an IC 150 may include first and second standard cells 1501 and 1502 placed adjacent to each other at a first boundary BD1. The first standard cell 1501 may include first patterns 1501a and 1501b to which a first color is assigned. A space Bf between the first pattern 1501a and the first boundary BD1 may be equal to the space Bf between the first pattern 1501b and the first boundary BD1. For example, the space Bf may be 25.

The second standard cell 1502 may include a first pattern 1502a to which the first color is assigned, a second pattern 1502b to which a second color is assigned, and a third pattern 1502c to which a third color is assigned. A space between the first pattern 1502a and the first boundary BD1 may be a first boundary space B1, a space between the second pattern 1502b and the first boundary BD1 may be a second boundary space B2, and a space between the third pattern 1502c and the first boundary BD1 may be a third boundary space B3. At least two of the first to third boundary spaces B1, B2, and B3 may be different from each other.

According to an exemplary embodiment, the second boundary space B2 may be determined to be less than the first boundary space B1. For example, the first boundary space B1 may be 75, and the second boundary space B2 may be 25. Further, the third boundary space B3 may be determined to be equal to or greater than the second boundary space B2 and equal to or less than the first boundary space B1. For example, the third boundary space B3 may be 50.

According to the present exemplary embodiment, since a space between the first patterns 1501a and 1502a that are arranged on two sides of the first boundary BD1 and have the same color is 100, the space therebetween satisfies a first space condition. Further, since a space between the first pattern 1501b and the second pattern 1502b that are arranged on two sides of the first boundary BD1 and have different colors is 50, the space therebetween satisfies a second space condition.

Figure 16:
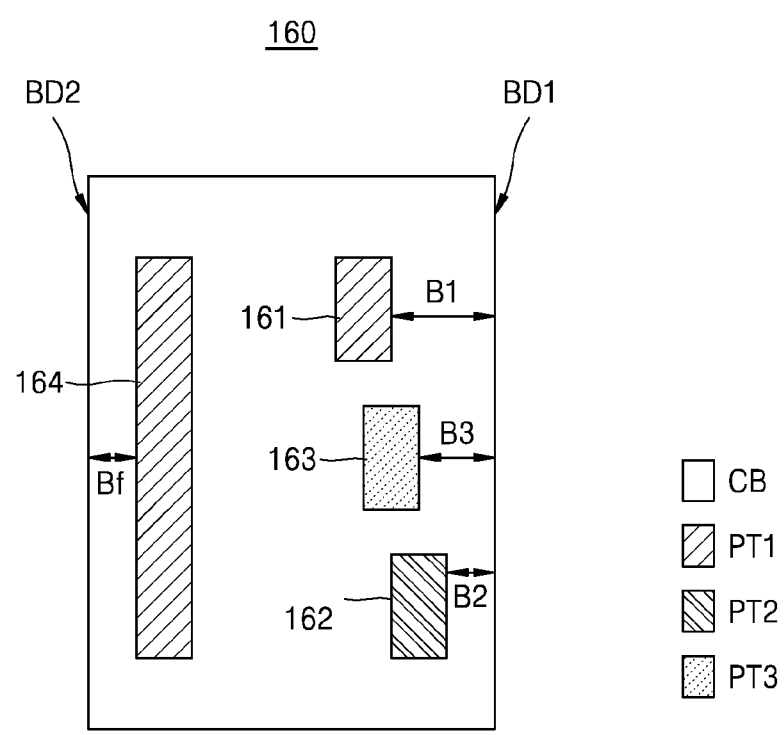
FIG. 16 illustrates an example of a cell designed using the method shown in FIG. 14 according to an exemplary embodiment of the inventive concept.

FIG. 16 illustrates an example of a cell designed using the method of FIG. 14 according to an exemplary embodiment of the inventive concept.

Referring to FIG. 16, the cell 160 may be defined by a cell boundary CB including a first boundary BD1 and a second boundary BD2. The first boundary BD1 may be referred to as a right boundary, and the second boundary BD2 may be referred to as a left boundary. The cell 160 may include a first right pattern 161 having a first color, a second right pattern 162 having a second color, a third right pattern 163 having a third color, and a left pattern 164 having the first color. However, exemplary embodiments of the inventive concept are not limited thereto. For example, in an exemplary embodiment, the left pattern 164 may have the second color or the third color.

The first to third right patterns 161, 162, and 163 may be generated using the method of FIG. 14. In an exemplary embodiment, a first boundary space B1 between the first right pattern 161 and the first boundary BD1 may be greater than a second boundary space B2 between the second right pattern 162 and the first boundary BD1. However, exemplary embodiments of the inventive concept are not limited thereto. For example, in an exemplary embodiment, the first boundary space B1 between the first right pattern 161 and the first boundary BD1 may be less than the second boundary space B2 between the second right pattern 162 and the first boundary B1.

In an exemplary embodiment, a third boundary space B3 between the third right pattern 163 and the first boundary BD1 may be equal to or greater than the second boundary space B2 and equal to or less than the first boundary space B1. In an exemplary embodiment, when the second boundary space B2 is greater than the first boundary space B1, the third boundary space B3 may be equal to or greater than the first boundary space B1 and equal to or less than the second boundary space B2.

The left pattern 164 may be generated using a method that is substantially similar to the method of FIG. 8. For example, initially, one of first to third colors may be assigned to the left pattern 164 adjacent to the second boundary BD2. Thereafter, a boundary space Bf between the left pattern 164 adjacent to the second boundary BD2 and the second boundary BD2 may be determined to be equal to or larger than the smallest value of the first to third boundary spaces B1, B2, and B3. Thus, in an operation of placing cells, first and second space conditions may be satisfied between patterns included in a cell to be placed adjacent to a left side of the cell 160 and the left pattern 164 included in the cell 160.

Figure 17:
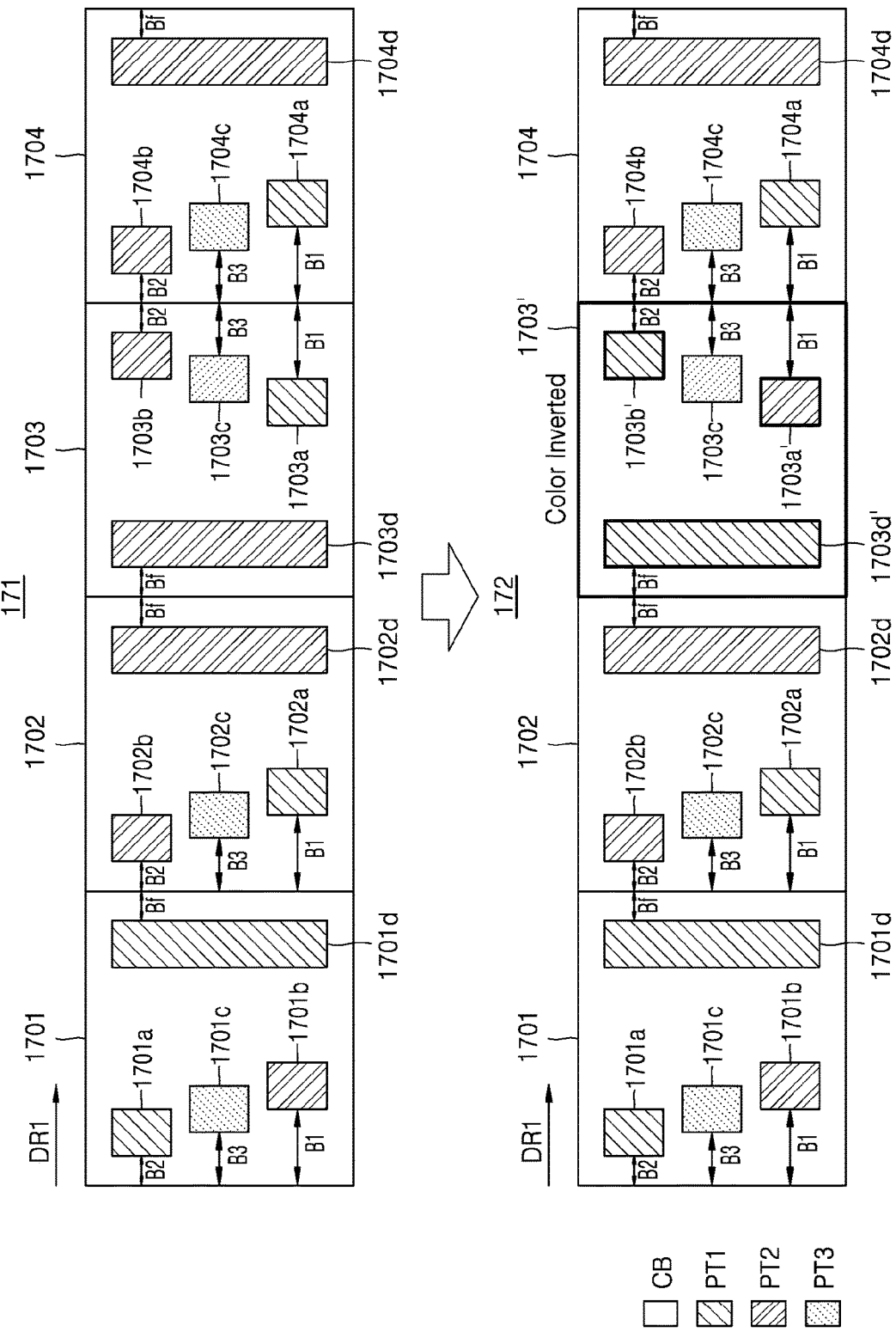
FIG. 17 illustrates an example of applying a color inverting operation to an IC including the cell shown in FIG. 16 according to an exemplary embodiment of the inventive concept.

FIG. 17 illustrates an example of applying a color inverting operation to an IC including the cell shown in FIG. 16 according to an exemplary embodiment of the inventive concept.

Referring to FIG. 17, an IC 171 may include first to fourth standard cells 1701 to 1704 arranged along a first direction DR1. The first standard cell 1701 may include first to third left patterns 1701a to 1701c and a right pattern 1701d. A boundary space B3 (e.g., 50) of the third left pattern 1701c may be greater than a boundary space B2 (e.g., 25) of the first left pattern 1701a and less than a boundary space B1 (e.g., 75) of the second left pattern 1701b. A boundary space Bf of the right pattern 1701d may be equal to or greater than the smallest value of the left boundary spaces B1, B2, and B3. For example, the boundary space Bf may be 25.

The second standard cell 1702 may include first to third left patterns 1702a to 1702c and a right pattern 1702d. The boundary space B3 (e.g., 50) of the third left pattern 1702c may be greater than the boundary space B2 (e.g., 25) of the second left pattern 1702b and less than the boundary space B1 (e.g., 75) of the first left pattern 1702a. The boundary space Bf of the right pattern 1702d may be the smallest value of the left boundary spaces B1, B2, and B3. For example, the boundary space Bf may be 25.

In this case, since the right pattern 1701d and the first left pattern 1702a have the same color, a space between the right pattern 1701d and the first left pattern 1702a should satisfy a first space condition. In the present example, since the space between the right pattern 1701d and the first left pattern 1702a is 100, the space therebetween satisfies the first space condition. Further, since the right pattern 1701d and the second left pattern 1702b have different colors, a space between the right pattern 1701d and the second left pattern 1702b should satisfy a second space condition. In the present example, since a space between the right pattern 1701d and the second left pattern 1702b is 50, the space therebetween satisfies the second space condition.

The third standard cell 1703 may include first to third right patterns 1703a to 1703c and a left pattern 1703d. The boundary space B3 (e.g., 50) of the third right pattern 1703c may be greater than the boundary space B2 (e.g., 25) of the second right pattern 1703b and less than the boundary space B1 (e.g., 75) of the first right pattern 1703a. The boundary space Bf of the left pattern 1703d may be equal to or greater than the smallest value of the right boundary spaces B1, B2, and B3. For example, the boundary space Bf may be 25.

In this case, since the right pattern 1702d and the left pattern 1703d have the same color, a space between the right pattern 1702d and the left pattern 1703d should satisfy the first space condition. In the present example, since the space between the right pattern 1702d and the left pattern 1703d is 50, the space therebetween does not satisfy the first space condition. Accordingly, a color conflict occurs between the right pattern 1702d and the left pattern 1703d.

The fourth standard cell 1704 may include first to third left patterns 1704a to 1704c and a right pattern 1704d. A boundary space B3 (e.g., 50) of the third left pattern 1704c may be greater than a boundary space B2 (e.g., 25) of the second left pattern 1704b and less than a boundary space B1 (e.g., 75) of the first left pattern 1704a. A boundary space Bf of the right pattern 1704d may be equal to or greater than the smallest value of the left boundary spaces B1, B2, and B3. For example, the boundary space Bf may be 25.

In this case, since the second right pattern 1703b and the second left pattern 1704b have the same color, a space between the second right pattern 1703b and the second left pattern 1704b should satisfy the first space condition. In the present example, since the space between the second right pattern 1703b and the second left pattern 1704b is 50, the space therebetween does not satisfy the first space condition. Accordingly, a color conflict occurs between the second right pattern 1703b and the second left pattern 1704b.

Since the third right pattern 1703c and the third left pattern 1704c have the same color, a space between third right pattern 1703c and the third left pattern 1704c should satisfy the first space condition. In the present example, since a space between the third right pattern 1703c and the third left pattern 1704c is 100, the space therebetween satisfies the first space condition. Similarly, since the space between the first right pattern 1703a and the first left pattern 1704a is 150, the space therebetween satisfies the first space condition.

An IC 172 may perform a color inverting operation on the third standard cell 1703 to solve a color conflict between the second standard cell 1702 and the third standard cell 1703, and a color conflict between the third standard cell 1703 and the fourth standard cell 1704. In the present exemplary embodiment, a color inverting operation may be performed between the first color and the second color, and a color inverting operation may not be performed on the third color. Thus, a left pattern 1703d' and a second right pattern 1703b' may be changed from the second color into the first color, and a first right pattern 1703a' may be changed from the first color into the second color.

Thus, the right pattern 1702d and the left pattern 1703d' may have different colors, and a space between the right pattern 1702d and the left pattern 1703d' may satisfy the second space condition. As a result, a color conflict may be solved. Further, the second right pattern 1703b' and the second left pattern 1704b may have different colors, and a space between the second right pattern 1703b' and the second left pattern 1704b may satisfy the second space condition. As a result, a color conflict may be solved.

Figure 18:
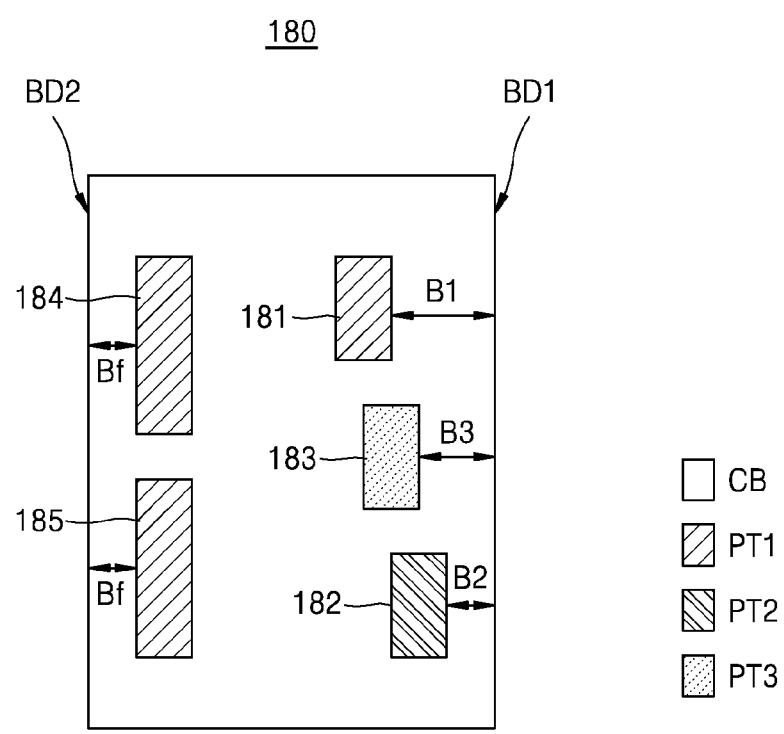
FIG. 18 illustrates an example of a cell designed using the method of FIG. 14 according to an exemplary embodiment of the inventive concept.

FIG. 18 illustrates an example of a cell designed using the method of FIG. 14 according to an exemplary embodiment of the inventive concept.

Referring to FIG. 18, the cell 180 may be defined by a cell boundary CB including a first boundary BD1 and a second boundary BD2. The first boundary BD1 may be referred to as a right boundary, and the second boundary BD2 may be referred to as a left boundary. The cell 180 may include a first right pattern 181 having a first color, a second right pattern 182 having a second color, a third right pattern 183 having a third color, and first and second left patterns 184 and 185 having the first color. However, exemplary embodiments of the inventive concept are not limited thereto. For example, in an exemplary embodiment, the first and second left patterns 184 and 185 may have the second color or the third color.

The first to third right patterns 181, 182, and 183 may be generated using the method of FIG. 14. In an exemplary embodiment, a first boundary space B1 between the first right pattern 181 and the first boundary BD1 may be greater than a second boundary space B2 between the second right pattern 182 and the first boundary BD1. However, exemplary embodiments of the inventive concept are not limited thereto. For example, in an exemplary embodiment, the first boundary space B1 between the first right pattern 181 and the first boundary BD1 may be less than the second boundary space B2 between the second right pattern 182 and the first boundary BD1.

In an exemplary embodiment, a third boundary space B3 between the third right pattern 183 and the first boundary BD1 may be equal to or greater than the second boundary space B2 and equal to or less than the first boundary space B1. In an exemplary embodiment, when the second boundary space B2 is greater than the first boundary space B1, the third boundary space B3 may be equal to or greater than the first boundary space B1 and equal to or less than the second boundary space B2.

The first and second left patterns 184 and 185 may be generated using a substantially similar method to the method described with reference to FIG. 11. For example, initially, one of the first to third colors may be assigned to the first and second left patterns 184 and 185 adjacent to the second boundary BD2. Thereafter, boundary spaces Bf between the first and second left patterns 184 and 185 adjacent to the second boundary BD2 and the second boundary BD2 may be determined to be equal to each other and equal to or greater than the smallest value of the first to third boundary spaces B1, B2, and B3. Thus, in an operation of placing cells, first and second space conditions may be satisfied between patterns included in a cell to be placed adjacent to a left side of the cell 180 and the first and second left patterns 184 and 185 included in the cell 180.

Figure 19:
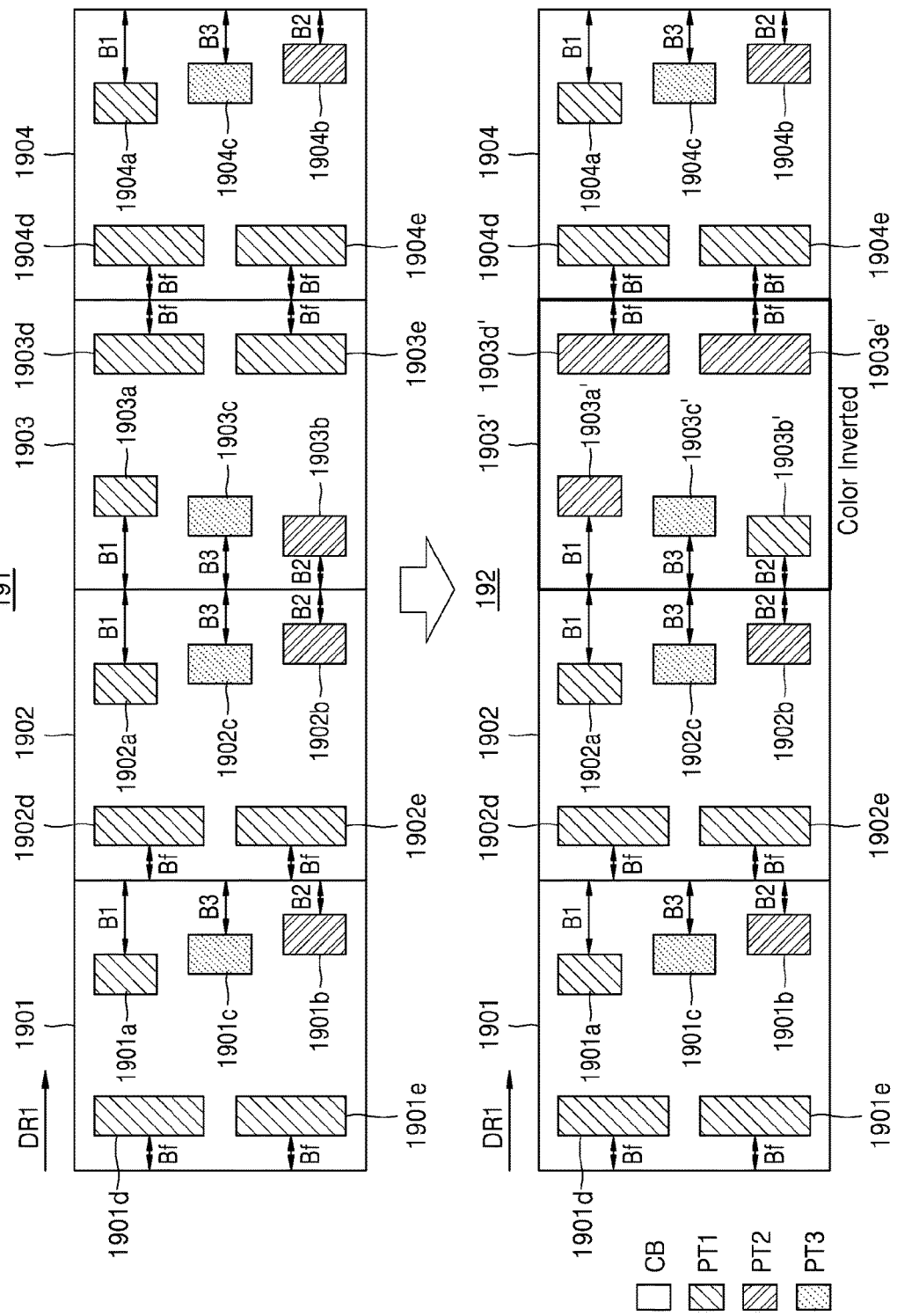
FIG. 19 illustrates an example of applying a color inverting operation to an IC including the cell shown in FIG. 18 according to an exemplary embodiment of the inventive concept.

FIG. 19 illustrates an example of applying a color inverting operation to an IC including the cell shown in FIG. 18 according to an exemplary embodiment of the inventive concept.

Referring to FIG. 19, an IC 191 may include first to fourth standard cells 1901 to 1904 arranged along a first direction DR1. The first standard cell 1901 may include first to third right patterns 1901a to 1901c and first and second left patterns 1901d and 1901e. A boundary space B3 (e.g., 50) of the third right pattern 1901c may be greater than a boundary space B2 (e.g., 25) of the second right pattern 1901b and less than a boundary space B1 (e.g., 75) of the first right pattern 1901a. A boundary space Bf of the first and second left patterns 1901d and 1901e may be equal to or greater than the smallest value of the right boundary spaces B1, B2, and B3. For example, the boundary space Bf may be 25.

The second standard cell 1902 may include first to third right patterns 1902a to 1902c and first and second left patterns 1902d and 1902e. The boundary space B3 (e.g., 50) of the third right pattern 1902c may be greater than the boundary space B2 (e.g., 25) of the second right pattern 1902b and less than the boundary space B1 (e.g., 75) of the first right pattern 1902a. The boundary space Bf of the first and second left patterns 1902d and 1902e may be equal to or greater than the smallest value of the right boundary spaces B1, B2, and B3. For example, the boundary space Bf may be 25.

In this case, since the first right pattern 1901a and the first left pattern 1902d have the same color, a space between the first right pattern 1901a and the first left pattern 1902d should satisfy a first space condition. In the present example, since the space between the first right pattern 1901a and the first left pattern 1902d is 100, the space therebetween satisfies the first space condition. Further, since the second right pattern 1901b and the second left pattern 1902e have different colors, a space between the second right pattern 1901b and the second left pattern 1902e should satisfy a second space condition. In the present example, since a space between the second right pattern 1901b and the second left pattern 1902e is 50, the space therebetween satisfies the second space condition.

The third standard cell 1903 may include first to third left patterns 1903a to 1903c and first and second right patterns 1903d and 1903e. A boundary space B3 (e.g., 50) of the third left pattern 1903c may be greater than the boundary space B2 (e.g., 25) of the second left pattern 1903b and less than the boundary space B1 (e.g., 75) of the first left pattern 1903a. A boundary space Bf of the first and second right patterns 1903d and 1903e may be equal to or greater than the smallest value of the left boundary spaces B1, B2, and B3. For example, the boundary space Bf may be 25.

In this case, since the second right pattern 1902b and the second left pattern 1903b have the same color, a space between the second right pattern 1902b and the second left pattern 1903b should satisfy a first space condition. In the present example, since the space between the second right pattern 1902b and the second left pattern 1903b is 50, the space therebetween does not satisfy the first space condition. Accordingly, a color conflict occurs between the second right pattern 1902b and the second left pattern 1903b.

Since the third right pattern 1902c and the third left pattern 1903c have the same color, a space between the third right pattern 1902c and the third left pattern 1903c should satisfy the first space condition. In the present example, since the space between the third right pattern 1902c and the third left pattern 1903c is 100, the space therebetween satisfies the first space condition. Similarly, since a space between the first right pattern 1902a and the first left pattern 1903a is 150, the space therebetween satisfies the first space condition.

The fourth standard cell 1904 may include first to third right patterns 1904a to 1904c and first and second left patterns 1904d and 1904e. The boundary space B3 (e.g., 50) of the third right pattern 1904c may be greater than the boundary space B2 (e.g., 25) of the second right pattern 1904b and less than the boundary space B1 (e.g., 75) of the first right pattern 1904a. The boundary space Bf of the first and second left patterns 1904d and 1904e may be equal to or greater than the smallest value of the right boundary spaces B1, B2, and B3. For example, the boundary space Bf may be 25.

In this case, since the first right pattern 1903d and the first left pattern 1904d have the same color, a space between the first right pattern 1903d and the first left pattern 1904d should satisfy the first space condition. In the present example, since a space between the first right pattern 1903d and the first left pattern 1904d is 50, the space therebetween does not satisfy the first space condition. Accordingly, a color conflict occurs between the first right pattern 1903d and the first left pattern 1904d.

Similarly, since the second right pattern 1903e and the second left pattern 1904e have the same color, a space between the second right pattern 1903e and the second left pattern 1904e should satisfy the first space condition. In the present example, since the space between the second right pattern 1903e and the second left pattern 1904e is 50, the space therebetween does not satisfy the first space condition. Accordingly, a color conflict occurs between the second right pattern 1903e and the second left pattern 1904e.

An IC 192 may perform a color inverting operation on the third standard cell 1903 to solve a color conflict between the second standard cell 1902 and the third standard cell 1903, and a color conflict between the third standard cell 1903 and the fourth standard cell 1904. In the present example, a color inverting operation is performed between the first color and the second color, while a color inverting operation is not performed on the third color. Thus, a first left pattern 1903a' and first and second right patterns 1903d' and 1903e' may be changed from the first color into the second color, and a second left pattern 1903b' may be changed from the second color into the first color.

Thus, the second right pattern 1902b and the second left pattern 1903b' may have different colors, and a space between the second right pattern 1902b and the second left pattern 1903b' may satisfy the second space condition, thus solving a color conflict. Further, the first right pattern 1903d' and the first left pattern 1904d may have different colors, and a space between the first right pattern 1903d' and the first left pattern 1904d may satisfy the second space condition, thus solving a color conflict may. Further, the second right pattern 1903e' and the second left pattern 1904e may have different colors, and a space between the second right pattern 1903e' and the second left pattern 1904e may satisfy the second space condition, thus solving a color conflict.

Figure 20:
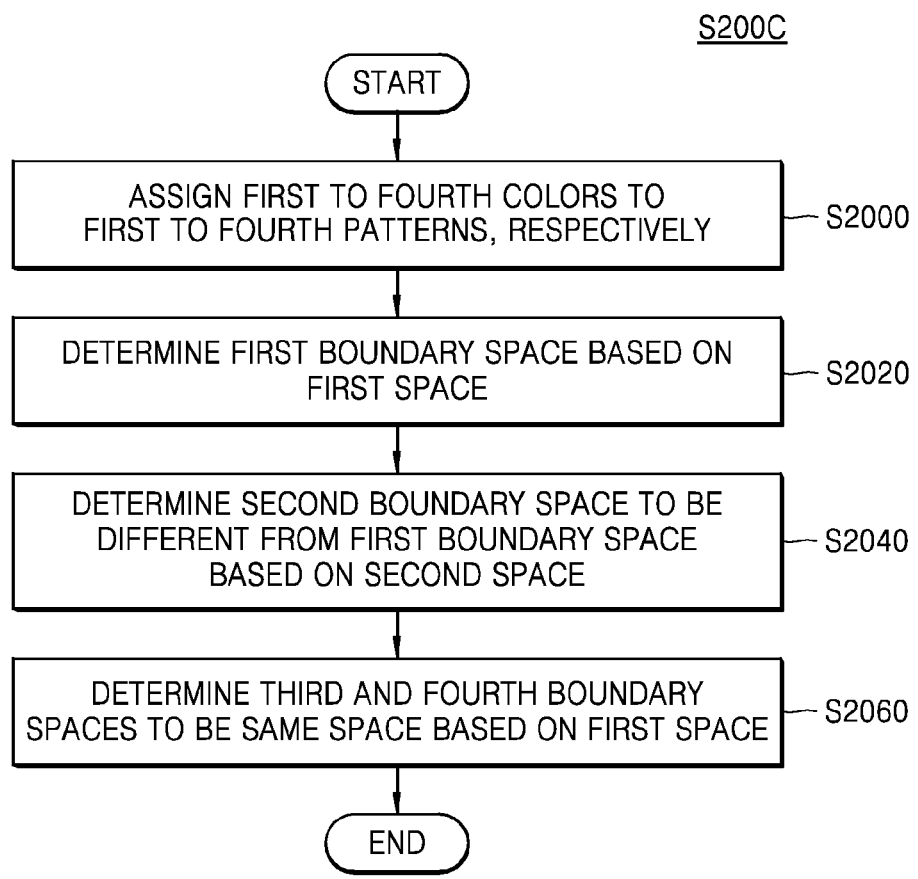
FIG. 20 is a flowchart of a method of designing a cell according to an exemplary embodiment of the inventive concept.

FIG. 20 is a flowchart of a method of designing a cell according to an exemplary embodiment of the inventive concept.

Referring to FIG. 20, a method S200C of designing a cell according to the present exemplary embodiment may correspond to an example of operation S200 of FIG. 2. Accordingly, for convenience of explanation, a further description of process and elements previously described with reference to FIG. 2 may be omitted herein.

In operation S2000, first to fourth colors may be respectively assigned to first to fourth patterns. The first to fourth colors may be different from one another and respectively correspond to first to fourth masks. The first to fourth patterns may be different patterns included in the same layer. Hereinafter, a pattern to which a first color is assigned will be referred to as a first pattern (e.g., PT1), a pattern to which a second color is assigned will be referred to as a second pattern (e.g., PT2), a pattern to which a third color is assigned will be referred to as a third pattern (e.g., PT3), and a pattern to which a fourth color is assigned will be referred to as a fourth pattern (e.g., PT4).

In an exemplary embodiment, since color decomposition is performed using four colors (e.g., the first to fourth colors), the first to fourth patterns may be formed using four masks. Accordingly, the first to fourth patterns according to an exemplary embodiment may be formed by using quadruple patterning technology (QPT).

In operation S2020, a first boundary space may be determined based on a first space. The first space may be the smallest space between patterns to which the same color is assigned. The first boundary space may be a space between the first pattern adjacent to a first boundary and the first boundary.

In operation S2040, a second boundary space may be determined to be different from the first boundary space based on a second space. The second space may be the smallest space between patterns to which different colors are assigned. The second boundary space may be a space between the second pattern adjacent to the first boundary and the first boundary. In the present exemplary embodiment, the second boundary space may be determined to be less than the first boundary space.

Referring to a general operation of designing cells, cells to be placed adjacent to each other cannot typically be predicted. According to exemplary embodiments of the inventive concept, when two cells are placed adjacent to each other at the first boundary, the first and second boundary spaces may be determined such that patterns arranged on two sides of the first boundary satisfy the first and second space conditions.

In operation S2060, a third boundary space and a fourth boundary space may be determined to the same space based on the first space. In the present exemplary embodiment, the third and fourth boundary spaces may be equal to or greater than the second boundary space and equal to or less than the first boundary space.

Figure 21:
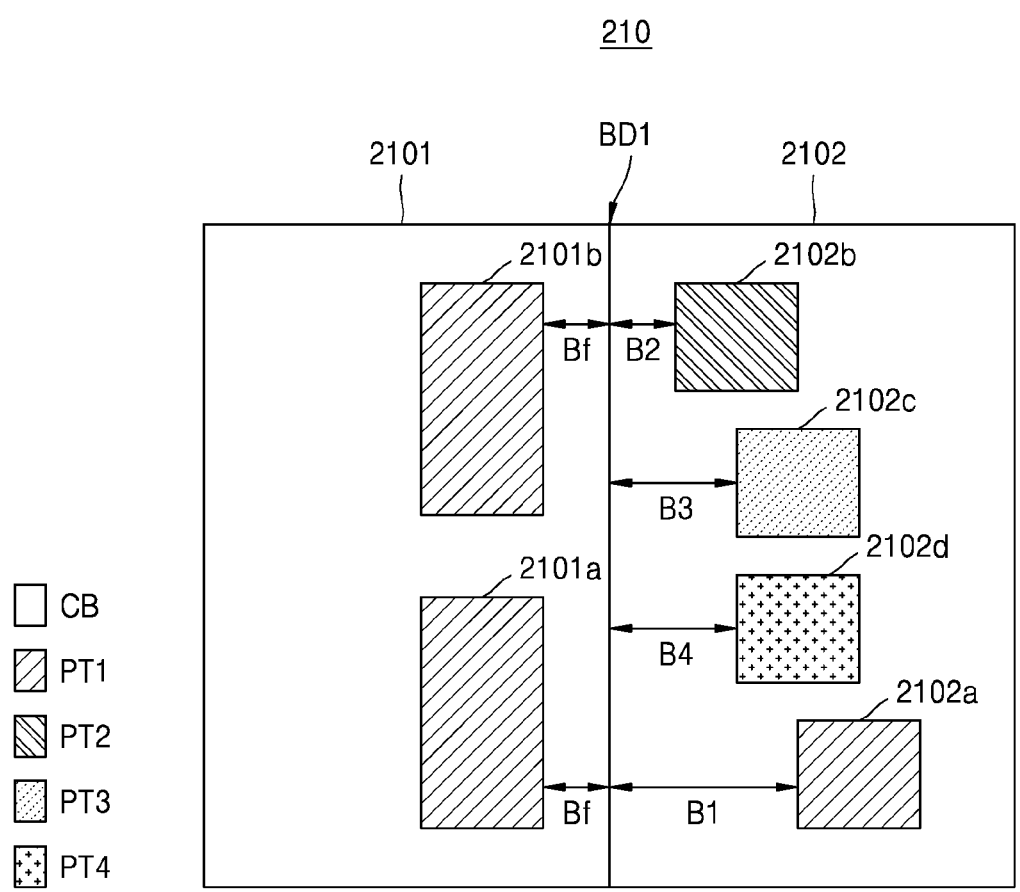
FIG. 21 illustrates an example of an IC including a cell designed using the method shown in FIG. 20 according to an exemplary embodiment of the inventive concept.

FIG. 21 illustrates an example of an IC including a cell designed using the method of FIG. 20 according to an exemplary embodiment of the inventive concept.

Referring to FIG. 21, an IC 210 may include first and second standard cells 2101 and 2102 placed adjacent to each other at a first boundary BD1. The first standard cell 2101 may include first patterns 2101a and 2101b to which a first color is assigned. A space Bf between the first pattern 2101a and the first boundary BD1 may be equal to the space Bf between the first pattern 2101b and the first boundary BD1. For example, the space Bf may be 25.

The second standard cell 2102 may include a first pattern 2102a to which the first color is assigned, a second pattern 2102b to which a second color is assigned, a third pattern 2102c to which a third color is assigned, and a fourth pattern 2102d to which a fourth color is assigned. A space between the first pattern 2102a and the first boundary BD1 may be a first boundary space B1, a space between the second pattern 2102b and the first boundary BD1 may be a second boundary space B2, a space between the third pattern 2102c and the first boundary BD1 may be a third boundary space B3, and a space between the fourth pattern 2102d and the first boundary BD1 may be a fourth boundary space B4. At least two of the first, second, third, and fourth boundary spaces B1, B2, B3, and B4 may be different from one another.

According to the present exemplary embodiment, the second boundary space B2 may be determined to be less than the first boundary space B1. For example, the first boundary space B1 may be 75 and the second boundary space B2 may be 25. According to the present exemplary embodiment, the third boundary space B3 may be determined to be equal to the fourth boundary space B4. Each of the third and fourth boundary spaces B3 and B4 may be determined to be equal to or greater than the second boundary space B2 and equal to or less than the first boundary space B1. For example, each of the third and fourth boundary spaces B3 and B4 may be 50.

According to the present exemplary embodiment, since a space between the first patterns 2101a and 2102a, which are arranged on two sides of the first boundary BD1 and have the same color, is 100, the space therebetween satisfies a first space condition. Further, since a space between the first pattern 2101b and the second pattern 2102b, which are arranged on two sides of the first boundary BD1 and have different colors, is 50, the space therebetween satisfies a second space condition.

Figure 22:
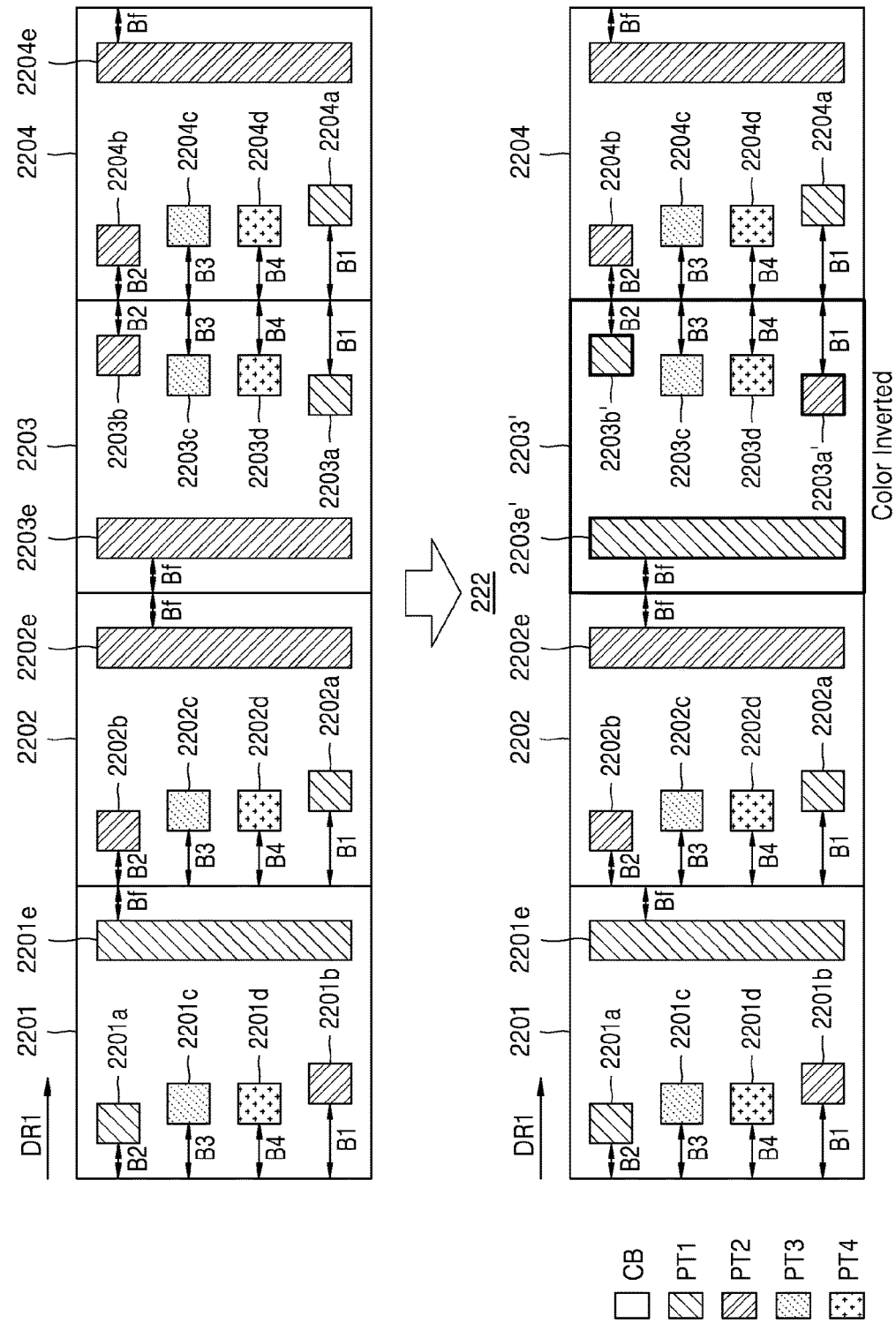
FIG. 22 illustrates an example of applying a color inverting operation to an IC including the cell designed using the method shown in FIG. 20 according to an exemplary embodiment of the inventive concept.

FIG. 22 illustrates an example of applying a color inverting operation to an IC including the cell designed using the method shown in FIG. 20 according to an exemplary embodiment of the inventive concept.

Referring to FIG. 22, the IC 221 may include first to fourth standard cells 2201 to 2204 arranged along a first direction DR1. The first standard cell 2201 may include first to fourth left patterns 2201a to 2201d and a right pattern 2201e. Each of boundary spaces B3 and B4 (e.g., 50) of the third and fourth left patterns 2201c and 2201d may be greater than a boundary space B2 (e.g., 25) of the first left pattern 2201a and less than a boundary space B1 (e.g., 75) of the second left pattern 2201b. A boundary space Bf of the right pattern 2201e may be equal to or greater than a smallest value of left boundary spaces B1, B2, B3, and B4. For example, the boundary space Bf may be 25.

The second standard cell 2202 may include first to fourth left patterns 2202a to 2202d and a right pattern 2202e. Each of the boundary spaces B3 and B4 (e.g., 50) of the third and fourth left patterns 2202c and 2202d may be greater than the boundary space B2 (e.g., 25) of the second left pattern 2202b and less than the boundary space B1 (e.g., 75) of the first left pattern 2202a. The boundary space Bf of the right pattern 2202e may be equal to or greater than the smallest value of the left boundary spaces B1, B2, B3, and B4. For example, the boundary space Bf may be 25.

In this case, since the right pattern 2201e and the second left pattern 2202b have different colors, a space between the right pattern 2201e and the second left pattern 2202b should satisfy a second space condition. In the present example, since a space between the right pattern 2201e and the second left pattern 2202b is 50, the space therebetween satisfies the second space condition. Further, since the right pattern 2201e and the first left pattern 2202a have the same color, a space between the right pattern 2201e and the first left pattern 2202a should satisfy a first space condition. In the present example, since a space between the right pattern 2201e and the first left pattern 2202a is 100, the space therebetween satisfies the first space condition.

The third standard cell 2203 may include first to fourth right patterns 2203a to 2203d and a left pattern 2203e. Each of the boundary spaces B3 and B4 (e.g., 50) of the third and fourth right patterns 2203c and 2203d may be greater than the boundary space B2 (e.g., 25) of the second right pattern 2203b and less than the boundary space B1 (e.g., 75) of the first right pattern 2203a. The boundary space Bf of the left pattern 2203e may be equal to or greater than the smallest value of the right boundary spaces B1, B2, B3, and B4. For example, the boundary space Bf may be 25.

In this case, since the right pattern 2202e and the left pattern 2203e have the same color, a space between the right pattern 2202e and the left pattern 2203e should satisfy the first space condition. In the present example, since a space between the right pattern 2202e and the left pattern 2203e is 50, the space therebetween does not satisfy the first space condition. Accordingly, a color conflict occurs between the right pattern 2202e and the left pattern 2203e.

The fourth standard cell 2204 may include first to fourth left patterns 2204a to 2204d and a right pattern 2204e. Each of the boundary spaces B3 and B4 (e.g., 50) of the third and fourth left patterns 2204c and 2204d may be greater than the boundary space B2 (e.g., 25) of the second left pattern 2204b and less than the boundary space B1 (e.g., 75) of the first left pattern 2204a. The boundary space Bf of the right pattern 2204e may be equal to or greater than the smallest value of the left boundary spaces B1, B2, B3, and B4. For example, the boundary space Bf may be 25.

In this case, since the second right pattern 2203b and the second left pattern 2204b have the same color, a space between the second right pattern 2203b and the second left pattern 2204b should satisfy the first space condition. In the present example, since the space between the second right pattern 2203b and the second left pattern 2204b is 50, the space therebetween does not satisfy the first space condition. Accordingly, a color conflict occurs between the second right pattern 2203b and the second left pattern 2204b.

Since the third right pattern 2203c and the third left pattern 2204c have the same color, a space between the third right pattern 2203c and the third left pattern 2204c should satisfy the first space condition. In the present example, since a space between the third right pattern 2203c and the third left pattern 2204c is 100, the space therebetween satisfies the first space condition. Similarly, since a space between the first right pattern 2203a and the first left pattern 2204a is 150, the space therebetween satisfies the first space condition.

An IC 222 may perform a color inverting operation on the third standard cell 2203 to solve a color conflict between the second standard cell 2202 and the third standard cell 2203, and a color conflict between the third standard cell 2203 and the fourth standard cell 2204. In the present exemplary embodiment, a color inverting operation may be performed between a first color and a second color, while a color inverting operation may not be performed on a third color and a fourth color. Thus, a left pattern 2203e' and a second right pattern 2203b' may be changed from the second color into the first color, and a first right pattern 2203a' may be changed from the first color into the second color.

Thus, the right pattern 2202e and the left pattern 2203e' may have different colors, and a space between the right pattern 2202e and the left pattern 2203e' may satisfy the second space condition, thus solving a color conflict. Further, a second right pattern 2203b' and the second left pattern 2204b may have different colors, and a space between the second right pattern 2203b' and the second left pattern 2204b may satisfy the second space condition, thus solving a color conflict.

Figure 23:
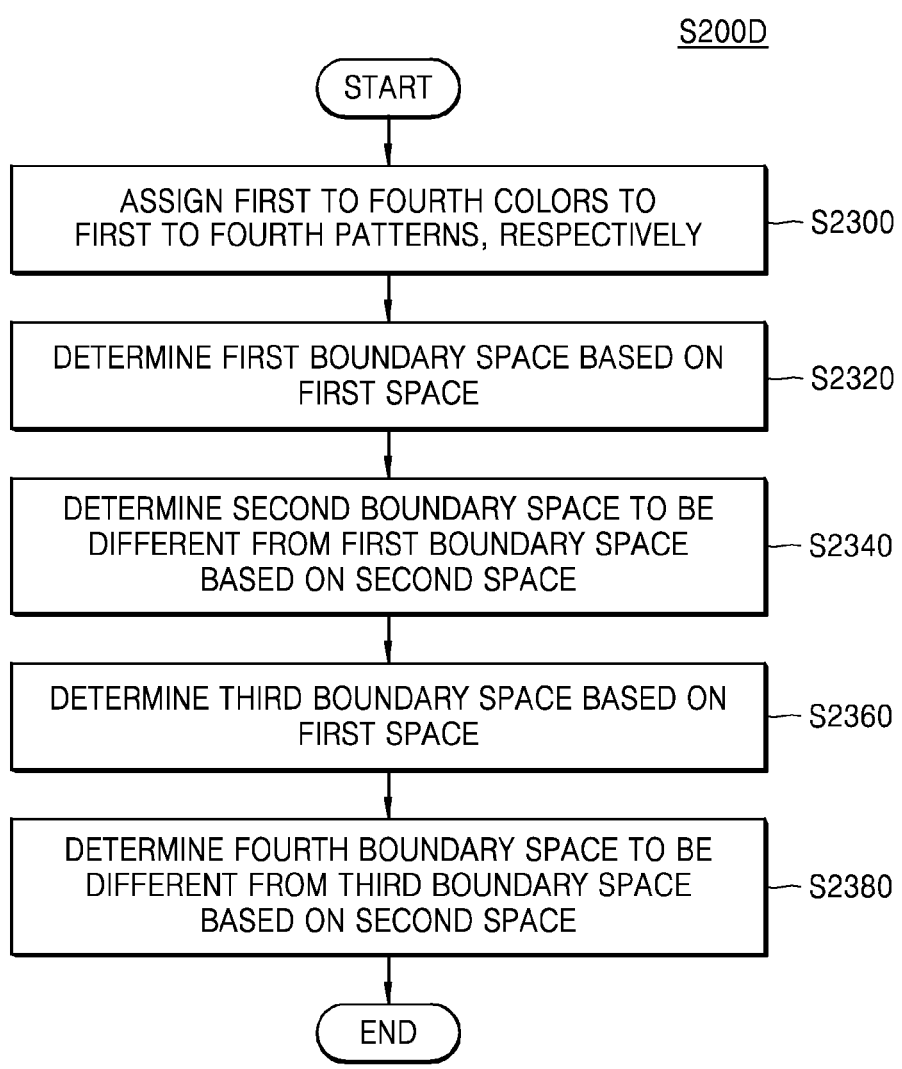
FIG. 23 is a flowchart of a method of designing a cell according to an exemplary embodiment of the inventive concept.

FIG. 23 is a flowchart of a method of designing a cell according to an exemplary embodiment of the inventive concept.

Referring to FIG. 23, the method S200D of designing a cell according to an exemplary embodiment may correspond to an example of operation S200 of FIG. 2. Accordingly, for convenience of explanation, a further description of processes and elements described with reference to FIG. 2 may be omitted herein.

In operation S2300, first to fourth colors may be respectively assigned to first to fourth patterns. The first to fourth colors may be different from one another and respectively correspond to first to fourth masks. The first to fourth patterns may be different patterns included in the same layer. Hereinafter, a pattern to which a first color is assigned will be referred to as a first pattern (e.g., PT1), a pattern to which a second color is assigned will be referred to as a second pattern (e.g., PT2), a pattern to which a third color is assigned will be referred to as a third pattern (e.g., PT3), and a pattern to which a fourth color is assigned will be referred to as a fourth pattern (e.g., PT4).

In an exemplary embodiment, since color decomposition is performed using four colors (e.g., first to fourth colors), the first to fourth patterns may be formed using four masks. Accordingly, the first to fourth patterns according to an exemplary embodiment may be formed using QPT.

In operation S2320, a first boundary space may be determined based on a first space. The first space may be the smallest space between patterns to which the same color is assigned. A first boundary space may be a space between the first pattern adjacent to a first boundary and the first boundary.

In operation S2340, a second boundary space may be determined to be different from the first boundary space based on a second space. The second space may be the smallest space between patterns to which different colors are assigned. The second boundary space may be a space between the second pattern adjacent to the first boundary and the first boundary. In an exemplary embodiment, the second boundary space may be determined to be less than the first boundary space.

Referring to a general operation of designing a cell, cells to be placed adjacent to each other cannot typically be predicted. According to exemplary embodiments of the inventive concept, when two cells are placed adjacent to each other at the first boundary, the first and second boundary spaces may be determined such that patterns arranged on two sides of the first boundary satisfy the first and second space conditions.

In operation S2360, a third boundary space may be determined based on the first space. In an exemplary embodiment, the third boundary space may be equal to or greater than the second boundary space and equal to or less than the first boundary space.

In operation S2380, a fourth boundary space may be determined to be different from the third boundary space based on the second space.

Figure 24:
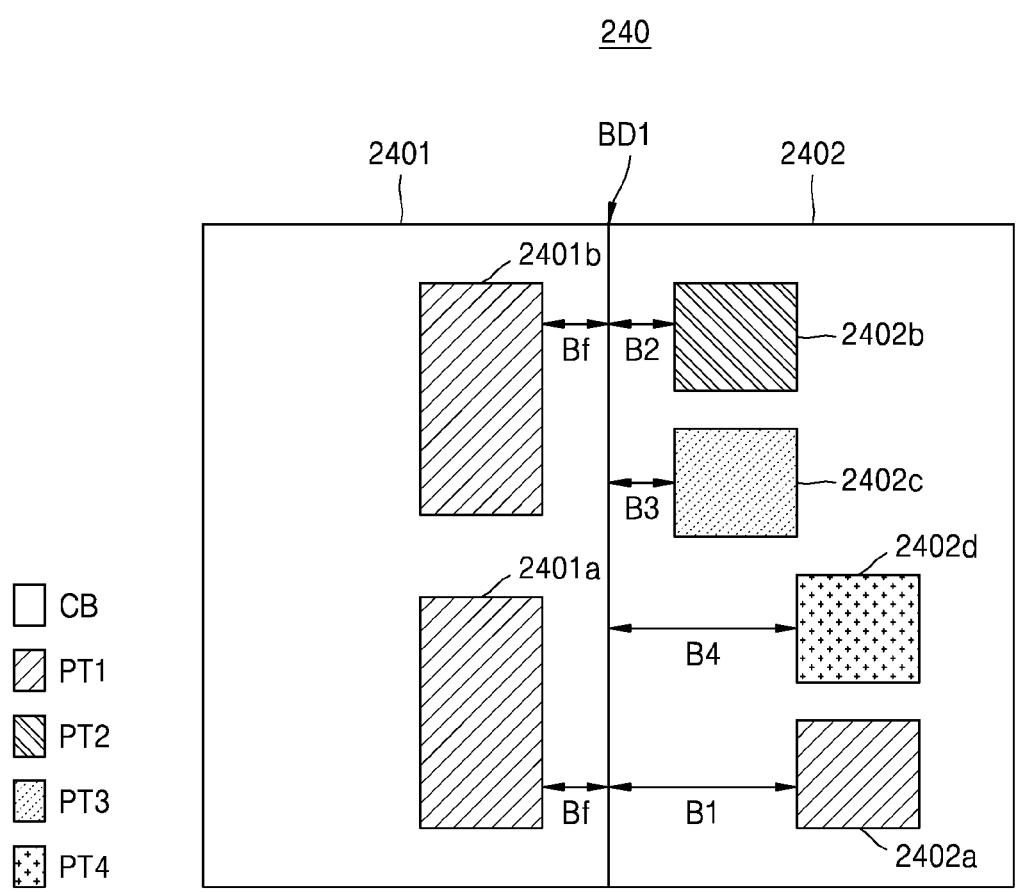
FIG. 24 illustrates an example of an IC including the cell designed using the method shown in FIG. 23 according to an exemplary embodiment of the inventive concept.

FIG. 24 illustrates an example of an IC including a cell designed using the method of FIG. 23 according to an exemplary embodiment of the inventive concept.

Referring to FIG. 24, an IC 240 may include first and second standard cells 2401 and 2402 placed adjacent to each other at a first boundary BD1. The first standard cell 2401 may include first patterns 2401a and 2401b to which a first color is assigned, and a space Bf between the first pattern 2401a and a first boundary BD1 may be equal to the space Bf between the first pattern 2401b and the first boundary BD1. For example, the space Bf may be 25. The second standard cell 2402 may include a first pattern 2402a to which the first color is assigned, a second pattern 2402b to which a second color is assigned, a third pattern 2402c to which a third color is assigned, and a fourth pattern 2402d to which a fourth color is assigned. A space between the first pattern 2402a and the first boundary BD1 may be a first boundary space B1, a space between the second pattern 2402b and the first boundary BD1 may be a second boundary space B2, a space between the third pattern 2402c and the first boundary BD1 may be a third boundary space B3, and a space between the fourth pattern 2402d and the first boundary BD1 may be a fourth boundary space B4. At least two of the first to fourth boundary spaces B1, B2, B3, and B4 may be different from one another.

According to the present example, the second boundary space B2 may be determined to be less than the first boundary space B1. For example, the first boundary space B1 may be 75, and the second boundary space B2 may be 25. According to the present example, the third boundary space B3 may be determined to be different from the fourth boundary space B4. Each of the third and fourth boundary spaces B3 and B4 may be determined to be equal to or greater than the second boundary space B2 and equal to or less than the first boundary space B1. According to the present example, the fourth boundary space B4 may be determined to be greater than the third boundary space B3. For example, the third boundary space B3 may be 25, and the fourth boundary space B4 may be 75.

According to the present example, since a space between the first patterns 2401a and 2402a, which are arranged on two sides of the first boundary BD1 and have the same color, is 100, the space therebetween satisfies a first space condition. Further, since a space between the first pattern 2401b and the second pattern 2402b, which are arranged on two sides of the first boundary BD1 and have different colors, is 50, the space therebetween satisfies a second space condition.

Figure 25:
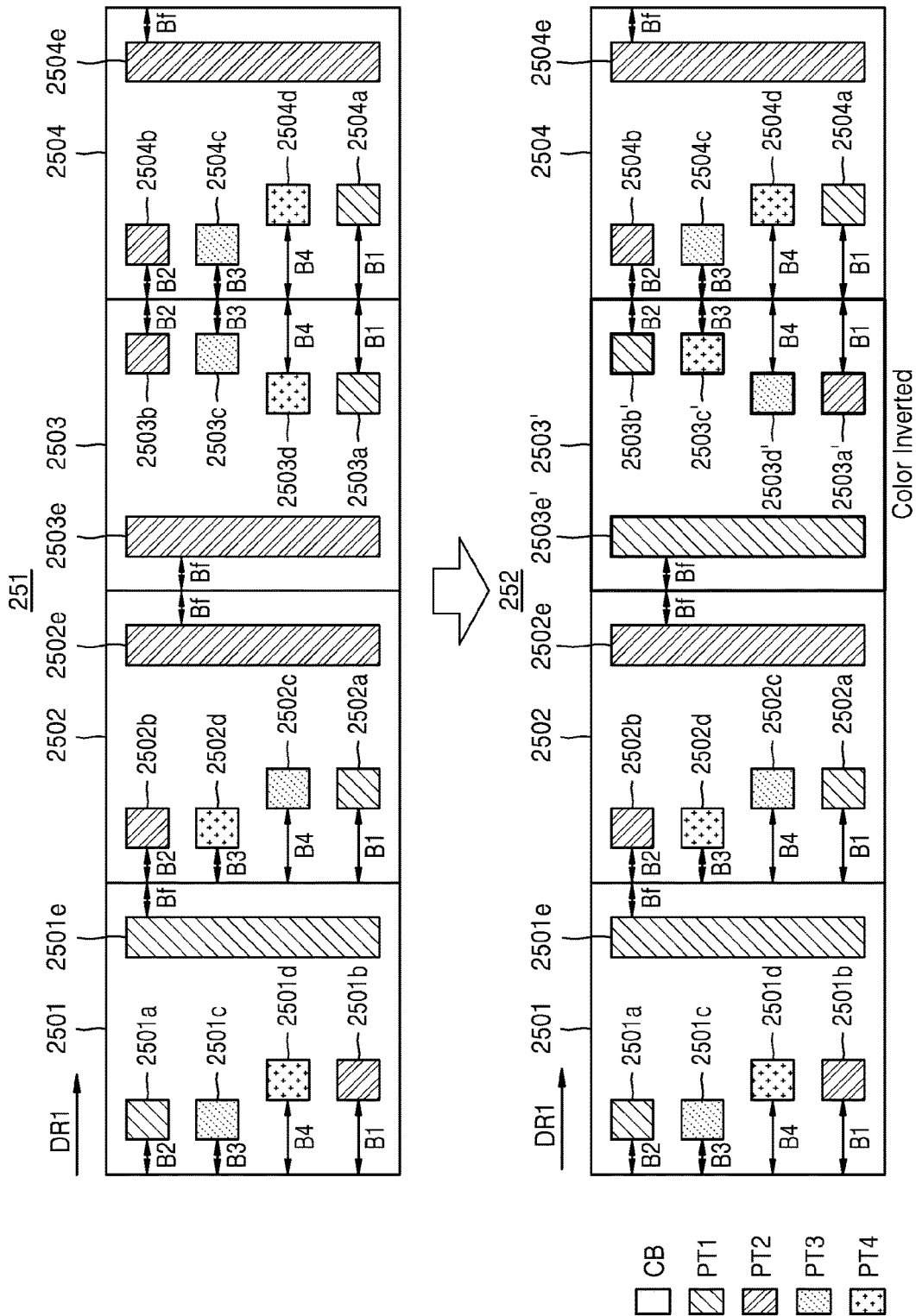
FIG. 25 illustrates an example of applying a color inverting operation to an IC including the cell designed using the method shown in FIG. 23 according to an exemplary embodiment of the inventive concept.

FIG. 25 illustrates an example of applying a color inverting operation to an IC including the cell designed using the method shown in FIG. 23 according to an exemplary embodiment of the inventive concept.

Referring to FIG. 25, an IC 251 may include first to fourth standard cells 2501 to 2504 arranged along a first direction DR1. The first standard cell 2501 may include first to fourth left patterns 2501a to 2501d and a right pattern 2501e. Boundary spaces B2 and B3 of the first and third left patterns 2501a and 2501c may be the same (e.g., 25). Boundary spaces B1 and B4 of the second and fourth left patterns 2501b and 2501d may be the same (e.g., 75) and greater than the boundary spaces B2 and B3 of the first and third left patterns 2501a and 2501c. A boundary space Bf of the right pattern 2501e may be equal to or greater than the smallest value of the left boundary spaces B1 to B4. For example, the boundary space Bf may be 25.

The second standard cell 2502 may include first to fourth left patterns 2502a to 2502d and a right pattern 2502e. The boundary spaces B2 and B3 of the second and fourth left patterns 2502b and 2502d may be the same (e.g., 25). The boundary spaces B1 and B4 of the first and third left patterns 2502a and 2502c may be the same (e.g., 75) and may be greater than the boundary spaces B2 and B3 of the second and fourth left patterns 2502b and 2502d. The boundary space Bf of the right pattern 2502e may be equal to or greater than the smallest value of the left boundary spaces B1 to B4. For example, the boundary space Bf may be 25.

In this case, since the right pattern 2501e and the second left pattern 2502b have different colors, a space between the right pattern 2501e and the second left pattern 2502b should satisfy a second space condition. In the present example, since the space between the right pattern 2501e and the second left pattern 2502b is 50, the space therebetween satisfies the second space condition. Further, since the right pattern 2501e and the first left pattern 2502a have the same color, a space between the right pattern 2501e and the first left pattern 2502a should satisfy a first space condition. In the present example, since the space between the right pattern 2501e and the first left pattern 2502a is 100, the space therebetween satisfies the first space condition.

The third standard cell 2503 may include first to fourth right patterns 2503a to 2503d and a left pattern 2503e. The boundary spaces B2 and B3 of the second and third right patterns 2503b and 2503c may be the same space (e.g., 25). The boundary spaces B1 and B4 of the first and fourth right patterns 2503a and 2503d may be the same (e.g., 75) and may be greater than the boundary spaces B2 and B3 of the second and third right patterns 2503b and 2503c. The boundary space Bf of the left pattern 2503e may be equal to or greater than the smallest value of the right boundary spaces B1 to B4. For example, the boundary space Bf may be 25.

In this case, since the right pattern 2502e and the left pattern 2503e have the same color, a space between the right pattern 2502e and the left pattern 2503e should satisfy the first space condition. In the present example, since a space between the right pattern 2502e and the left pattern 2503e is 50, the space therebetween does not satisfy the first space condition. Accordingly, a color conflict occurs between the right pattern 2502e and the left pattern 2503e.

The fourth standard cell 2504 may include first to fourth left patterns 2504a to 2504d and a right pattern 2504e. The boundary spaces B2 and B3 of the second and third left patterns 2504b and 2504c may be the same (e.g., 25). The boundary spaces B1 and B4 of the first and fourth left patterns 2504a and 2504d may be the same (e.g., 75) and may be greater than the boundary spaces B2 and B3 of the second and third left patterns 2504b and 2504c. The boundary space Bf of the right pattern 2504e may be equal to or greater than the smallest value of the left boundary spaces B1 to B4. For example, the boundary space Bf may be 25.

In this case, since the second right pattern 2503b and the second left pattern 2504b have the same color, a space between the second right pattern 2503b and the second left pattern 2504*b* should satisfy the first space condition. In the present example, since the space between the second right pattern 2503*b* and the second left pattern 2504*b* is 50, the space therebetween does not satisfy the first space condition. Accordingly, a color conflict occurs between the second right pattern 2503*b* and the second left pattern 2504*b*.

In addition, since the fourth right pattern 2503*d* and the fourth left pattern 2504*d* have the same color, a space between the fourth right pattern 2503*d* and the fourth left pattern 2504*d* should satisfy the first space condition. In the present example, since the space between the fourth right pattern 2503*d* and the fourth left pattern 2504*d* is 150, the space therebetween satisfies the first space condition.

Since the third right pattern 2503*c* and the third left pattern 2504*c* have the same color, a space between the third right pattern 2503*c* and the third left pattern 2504*c* should satisfy the first space condition. In the present example, since a space between the third right pattern 2503*c* and the third left pattern 2504*c* is 50, the space therebetween does not satisfy the first space condition. Further, since the space between the first right pattern 2503*a* and the first left pattern 2504*a* is 150, the space therebetween satisfies the first space condition.

An IC 252 may perform a color inverting operation on the third standard cell 2503 to solve a color conflict between the second standard cell 2502 and the third standard cell 2503, and a color conflict between the third standard cell 2503 and the fourth standard cell 2504. In the present example, a color inverting operation may be performed between a first color and a second color, while a color inverting operation may be performed between a third color and a fourth color.

Thus, a left pattern 2503*e*' and a second right pattern 2503*b*' may be changed from the second color into the first color, and a first right pattern 2503*a*' may be changed from the first color into the second color. Further, a third right pattern 2503*c*' may be changed from the third color into the fourth color, and a fourth right pattern 2503*d*' may be changed from the fourth color into the third color.

Thus, the right pattern 2502*e* and the left pattern 2503*e*' may have different colors, and a space between the right pattern 2502*e* and the left pattern 2503*e*' may satisfy a second space condition, thus solving a color conflict. Further, the second right pattern 2503*b*' and the second left pattern 2504*b* may have different colors, and a space between the second right pattern 2503*b*' and the second left pattern 2504*b* may satisfy the second space condition, thus solving a color conflict. Further, the fourth right pattern 2503*d*' and the fourth left pattern 2504*d* may have different colors, and a space between the fourth right pattern 2503*d*' and the fourth left pattern 2504*d* may satisfy the second space condition, thus solving a color conflict.

Figure 26:
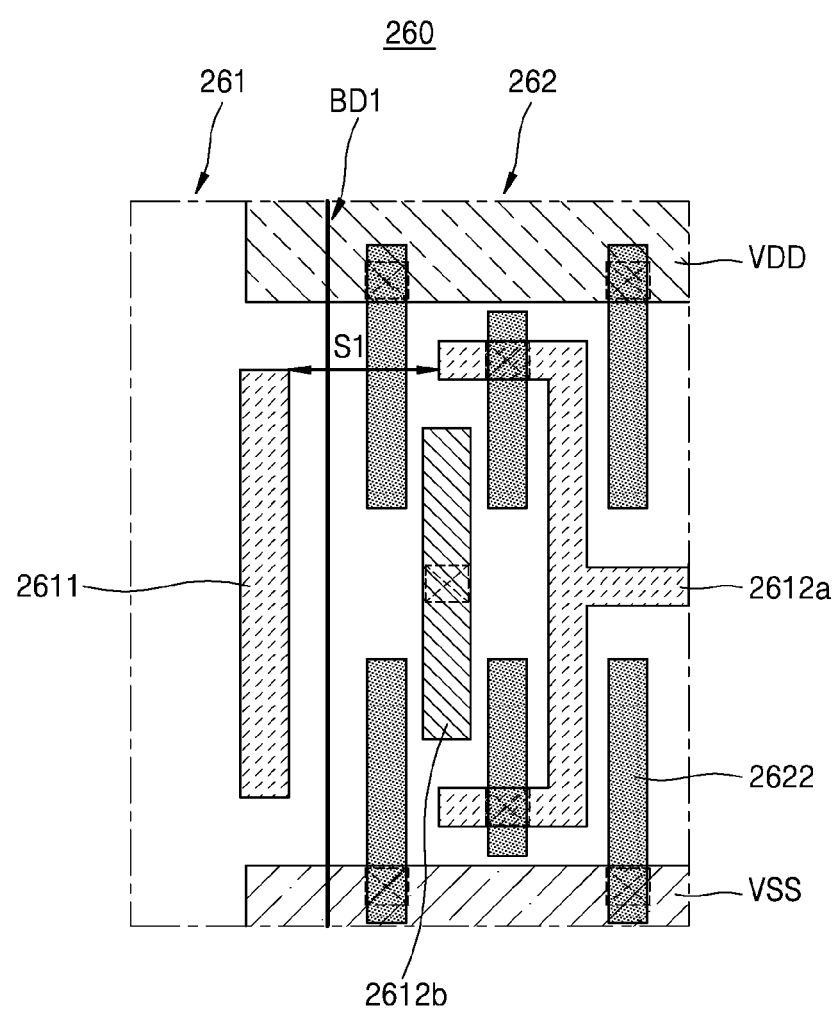
FIG. 26 illustrates an example of a layout of an IC including a cell designed using a method according to an exemplary embodiment of the inventive concept.

FIG. 26 illustrates an example of a layout of an IC including a cell designed according to an exemplary embodiment of the inventive concept.

Referring to FIG. 26, an IC 260 may include first and second standard cells 261 and 262 disposed adjacent to each other at a first boundary BD1. The first standard cell 261 may include a first pattern 2611 to which a first color is assigned, and the second standard cell 262 may include a first pattern 2612*a* to which the first color is assigned and a second pattern 2612*b* to which a second color is assigned. In this case, the first and second patterns 2611, 2612*a*, and 2612*b* may be patterns constituting the same layer. In the present exemplary embodiment, a space between the first patterns 2611 and 2612*a* to which the first color is assigned, may be equal to or greater than a first space S1.

In addition, the second standard cell 262 may further include contacts 2622 electrically connected to an active region. In an example, the first and second patterns 2611, 2612*a*, and 2612*b* may be formed in a different layer from the contacts 2622. For example, the first and second patterns 2611, 2612*a*, and 2612*b* may be formed over the contacts 2622. The second standard cell 262 may further include first and second power supply lines VDD and VSS, and an extension direction of the first and second power supply lines VDD and VSS may be substantially perpendicular to the first boundary BD1.

Figure 27:
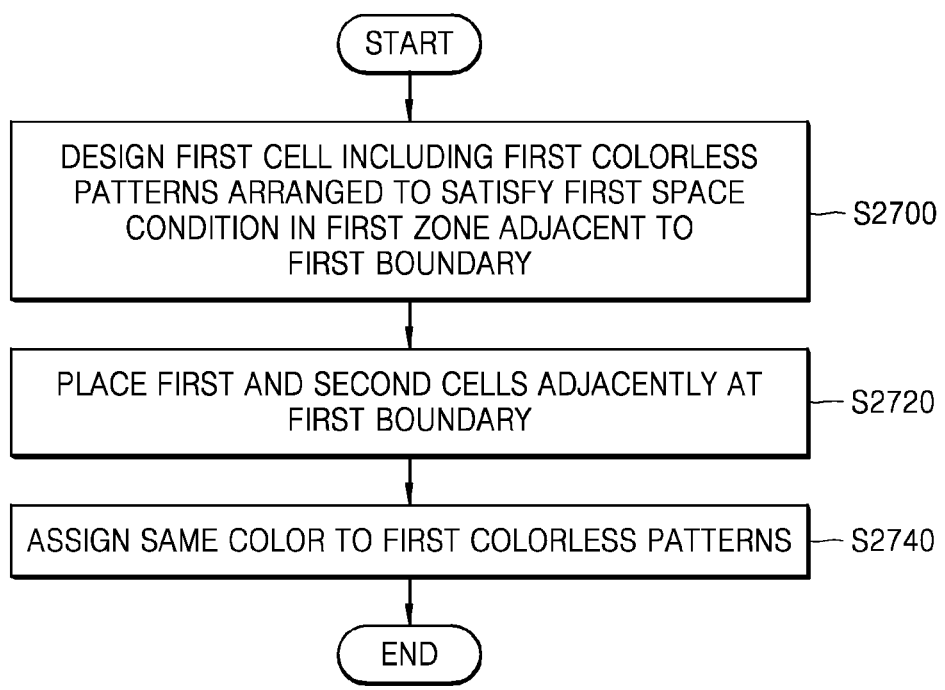
FIG. 27 is a flowchart of a method of designing an IC according to an exemplary embodiment of the inventive concept.

FIG. 27 is a flowchart of a method of designing an IC according to an exemplary embodiment of the inventive concept.

Referring to FIG. 27, the method of designing the layout of the IC according to an exemplary embodiment may correspond to an example of operation S10 of FIG. 1. Accordingly, for convenience of explanation, a further description of processes and elements previously described with reference to FIG. 1 may be omitted herein.

In operation S2700, in a first zone adjacent to a first boundary, a first cell including first colorless patterns that satisfy a first space condition may be designed. The first zone may be a virtual space generated in an operation of designing a cell. According to an exemplary embodiment, patterns having different colors may be forced not to be formed in the first zone.

In operation S2720, first and second cells may be placed adjacent to each other at the first boundary. For example, the first cell may be initially placed, and the second cell may be placed adjacent to the first boundary of the first cell along a direction in which the first and second cells are placed. Operation S2720 may be an example of operation S13 of FIG. 1. The second cell may be arbitrary cell stored in a standard cell library.

In an exemplary embodiment, the second cell may be a cell designed due to operation S2700. For example, colorless patterns that satisfy a first space condition may be arranged in a zone adjacent to one boundary of the second cell. In an exemplary embodiment, the second cell may be a cell that is not designed due to operation S2700. For example, colorless patterns that do not satisfy the first space condition may be arranged in the zone adjacent to the one boundary of the second cell.

In an exemplary embodiment, the first and second cells may be placed directly adjacent to the first boundary. In this case, the first boundary may substantially overlap one boundary of the second cell. In an exemplary embodiment, the second cell may be adjacent to the first boundary and placed a predetermined space apart from the first boundary.

In operation S2740, the same color may be assigned to first colorless patterns. According to an exemplary embodiment, after the operation of placing the cells, the same color may be assigned to the first colorless patterns generated in the first zone in the operation of designing the cells. Since the same color may be assigned to the first colorless patterns later, a space between two arbitrary first colorless patterns in the first zone may be equal to or greater than the first space. In an exemplary embodiment, in the operation of designing the first cell, the first cell may be designed not to include patterns that have different colors and are arranged at the same level as the first colorless patterns in the first zone.

Figure 28:
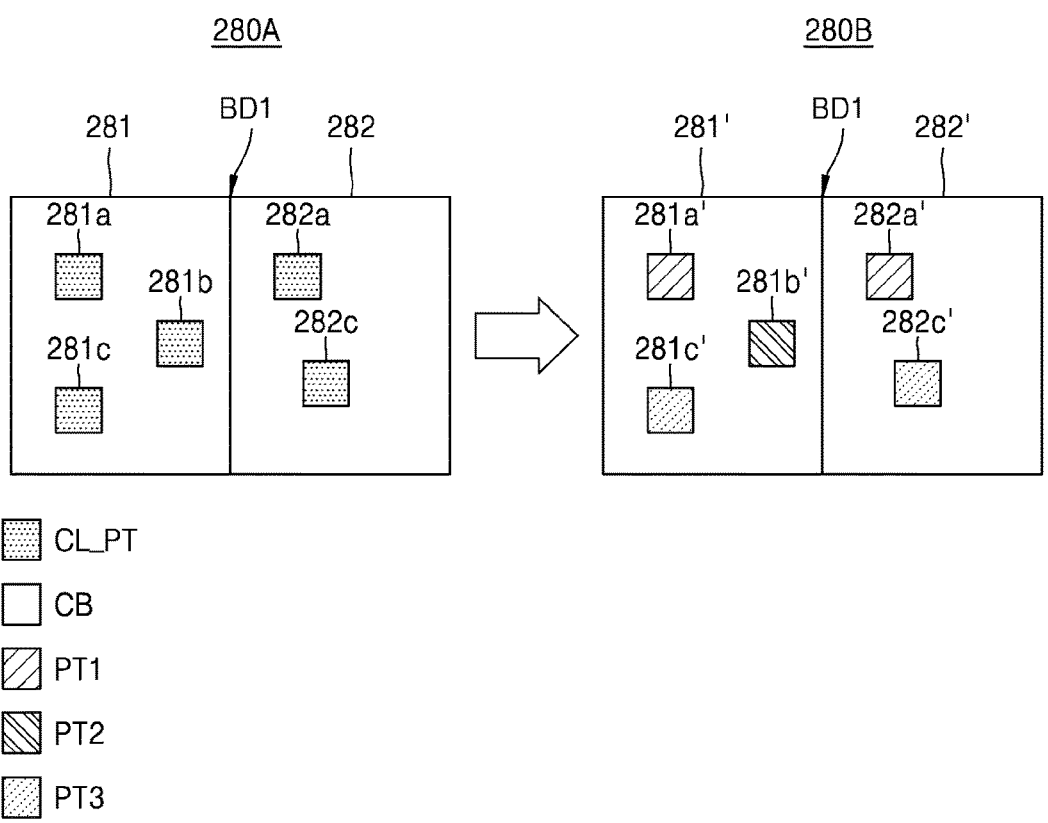
FIG. 28 illustrates a method of assigning colors to colorless patterns according to an exemplary embodiment of the inventive concept.

FIG. 28 illustrates a method of assigning colors to colorless patterns according to an exemplary embodiment of the inventive concept.

Referring to FIG. 28, an IC 280A may include first and second standard cells 281 and 282 placed adjacent to a first boundary BD1. In the IC 280A, the first standard cell 281 may include colorless patterns 281*a* to 281*c* to which no color is assigned, and the second standard cell 282 may include colorless patterns 282*a* and 282*c* to which no color is assigned. Herein, CL_PT may be used in the figures to indicate colorless patterns.

In an exemplary embodiment, the colorless patterns 281*a* to 281*c*, 282*a*, and 282*c* may correspond to via plugs. For example, the colorless patterns 281*a* to 281*c*, 282*a*, and 282*c* may be via plugs configured to connect contacts with a first metal layer. In an example, the colorless patterns 281*a* to 281*c*, 282*a*, and 282*c* may be via plugs configured to connect the first metal layer with a second metal layer.

In an operation performed after the first and second standard cells 281 and 282 are placed, a coloring operation for assigning colors to the colorless patterns 281*a* to 281*c*, 282*a*, and 282*c* may be performed. For example, the coloring operation may be performed in a design rule check (DRC) operation. An IC 280B may include first and second standard cells 281', 282', which may be generated by the coloring operation for assigning the colors to the colorless patterns 281*a* to 281*c*, 282*a*, and 282*c*.

For example, a first color may be assigned to the colorless patterns 281*a* and 282*a* due to the coloring operation so that the colorless patterns 281*a* and 282*a* may be referred to as first patterns 281*a*' and 282*a*'. Further, a second color may be assigned to the colorless pattern 281*b* due to the coloring operation so that the colorless pattern 281*b* may be referred to as a second pattern 281*b*'. Further, a third color may be assigned to the colorless patterns 281*c* and 282*c* due to the coloring operation so that the colorless patterns 281*c* and 282*c* may be referred to as third patterns 281*c*' and 282*c*'.

Figure 29:
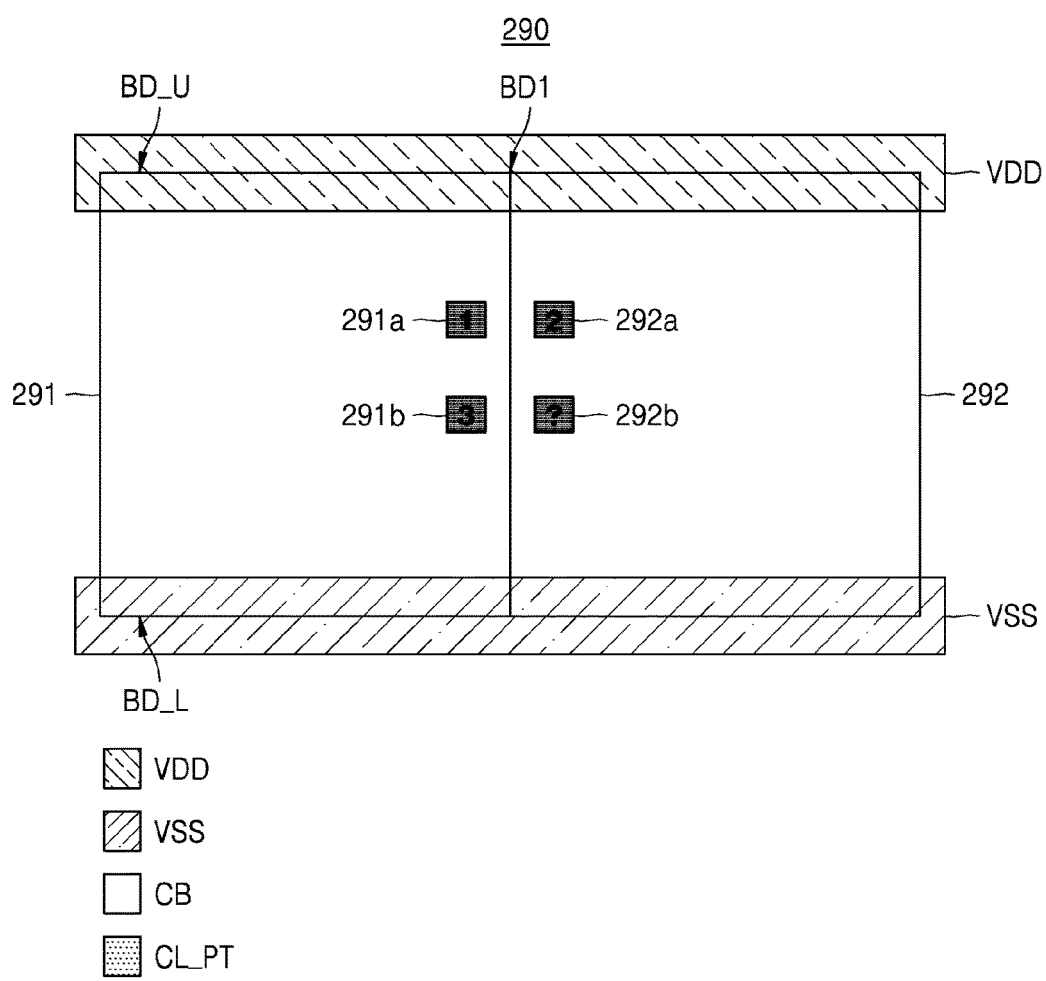
FIG. 29 illustrates an example in which three colors are assigned to four colorless patterns according to an exemplary embodiment of the inventive concept.

FIG. 29 illustrates an example of assigning three colors to four colorless patterns according to an exemplary embodiment of the inventive concept.

Referring to FIG. 29, IC 290 may include first and second standard cells 291 and 292 placed adjacent to each other at a first boundary BD1. A first power line VDD may be arranged parallel to an upper boundary BD_U that is substantially perpendicular to the first boundary BD1, and a second power line VSS may be arranged substantially parallel to a lower boundary BD_L that is substantially perpendicular to the first boundary BD1.

The first standard cell 291 may include patterns 291*a* and 291*b* arranged adjacent to the first boundary BD1. In the first standard cell 291 stored in a standard cell library, before or directly after an operation of placing cells, the patterns 291*a* and 291*b* may be colorless patterns. The second standard cell 292 may include patterns 292*a* and 292*b* arranged adjacent to the first boundary BD1. Before or directly after the operation of placing cells, in the second standard cell 292 stored in the standard cell library, the patterns 292*a* and 292*b* may be colorless patterns.

To form four patterns 291*a*, 291*b*, 292*a*, and 292*b* adjacent to the first boundary BD1, when three masks are used, three colors must be assigned to four patterns 291*a*, 291*b*, 292*a*, and 292*b*. Thus, the same color may be assigned to two of the four patterns 291*a*, 291*b*, 292*a*, and 292*b*. In this case, since two arbitrary patterns to which the same color is assigned must satisfy a first space condition, a color conflict, which does not occur on a cell level, may occur on a chip level.

For example, if a first color is assigned to the pattern 291*a*, a second color is assigned to the pattern 292*a*, and a third color is assigned to the pattern 291*b*, one of the first to third colors must be assigned to the pattern 292*b*. In this case, the pattern 292*b* and a pattern to which the same color as a color assigned to the pattern 292*b* is assigned must satisfy the first space condition. Thus, to ensure a predetermined space between the first standard cell 291 and the second standard cell 292, the second standard cell 292 may be placed a predetermined space apart from the first standard cell 291. Thus, since an area of the IC 290 increases, spatial efficiency may be reduced.

Figure 30:
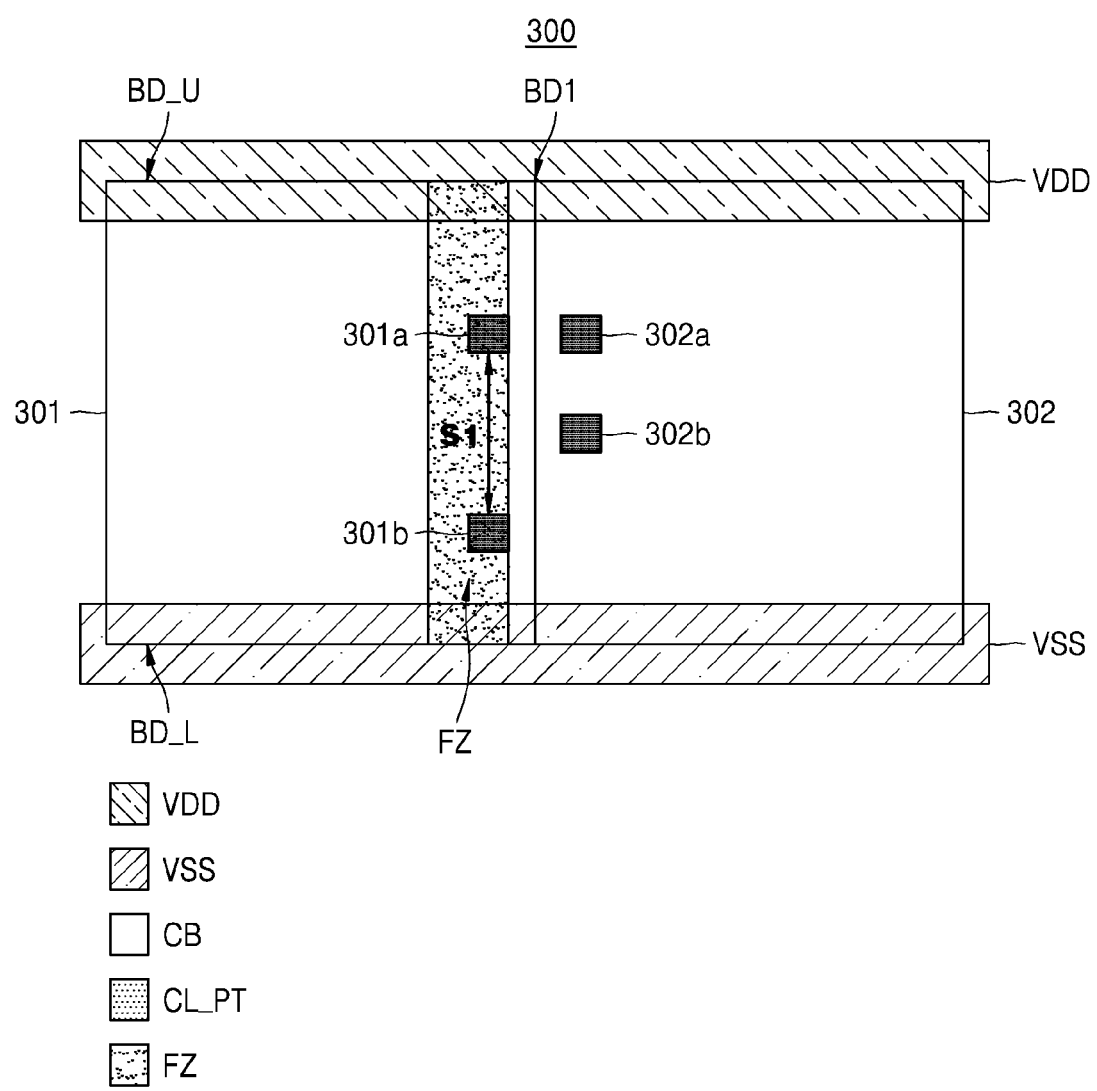
FIG. 30 illustrates an example of an IC including a cell designed using the method of FIG. 27 according to an exemplary embodiment of the inventive concept.

FIG. 30 illustrates an example of an IC including a cell designed using the method of FIG. 27 according to an exemplary embodiment of the inventive concept.

Referring to FIG. 30, an IC 300 may include first and second standard cells 301 and 302 placed adjacent to each other at a first boundary BD1. A first power line VDD may be arranged substantially parallel to an upper boundary BD_U that is substantially perpendicular to the first boundary BD1. A second power line VSS may be arranged substantially parallel to a lower boundary BD_L that is substantially perpendicular to the first boundary BD1.

According to an exemplary embodiment, the first standard cell 301 may have a first zone FZ adjacent to the first boundary BD1, and first and second patterns 301*a* and 301*b* may be arranged in the first zone FZ. In this case, a space between the first pattern 301*a* and the second pattern 301*b* may be equal to or greater than a first space S1. Accordingly, after a coloring operation is performed, even if the same color is assigned to the first and second patterns 301*a* and 301*b*, a color conflict does not occur between the first and second patterns 301*a* and 301*b*.

The second standard cell 302 may include first and second patterns 302*a* and 302*b* arranged adjacent to the first boundary BD1, and a space between the first pattern 302*a* and the second pattern 302*b* may be determined to be equal to or greater than a second space. Thus, even if three colors are assigned to the four patterns 301*a*, 301*b*, 302*a*, and 302*b*, a color conflict does not occur among the four patterns 301*a*, 301*b*, 302*a*, and 302*b*.

Figure 31:
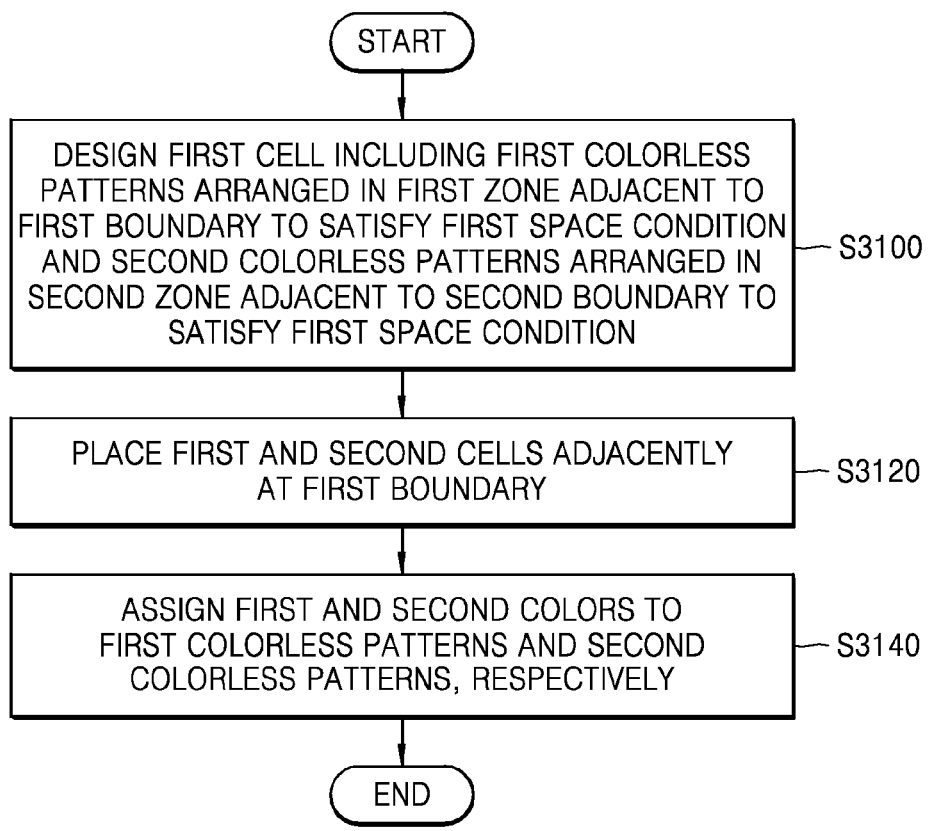
FIG. 31 is a flowchart of a method of designing an IC according to an exemplary embodiment of the inventive concept.

FIG. 31 is a flowchart of a method of designing an IC according to an exemplary embodiment of the inventive concept.

Referring to FIG. 31, a method of designing the layout of the IC according to the present exemplary embodiment may correspond to an example of operation S10 of FIG. 1. Accordingly, for convenience of explanation, a further description of processes and elements previously described with reference to FIG. 1 may be omitted herein. Further, the method of designing the layout of the IC according to the present exemplary embodiment may correspond to a modified example of the exemplary embodiment of FIG. 27. Accordingly, for convenience of explanation, a further description of processes and elements previously described with reference to FIG. 27 may be omitted herein.

In operation S3100, a first cell including first colorless patterns and second colorless patterns may be designed. The first colorless patterns may be arranged in a first zone adjacent to a first boundary and may satisfy a first space condition. The second colorless patterns may be arranged in a second zone adjacent to the second boundary and may satisfy the first space condition. The first and second zones may be virtual spaces generated in an operation of generating cells. According to an exemplary embodiment, generation of patterns having different colors in the first zone may be prohibited. Similarly, generation of patterns having different colors in the second zone may be prohibited.

In operation S3120, the first cell and a second cell may be placed adjacent to each other at the first boundary. For example, the first cell may be initially placed, and the second cell may be placed adjacent to the first boundary of the first cell along a direction in which the first and second cells are placed. Operation S3120 may be an example of operation S13 of FIG. 1. The second cell may be an arbitrary cell stored in a standard cell library.

In operation S3140, a first color and a second color may be respectively assigned to the first colorless patterns and the second colorless patterns. In an exemplary embodiment, the first color may be the same as the second color. In an exemplary embodiment, the first color may be different from the second color.

Thus, according to an exemplary embodiment, after the operation of placing the cells, the same color may be assigned to the first colorless patterns generated in the first zone in the operation of designing the cells. Since the same color may be assigned to the first colorless patterns later, a space between two arbitrary first colorless patterns in the first zone may be equal to or greater than a first space.

Further, after the operation of placing the cells, the same color may be assigned to the second colorless patterns generated in the second zone in the operation of designing the cells. Since the same color may be assigned to the second colorless patterns later, a space between two arbitrary colorless patterns in the second zone may be equal to or greater than the first space.

Figure 32:
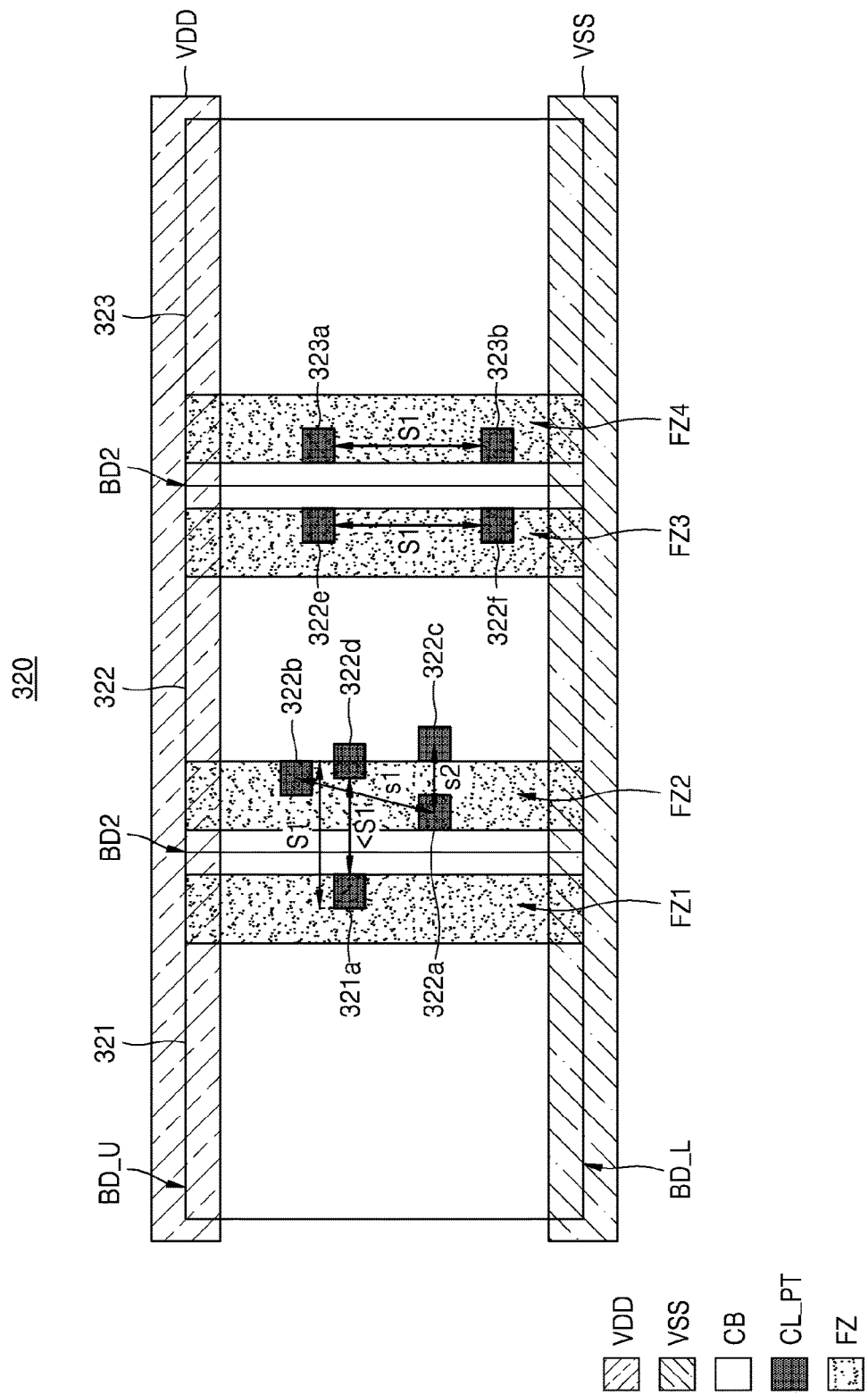
FIG. 32 illustrates an example of an IC including a cell designed using the method of FIG. 31 according to an exemplary embodiment of the inventive concept.

FIG. 32 illustrates an example of an IC including a cell designed using the method of FIG. 31 according to an exemplary embodiment of the inventive concept.

Referring to FIG. 32, an IC 320 may include first to third standard cells 321, 322, and 323 arranged in a first direction. A first power line VDD may be arranged substantially parallel to an upper boundary BD_U that is substantially perpendicular to first and second boundaries BD1 and BD2. A second power line VSS may be arranged substantially parallel to a lower boundary BD_L that is substantially perpendicular to the first and second boundaries BD1 and BD2.

The first standard cell 321 may have a first zone FZ1 adjacent to the first boundary BD1. The first zone FZ1 may be a virtual space that may prohibit generation of patterns to which different colors are assigned. Only patterns to which the same color is assigned or colorless patterns to which the same color is to be assigned may be generated in the first zone FZ1. In an exemplary embodiment, the first standard cell 321 may include a colorless pattern 321a disposed in the first zone FZ1.

The second standard cell 322 may have a second zone FZ2 adjacent to the first boundary BD1. The second zone FZ2 may be a virtual space that may prohibit generation of patterns to which different colors are assigned. Only patterns to which the same color is assigned or colorless patterns to which the same color is to be assigned may be generated in the second zone FZ2. In an exemplary embodiment, the second standard cell 322 may include a colorless pattern 322a disposed in the second zone FZ2.

In an exemplary embodiment, the second standard cell 322 may further include a first pattern 322b disposed in the second zone FZ2. In this case, a space s1 between the colorless pattern 322a and the first pattern 322b may be equal to or greater than the first space S1. The colorless pattern 322a and the first pattern 322b may have the same color.

In an exemplary embodiment, the second standard cell 322 may further include a second pattern 322c arranged outside of the second zone FZ2. In this case, a space s2 between the colorless pattern 322a and the second pattern 322c may be less than the first space S1. Accordingly, the second pattern 322c may have a different color from the colorless pattern 322a. Thus, only patterns having the same color may be arranged in the second zone FZ2.

Even if a third pattern 322d has a different color from the colorless pattern 322a, the third pattern 322d cannot be arranged at a boundary of the second zone FZ2 or in the second zone FZ2. Since a space between the colorless pattern 322a arranged in the first zone FZ1 of the first standard cell 321 and the third pattern 322d is equal to or less than the first space S1, when the same color is assigned to the colorless pattern 322a and the third pattern 322d, a color conflict may occur between the colorless pattern 322a and the third pattern 322d.

The second standard cell 322 may further include a third zone FZ3 disposed adjacent to the second boundary BD2. The third zone FZ3 may be a virtual space that may prohibit generation of patterns to which different colors are assigned. Only patterns to which the same color is assigned or colorless patterns to which the same color is to be assigned may be generated in the third zone FZ3. In an exemplary embodiment, the second standard cell 322 may include colorless patterns 322e and 322f disposed in the third zone FZ3. In this case, a space between the colorless patterns 322e and 322f may be equal to or greater than the first space S1.

The third standard cell 323 may have a fourth zone FZ4 disposed adjacent to the second boundary BD2. The fourth zone FZ4 may be a virtual space that may prohibit generation of patterns to which different colors are assigned. Only patterns to which the same color is assigned or colorless patterns to which the same color is to be assigned may be generated in the fourth zone FZ4. In an exemplary embodiment, the third standard cell 323 may include colorless patterns 323a and 323b disposed in the fourth zone FZ4. In this case, a space between the colorless patterns 323a and 323b may be equal to or greater than the first space S1. In an exemplary embodiment, different colors may be assigned to the colorless patterns 322e and 322f disposed in the third zone FZ3 and the colorless patterns 323a and 323b disposed in the fourth zone FZ4.

In an exemplary embodiment, the first zone FZ1 may be generated to be a predetermined space apart from the first boundary BD1. In an exemplary embodiment, the first zone FZ1 may be generated to be in contact with the first boundary BD1. In an exemplary embodiment, the second zone FZ2 may be generated to be a predetermined space apart from the first boundary BD1. In an exemplary embodiment, the second zone FZ2 may be generated to be in contact with the first boundary BD1. In an exemplary embodiment, the third zone FZ3 may be generated to be a predetermined space apart from the second boundary BD2. In an exemplary embodiment, the third zone FZ3 may be generated to be in contact with the second boundary BD2. In an exemplary embodiment, the fourth zone FZ4 may be generated to be a predetermined space apart from the second boundary BD2. In an exemplary embodiment, the fourth zone FZ4 may be generated to be in contact with the second boundary BD2.

Figure 33:
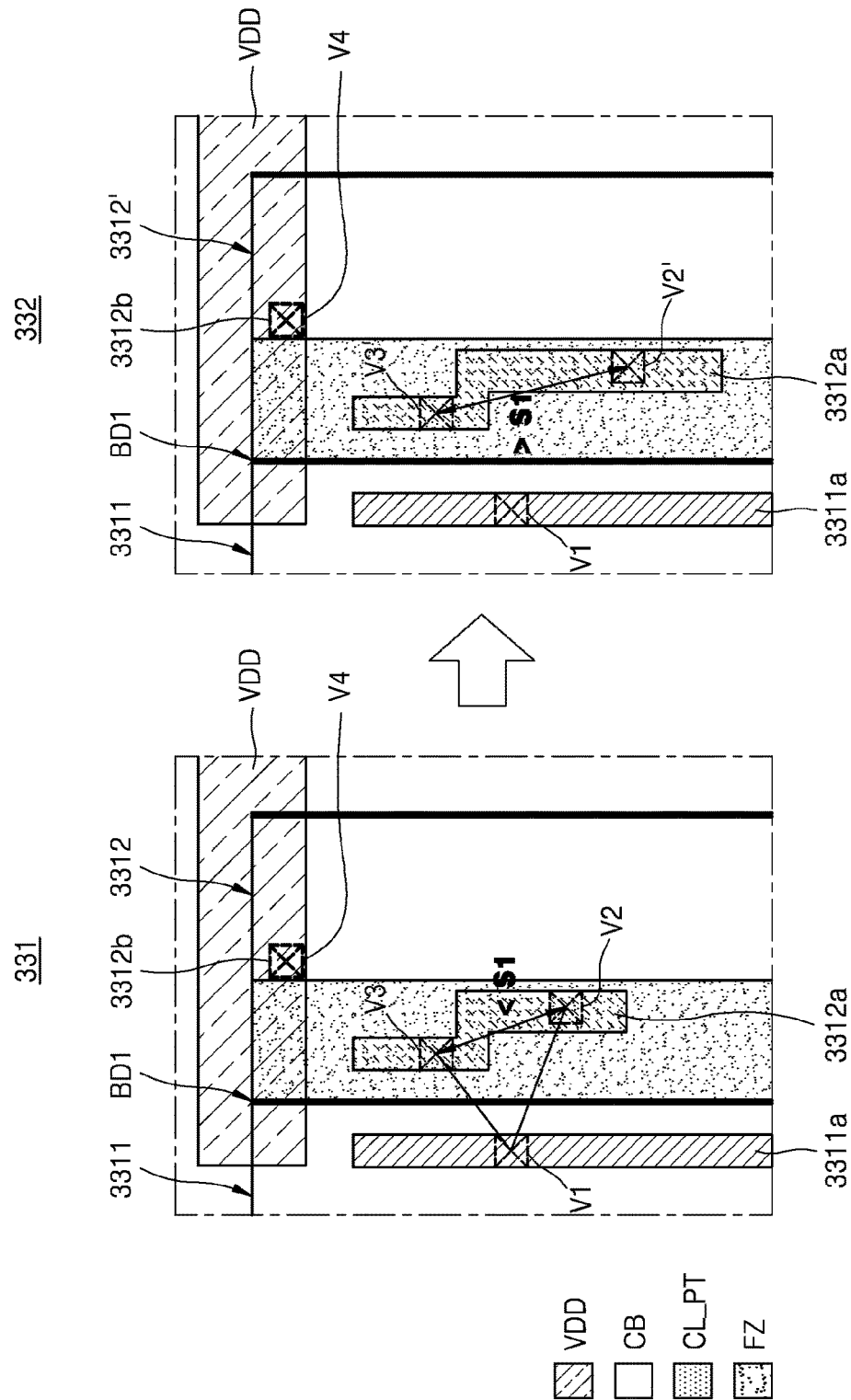
FIG. 33 illustrates an example of a layout of the IC including a cell designed using a method according to an exemplary embodiment of the inventive concept.

FIG. 33 illustrates an example of a layout of an IC including a cell designed according to an exemplary embodiment of the inventive concept.

Referring to FIG. 33, an IC 331 may include first and second standard cells 3311 and 3312 adjacent to a first boundary BD1. The first standard cell 3311 may include a pattern 3311a adjacent to the first boundary BD1, and a first via V1 may be formed on the pattern 3311a. The second standard cell 3312 may include first and second patterns 3312a and 3312b, and the first pattern 3312a may be located in a first zone FZ. In this case, second and third vias V2 and V3 may be located on the first pattern 3312a, and a fourth via V4 may be located on the second pattern 3312b.

To form the first to third vias V1 to V3, when two masks are used, the first to third vias V1 to V3 are decomposed into two colors. Since the first zone FZ is a space that does not allow patterns having different colors, the same color may be assigned to the second and third vias V2 and V3. In this case, when a space between the second via V2 and the third via V3 is less than a first space S1, a color conflict may occur between the second via V2 and the third via V3.

In an IC 332, to solve a color conflict between the second via V2 and the third via V3, a space between a second via V2' and a third via V3' may be determined to be equal to or greater than first space S1, so that the second via VT and the third via V3' may satisfy the first space condition.

Figure 34:
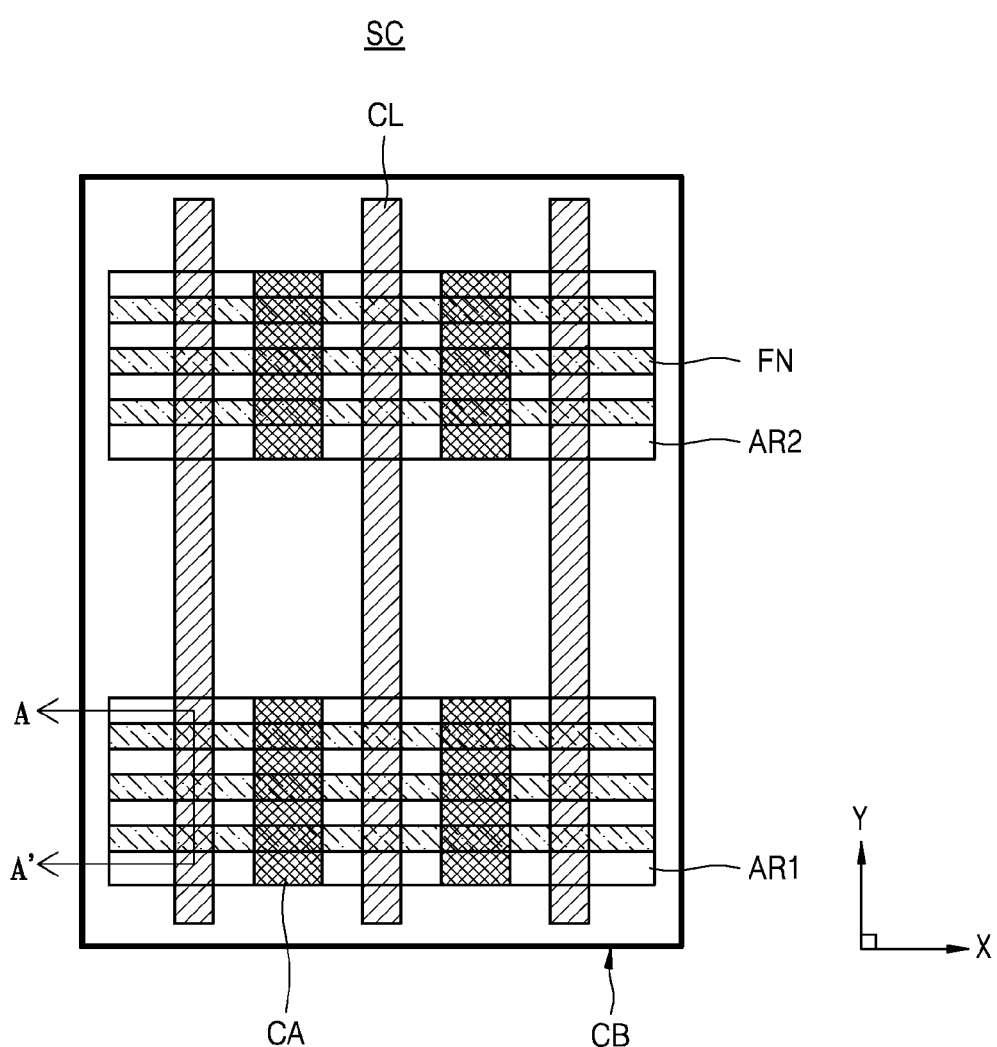
FIG. 34 illustrates an example of a standard cell including a cell designed according to an exemplary embodiment of the inventive concept.

FIG. 34 illustrates an example of a standard cell including a cell designed according to an exemplary embodiment of the inventive concept.

Referring to FIG. 34, the standard cell SC may be defined by a cell boundary CB and may include a plurality of fins FN, a plurality of active regions (e.g., first and second active regions AR1 and AR2), a plurality of conductive lines CL, and a plurality of contacts CA. The cell boundary CB may be an outline defining the standard cell SC, and a P&R tool may recognize the standard cell SC using the cell boundary CB. The cell boundary CB may include four boundary lines.

The plurality of fins FN may extend in a first direction (e.g., X direction) and be arranged substantially parallel to one another in a second direction (e.g., Y direction) substantially perpendicular to the first direction. The first active region AR1 and the second active region AR2 may be arranged substantially parallel to one another and may have different conductivity types. In an exemplary embodiment, three fins FN may be arranged in each of the first and second active regions AR1 and AR2. However, exemplary embodiments of the inventive concept are not limited thereto. For example, in an exemplary embodiment, the number of fins FN arranged in each of the first and second active regions AR1 and AR2 may be variously changed.

In this case, the plurality of fins FN arranged in the first and second active regions AR1 and AR2 may be referred to as active fins. Although FIG. 34 illustrates only active fins, exemplary embodiments of the inventive concept are not limited thereto. The standard cell SC may further include, for example, the cell boundary CB, the first active region AR1, a region between the first and second active regions AR1 and AR2, and/or dummy fins arranged in a region between the second active region AR2 and the cell boundary CB.

The plurality of conductive lines CL may extend in the second direction (e.g., Y direction) and may be arranged substantially parallel to one another in the first direction (e.g., X direction). In this case, the conductive lines CL may be formed of a material having electrical conductivity. For example, the conductive lines CL may include polysilicon (poly-Si), a metal, or a metal alloy.

In an exemplary embodiment, the conductive lines CL may correspond to gate electrodes. However, exemplary embodiments of the inventive concept are not limited thereto. In an exemplary embodiment, the conductive lines CL may have traces having an arbitrary conductivity. Further, although FIG. 34 illustrates an exemplary embodiment in which the standard cell SC includes three conductive lines CL, exemplary embodiments of the inventive concept are not limited thereto. For example, in an exemplary embodiment, the standard cell SC may include at least four conductive lines, which may extend in the second direction and be arranged substantially parallel to one another in the first direction.

The plurality of contacts CA may be arranged on the first and second active regions AR1 and AR2 and electrically connected to the first and second active regions AR1 and AR2. In an exemplary embodiment, the plurality of contacts CA may be source/drain contacts. In an exemplary embodiment, the plurality of contacts CA may be power contacts. The standard cell SC may further include contacts, which may be arranged on the plurality of conductive lines CL and electrically connected to the plurality of conductive lines CL.

Figure 35:
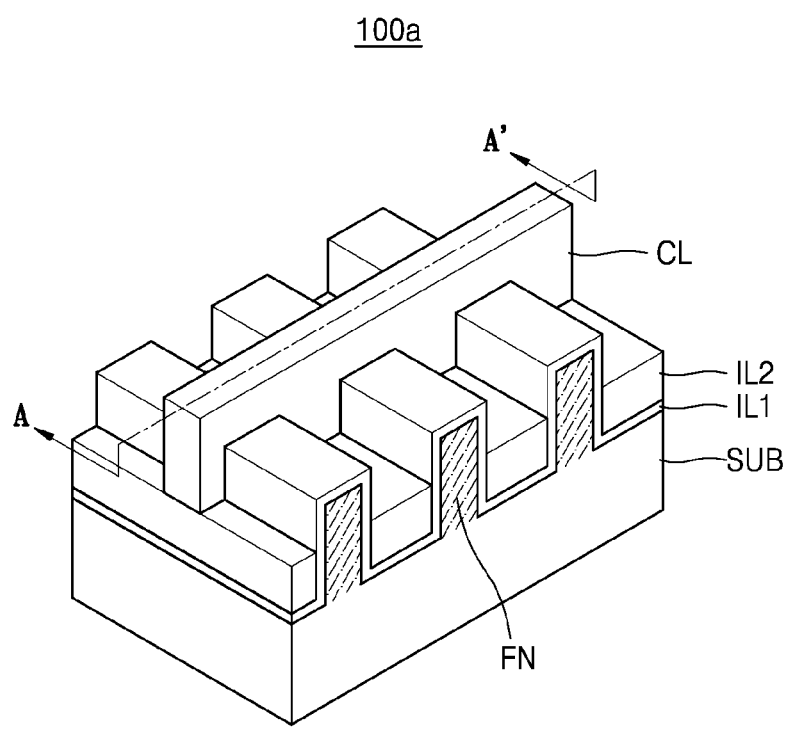
FIG. 35 is a perspective view of an example of a semiconductor device having a layout of FIG. 34 according to an exemplary embodiment of the inventive concept.
Figure 36:
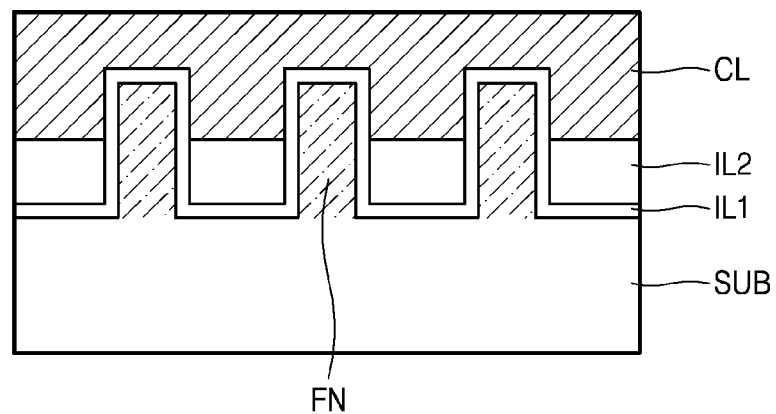
FIG. 36 is a cross-sectional view taken along line A-A' of FIG. 34 according to an exemplary embodiment of the inventive concept.

FIG. 35 is a perspective view of an example of a semiconductor device having a layout of FIG. 34 according to an exemplary embodiment of the inventive concept. FIG. 36 is a cross-sectional view taken along line A-A' of FIG. 34 according to an exemplary embodiment of the inventive concept.

Referring to FIGS. 35 and 36, a semiconductor device 100a may be a bulk-type fin field-effect transistor (FinFET). The semiconductor device 100a may include, for example, a substrate SUB, a first insulating layer IL1, a second insulating layer IL2, first to third fins FN, and a conductive line CL. The conductive line CL may also be referred to herein as a gate electrode CL.

The substrate SUB may be a semiconductor substrate. For example, the semiconductor substrate SUB may include any one of silicon, silicon-on-insulator (SOI), silicon-on-sapphire, germanium (Ge), silicon germanium (SiGe), and gallium arsenic (GaAs). The substrate SUB may be, for example, a P-type substrate and used as a first active region AR1.

The first to third fins FN may be connected to the substrate SUB. In an exemplary embodiment, the first to third fins FN may be active regions formed by doping an n+-type dopant or a p+-type dopant into portions vertically protruding from the substrate SUB.

The first and second insulating layers IL1 and IL2 may include an insulating material. For example, the insulating material may include any one of an oxide layer, a nitride layer, or an oxynitride layer. The first insulating layer IL1 may be arranged on the first to third fins FN. The first insulating layer IL1 may be arranged between the first to third fins FN and the gate electrode CL and used as a gate insulating layer. The second insulating layer IL2 may be disposed at a predetermined height in spaces among the first to third fins FN. The second insulating layer IL2 may be arranged among the first to third fins FN and used as a device isolation layer.

The gate electrode CL may be arranged on the first and second insulating layers IL1 and IL2. Thus, the gate electrode CL may be configured to surround an upper portion of the first to third fins FN, the first insulating layer IL1, and the second insulating layer IL2, as shown in FIG. 36. That is, in an exemplary embodiment the first to third fins FN may be arranged inside the gate electrode CL (e.g., the gate electrode CL may be disposed on an upper portion of the first to third fins FN, the first insulating layer IL1, and the second insulating layer IL2). The gate electrode CL may include a metal material (e.g., tungsten (W) and tantalum (Ta)), a nitride thereof, a silicon thereof, or doped poly-Si, and may be formed using a deposition process.

Figure 37:
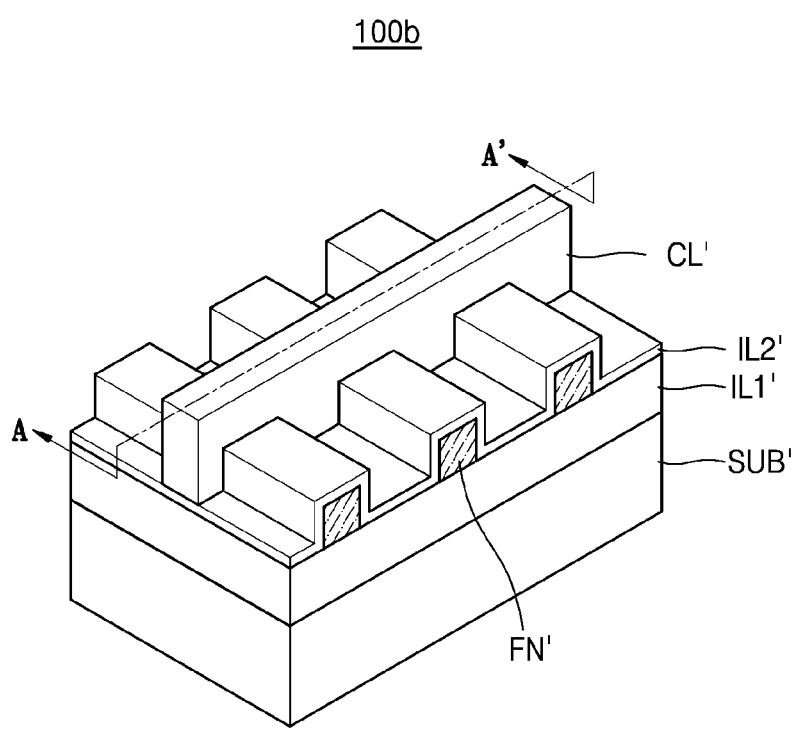
FIG. 37 is a perspective view of an example of a semiconductor device having the layout of FIG. 34 according to an exemplary embodiment of the inventive concept.
Figure 38:
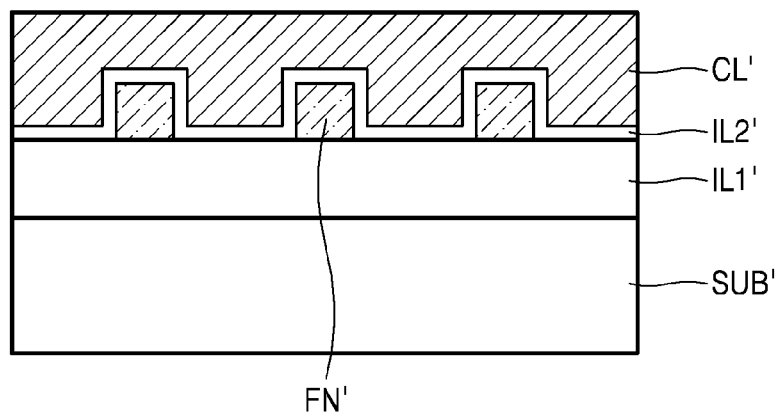
FIG. 38 is a cross-sectional view taken along line A-A' of FIG. 37 according to an exemplary embodiment of the inventive concept.

FIG. 37 is a perspective view of an example of a semiconductor device having the layout of FIG. 34 according to an exemplary embodiment of the inventive concept. FIG. 38 is a cross-sectional view taken along line A-A' of FIG. 37 according to an exemplary embodiment of the inventive concept.

Referring to FIGS. 37 and 38, a semiconductor device 100b may be a SOI-type FinFET. The semiconductor device 100b may include a substrate SUB', a first insulating layer IL1', a second insulating layer IL2', first to third fins FN', and a conductive line CL'. The conductive line CL' may also be referred to herein as a gate electrode CL'. The semiconductor device 100b according to the present exemplary embodiment is a modified example of the semiconductor device 100a shown in FIGS. 35 and 36. Thus, for convenience of explanation, only differences between the semiconductor device 100b and the semiconductor device 100a may be described, and processes and elements previously described may be omitted herein.

The first insulating layer IL1' may be arranged on the substrate SUB'. The second insulating layer IL2' may be arranged between the first to third fins FN' and the gate electrode CL' and used as a gate insulating layer. The first to third fins FN' may include a semiconductor material such as, for example, silicon or doped silicon.

The gate electrode CL' may be arranged on the second insulating layer IL2'. Thus, the gate electrode CL' may be configured to surround an upper portion of the first to third fins FN' and the second insulating layer IL2'. That is, in an exemplary embodiment, the first and second fins FN' may be arranged inside the gate electrode CL' (e.g., the gate electrode CL' may be disposed on an upper portion of the first to third fins FN' and the second insulating layer IL2').

Figure 39:
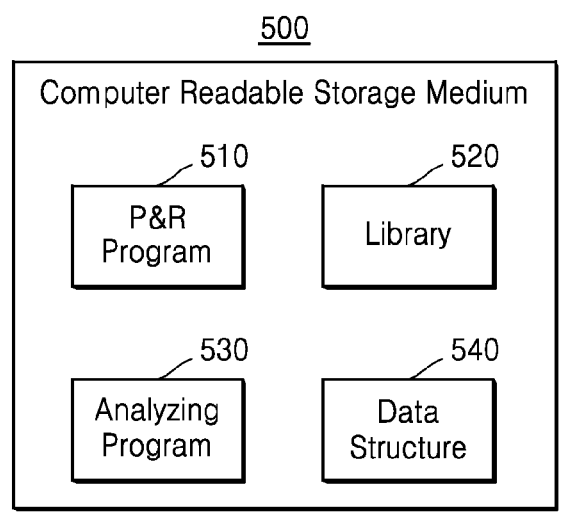
FIG. 39 is a block diagram of a storage medium according to an exemplary embodiment of the inventive concept.

FIG. 39 is a block diagram of a storage medium according to an exemplary embodiment of the inventive concept.

Referring to FIG. 39, the storage medium 500 may be a computer-readable storage medium, which may include an arbitrary computer-readable storage medium while being used to provide commands and/or data to a computer. For example, the storage medium 500 may include a magnetic or optical medium (e.g., a disc, a tape, a CD-ROM, a DVD-ROM, a CD-R, a CD-RW, a DVD-R, and a DVD-RW), a volatile or non-volatile memory (e.g., a random access memory (RAM), a read-only memory (ROM), or a flash memory), a non-volatile memory that is accessible via a universal serial bus (USB) interface, and/or a micro electro mechanical systems (MEMS). The storage medium 500 may be inserted into a computer, integrated in a computer, or combined with a computer via a network and/or a communication medium, such as a wireless link.

Exemplary embodiments of the present inventive concept may be embodied directly in hardware, in a software module executed by a processor, or in a combination of the two. A software module may be tangibly embodied on a non-transitory program storage device such as, for example, in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an application specific integrated circuit (ASIC). Additionally, the ASIC may reside in a user terminal. Alternatively, the processor and the storage medium may reside as discrete components in a user terminal.

It is to be understood that the present inventive concept may be implemented in various forms of hardware, software, firmware, special purpose processors, or a combination thereof. In one embodiment, the present inventive concept may be implemented in software as an application program tangibly embodied on a program storage device. The application program may be uploaded to, and executed by, a machine comprising any suitable architecture.

As shown in FIG. 39, the storage medium 500 may include a P&R program 510, a library 520, an analyzing program 530, and a data structure 540. The P&R program 510 may include a plurality of commands to perform a method of designing an IC using a standard cell library according to exemplary embodiments of the inventive concept described herein. For example, the storage medium 500 may store the P&R program 510 including arbitrary commands for designing an IC using a standard cell library including a standard cell shown in at least one of FIGS. 1 to 38. The library 520 may include information regarding a standard cell, which is a unit of an IC.

The analyzing program 530 may include a plurality of commands to perform a method of analyzing an IC based on data defining the IC. The data structure 540 may include a storage space for managing data generated during a process of using a standard cell library included in the library 520, a process of extracting specific information from a general standard cell library included in the library 520, or a process of analyzing characteristics of the IC using the analyzing program 530.

Figure 40:
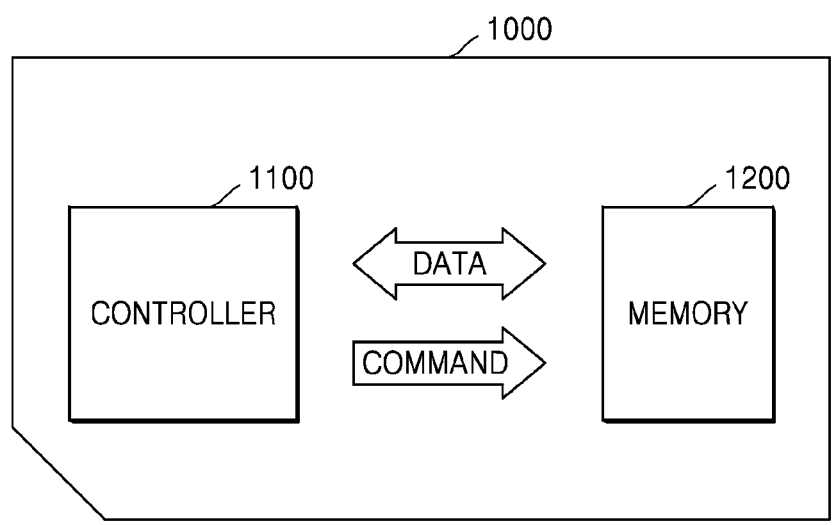
FIG. 40 is a block diagram of a memory card including an IC according to an exemplary embodiment of the inventive concept.

FIG. 40 is a block diagram of a memory card including an IC according to an exemplary embodiment of the inventive concept.

Referring to FIG. 40, a memory card 1000 may be configured such that the controller 1100 and the memory 1200 exchange electric signals. For example, when the controller 1100 issues a command, the memory 1200 may transmit data.

Each of the controller 1100 and the memory 1200 may include an IC according to exemplary embodiments of the inventive concept described herein. In an exemplary embodiment, at least one of a plurality of semiconductor devices included in the controller 1100 and the memory 1200 may be embodied according to an IC including a cell in which at least two patterns adjacent to a boundary have different colors and different boundary spaces. In an exemplary embodiment, at least one of the plurality of semiconductor devices included in the controller 1100 and the memory 1200 may be embodied according to an IC including a cell having colorless patterns that satisfy a first space condition in one zone adjacent to a boundary.

The memory card 1000 may constitute various kinds of memory cards such as, for example, a memory stick card, a smart media (SM) card, a secure digital (SD) card, a mini-SD card, and a multimedia card (MMC).

Figure 41:
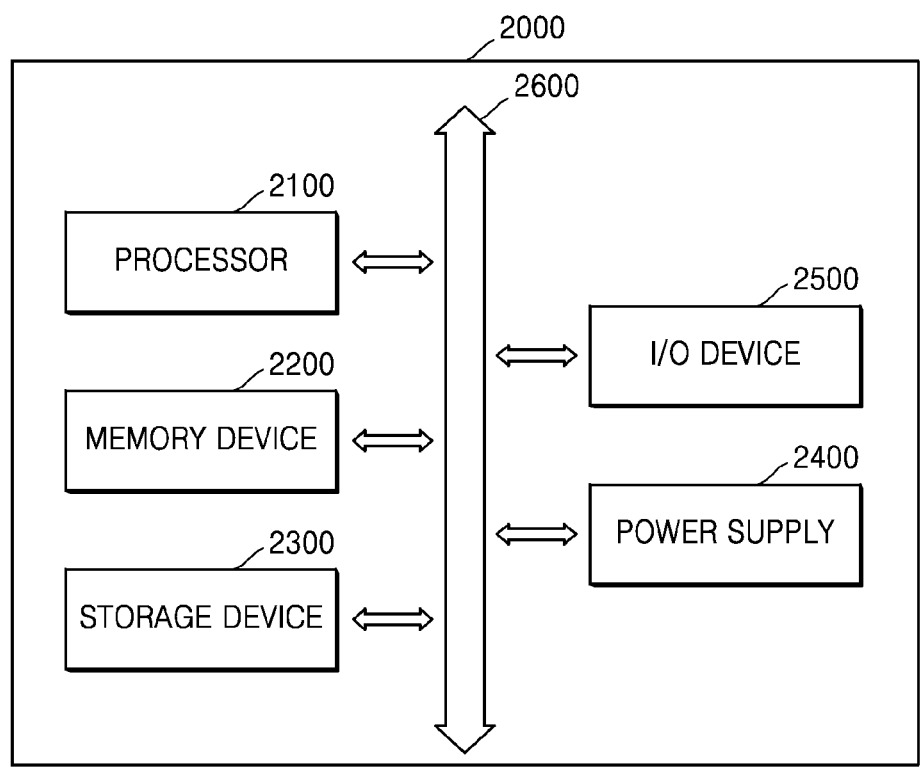
FIG. 41 is a block diagram of a computing system including an IC according to an exemplary embodiment of the inventive concept.

FIG. 41 is a block diagram of a computing system including an IC according to an exemplary embodiment of the inventive concept.

Referring to FIG. 41, a computing system 2000 may include a processor 2100, a memory device 2200, a storage device 2300, a power supply 2400, and an input/output (I/O) device 2500. The computing system 2000 may communicate with a video card, a sound card, a memory card, or a USB device, or may further include ports capable of communicating with other electronic devices.

Each of the processor 2100, the memory device 2200, the storage device 2300, the power supply 2400, and the I/O device 2500 included in the computing system 2000 may include an IC according to one of the exemplary embodiments of the inventive concept described herein. In an exemplary embodiment, at least one of a plurality of semiconductor devices included in the processor 2100, the memory device 2200, the storage device 2300, the power supply 2400, and the I/O device 2500 may be embodied according to an IC including a cell in which two patterns adjacent to a boundary have different colors and different boundary spaces. In an exemplary embodiment, at least one of a plurality of semiconductor devices included in the processor 2100, the memory device 2200, the storage device 2300, the power supply 2400, and the I/O device 2500 may be embodied according to an IC including a cell having colorless patterns that satisfy a first space condition in one zone adjacent to a boundary.

The processor 2100 may perform specific calculations or tasks. In exemplary embodiments, the processor 2100 may be a microprocessor (MP) or a central processing unit (CPU). The processor 2100 may communicate with the memory device 2200, the storage device 2300, and the I/O device 2500 via a bus 2600, such as an address bus, a control bus, or a data bus. In exemplary embodiments, the processor 2100 may be connected to an expansion bus, such as a peripheral component interconnect (PCI) bus.

The memory device 2200 may store data required for operations of the computing system 2000. For example, the memory device 2200 may be embodied by dynamic RAM (DRAM), mobile DRAM (MDRAM), static RAM (SRAM), phase-change RAM (PRAM), ferroelectric RAM (FRAM), resistive RAM (RRAM), and/or magnetic RAM (MRAM). The storage device 2300 may include a solid-state drive (SSD), a hard disk drive, or CD-ROM.

The I/O device 2500 may include an input unit, such as a keyboard, a keypad, or a mouse, and an output unit, such as printer or a display. The power supply 2400 may supply an operating voltage required for operations of the computing system 2000.

The IC according to one of the above-described exemplary embodiments of the inventive concept may be embodied using packages having various shapes. For example, at least some elements of the IC according to one of the above-described exemplary embodiments may be mounted using a Package on Package (PoP) technique, a ball grid array (BGA) technique, a chip-scale package (CSP) technique, a plastic-leaded chip carrier (PLCC) technique, a plastic dual in-line package (PDIP) technique, a die-in-waffle-pack technique, a die-in-wafer-form technique, a chip-on-board (COB) technique, a ceramic dual in-line package (CERDIP) technique, a plastic metric quad flat-pack (MQFP) technique, a thin quad flat-pack (TQFP) technique, a small outline integrated circuit (SOIC) technique, a shrink small outline package (SSOP) technique, a thin small outline package (TSOP) technique, a system-in-package (SIP) technique, a multi-chip package (MCP) technique, a wafer-level fabricated package (WFP) technique, or a wafer-level processed stack package (WSP) technique.

While the present inventive concept has been particularly shown and described with reference to the exemplary embodiments thereof, it will be understood by those of ordinary skill in the art that various changes in form and detail may be made therein without departing from the spirit and scope of the present inventive concept as defined by the following claims.

What is claimed is:

1. A method of designing a layout of an integrated circuit (IC), comprising:
presetting a first space condition that defines a smallest acceptable space between patterns disposed in a first cell and a second cell in the layout that are assigned to a same color, wherein the first cell is adjacent to the second cell;
presetting a second space condition, different from the first space condition, that defines a smallest acceptable space between patterns disposed in the first cell and the second cell in the layout that are assigned to different colors;
placing the first cell in the layout, wherein the first cell comprises a first pattern having a first color and a second pattern having a second color different from the first color;
placing the second cell in the layout adjacent to the first cell at a first boundary between the first and second cells, wherein the second cell comprises a third pattern having the first color and a fourth pattern having the first color,
wherein the first and second patterns are adjacent to the first boundary, and the third and fourth patterns are adjacent to the first boundary
wherein a first pattern-to-pattern space between the first pattern and the third pattern is determined using the first space condition, and a second pattern-to-pattern space between the second pattern and the fourth pattern is determined using the second space condition,
wherein a first boundary space between the first pattern and the first boundary is different from a second boundary space between the second pattern and the first boundary;
generating a plurality of commands executable by a processor to form a semiconductor device based on the layout; and
forming the semiconductor device based on the layout.

2. The method of claim 1, further comprising:
determining a value of the first boundary space and a value of the second boundary space,
wherein the first color corresponds to a first mask, and the second color corresponds to a second mask.

3. The method of claim 2, wherein
the value of the first boundary space is determined based on the first space condition,
the value of the second boundary space is determined based on the second space condition, and
the value of the second boundary space is smaller than the value of the first boundary space.

4. The method of claim 2, further comprising:
assigning one of the first and second colors to a fifth pattern disposed in the first cell and adjacent to a second boundary opposite the first boundary; and
determining a value of a third boundary space between the fifth pattern and the second boundary to be equal to or greater than a smallest value of the first and second boundary spaces.

5. The method of claim 2, further comprising:
assigning one of the first and second colors to a plurality of additional patterns disposed in the first cell and adjacent to a second boundary opposite the first boundary; and
determining values of respective boundary spaces between the additional patterns and the second boundary to be equal to or greater than a smallest value of the first and second boundary spaces.

6. The method of claim 2, further comprising:
performing a color inverting operation on the second cell,
wherein, upon performing the color inverting operation, patterns arranged adjacent to the first boundary in the second cell and the first pattern or the second pattern satisfy the first space condition and the second space condition.

7. The method of claim 1, further comprising:
assigning a third color to a fifth pattern disposed in the first cell and adjacent to the first boundary, wherein the first color corresponds to a first mask, the second color corresponds to a second mask, and the third color corresponds to a third mask; and
determining a value of the first boundary space, a value of the second boundary space, and a value of the third boundary space between the fifth pattern and the first boundary,
wherein at least two of the values of the first to third boundary spaces are different from each other.

8. The method of claim 7, wherein
the value of the first boundary space is determined based on the first space condition,
the value of the second boundary space is determined based on the second space condition, and the value of the second boundary space is smaller than the value of the first boundary space, and
the value of the third boundary space is determined based on the first boundary space.

9. The method of claim 8, wherein the value of the third boundary space is equal to or greater than the value of the second boundary space and equal to or smaller than the value of the first boundary space.

10. The method of claim 1, further comprising:
assigning a third color to a fifth pattern disposed in the first cell and adjacent to the first boundary, wherein the first color corresponds to a first mask, the second color corresponds to a second mask, and the third color corresponds to a third mask;
assigning a fourth color to a sixth pattern disposed in the first cell and adjacent to the first boundary, wherein the fourth color corresponds to a fourth mask; and
determining a value of the first boundary space, a value of the second boundary space, a value of the third boundary space between the fifth pattern and the first boundary, and a value of the fourth boundary space between the sixth pattern and the first boundary,
wherein at least two of the values of the first to fourth boundary spaces are different from each other.

11. The method of claim 10, wherein
the value of the first boundary space is determined based on the first space condition,
the value of the second boundary space is determined based on the second space condition, and the value of the second boundary space is smaller than the value of the first boundary space, and
the values of the third and fourth boundary spaces are determined to be a same value based on the first boundary space.

12. The method of claim 11, wherein each of the values of the third and fourth boundary spaces is equal to or greater than the value of the second boundary space and equal to or smaller than the value of the first boundary space.

13. The method of claim 10, wherein
the value of the first boundary space is determined based on the first space condition,
the value of the second boundary space is determined based on the second space condition, and the value of the second boundary space is smaller than the value of the first boundary space,
the value of the third boundary space is determined based on the first space, and
the value of the fourth boundary space is determined to be different from the third boundary space.

14. The method of claim 1, wherein the first and second patterns correspond to conductive lines arranged at a same level in the IC.

15. The method of claim 1, wherein
the first pattern is a vertical pattern and the second pattern is a horizontal pattern,
an extension direction of the vertical pattern is substantially parallel to the first boundary, and an extension direction of the horizontal pattern is substantially perpendicular to the first boundary, and
the first boundary space between the vertical pattern and the first boundary is smaller than the second boundary space between the horizontal pattern and the first boundary.

16. A method of manufacturing a semiconductor device, comprising:
presetting a first space condition that defines a smallest acceptable space between patterns disposed in a first cell and a second cell in a layout that are assigned to a same color, wherein the first cell is adjacent to the second cell;
presetting a second space condition, different from the first space condition, that defines a smallest acceptable space between patterns disposed in the first cell and the second cell in the layout that are assigned to different colors;
placing the first cell in the layout, wherein the first cell comprises a first pattern having a first color and a second pattern having a second color different from the first color;
placing the second cell in the layout adjacent to the first cell at a first boundary between the first and second cells, wherein the second cell comprises a third pattern having the first color and a fourth pattern having the first color, and the first and second cells are among a plurality of cells that defines an integrated circuit (IC),
wherein the first and second patterns are adjacent to the first boundary, and the third and fourth patterns are adjacent to the first boundary,
wherein a first pattern-to-pattern space between the first pattern and the third pattern is determined using the first space condition, and a second pattern-to-pattern space between the second pattern and the fourth pattern is determined using the second space condition; and
forming the semiconductor device based on the layout, wherein the semiconductor device is formed using a multi-patterning operation performed on the first, second, third and fourth patterns using different masks corresponding respectively to the different colors.

* * * * *